(12) United States Patent
Turquais et al.

(10) Patent No.: US 10,983,234 B2
(45) Date of Patent: Apr. 20, 2021

(54) METHODS AND SYSTEMS TO INTERPOLATE SEISMIC DATA

(71) Applicant: PGS Geophysical AS, Oslo (NO)

(72) Inventors: Pierre Turquais, Oslo (NO); Endrias Asgedom, Oslo (NO); Walter Söllner, Oslo (NO)

(73) Assignee: PGS Geophysical AS, Oslo (NO)

( * ) Notice: Subject to any disclaimer, the term of this patent is extended or adjusted under 35 U.S.C. 154(b) by 469 days.

(21) Appl. No.: 15/915,411

(22) Filed: Mar. 8, 2018

(65) Prior Publication Data
US 2018/0267188 A1 Sep. 20, 2018

Related U.S. Application Data

(60) Provisional application No. 62/471,430, filed on Mar. 15, 2017.

(51) Int. Cl.
*G01V 1/34* (2006.01)
*G01V 1/30* (2006.01)
*G01V 1/38* (2006.01)

(52) U.S. Cl.
CPC .............. *G01V 1/345* (2013.01); *G01V 1/301* (2013.01); *G01V 1/3808* (2013.01); *G01V 1/3843* (2013.01); *G01V 2210/57* (2013.01)

(58) Field of Classification Search
CPC ........ G01V 1/28; G01V 1/3808; G01V 1/345; G01V 1/38; G01V 1/301; G01V 2210/1423; G01V 2210/57; G01V 1/325; G01V 2210/512; G01V 1/3843; G01V 2210/48

USPC .......................................................... 367/22
See application file for complete search history.

(56) References Cited

U.S. PATENT DOCUMENTS 7,426,438 B1 * 9/2008 Robertsson ............ G06Q 30/06
702/14

OTHER PUBLICATIONS

Yanhui Zhou et al., "Seismic Simultaneous Source Separation via Patchwise Sparse Representation," IEEE Transactions on Geoscience and Remote Sensing, vol. 54, No. 9, Sep. 2016, pp. 5271-5284. (Year: 2016).*
Pati, Y.C., Rezaiifar, and P.S. Krishnaprasad, "Orthogonal matching pursuit: recursive function approximation with applications to wavelet decomposition": Proceedings of the 27th Annual Asilomar Conference on Signals, Systems, and Computers, 1993, pp. 40-44.
Aharon, M., M. Elad, and A. Bruckstein, k-svd: An alogrithm for designing overcomplete dictionaries for sparse representation: Signal Processing, IEEE Transactions, vol. 54, No. 11, Nov. 2006, pp. 4311-4322.

(Continued)

*Primary Examiner* — Daniel L Murphy

(57) ABSTRACT

This disclosure is directed to processes and systems that generate enhanced-resolution seismic images by interpolating sparsely recorded seismic data. Structured dictionary learning is employed to train a set of basis vectors, called "atoms," and corresponding sparse coefficients on patches of the recorded seismic data. The atoms are constrained to represent the geometric structure of reflection events in the recorded seismic data gather. Linear combinations of the atoms are used to compute interpolated patches over a finer receiver-coordinate grid. The interpolated patches replace the original patches in the recorded seismic data to obtain interpolated seismic data that can be used to generate an image of the subterranean formation.

29 Claims, 40 Drawing Sheets

(56) References Cited

OTHER PUBLICATIONS

Elad, M., Sparse and redundant representations: From theory to applications in signal and image processing, 1st edition: Springer Publishing Company, pp. 227, 229-230, 233-234, 2010.

Zhou, Y., Chen, and J. Gao, Separation of seismic blended data by sparse inversion over dictionary learning: Journal of Applied Geophysics, vol. 106, pp. 146-153, 2014.

Zhou, Y., L. Wang, and Q. Pu, Seismic data reconstruction based on K-SVD dictionary learning under compressive sensing framework: Oil Geophysical Prospecting, vol. 49(4); Abstract only, 2014.

Turquais, P., E. Asgedom, and W. Söllner, Sparsity promoting morphological decomposition for coherent noise suppression: Application Streamer Vibration Related Noise, SEG International Exposition and 86th Annual Meeting, 2016, pp. 4639-4643.

\* cited by examiner $$\vec{a}_j = (Y[:,\Omega_j] - DX[:,\Omega_j] + D[:,j]X[j,\Omega_j])X[j;\Omega_j]^T$$

1602 ← (main equation)
1606, 1608, 1610, 1612 label the terms $$\vec{a}_j = \left(\begin{bmatrix} \vec{y}_2 & \vec{y}_3 & \vec{y}_5 & \vec{y}_7 \end{bmatrix} - D\begin{bmatrix} \vec{x}_2 & \vec{x}_3 & \vec{x}_5 & \vec{x}_7 \end{bmatrix} + \vec{a}_j\begin{bmatrix} x[j,2] & x[j,3] & x[j,5] & x[j,7] \end{bmatrix}\right)\begin{bmatrix} x[j,2] \\ x[j,3] \\ x[j,5] \\ x[j,7] \end{bmatrix}$$

1604 ← (expanded form)
1607, 1609, 1611, 1613 label the terms

FIG. 16

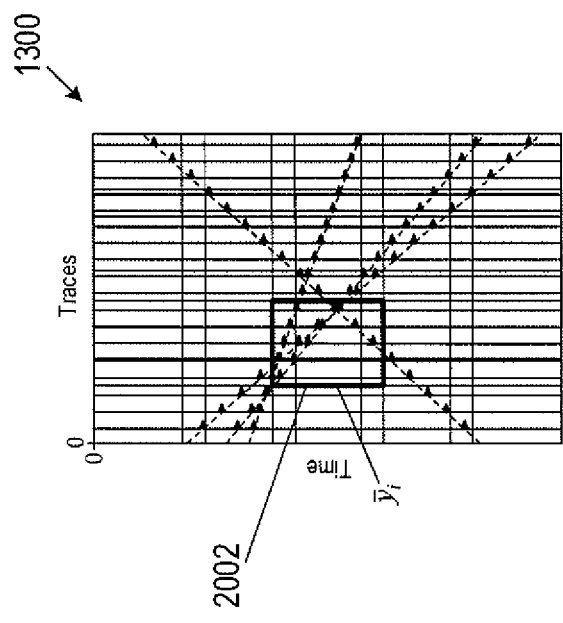
FIG. 20
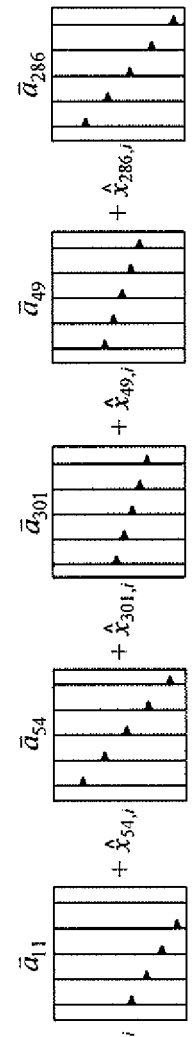
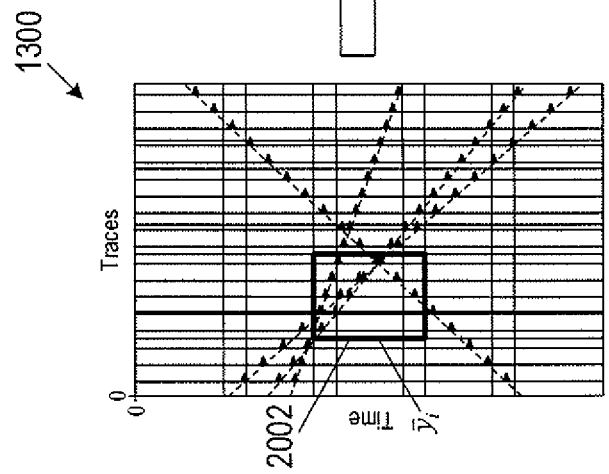
FIG. 21

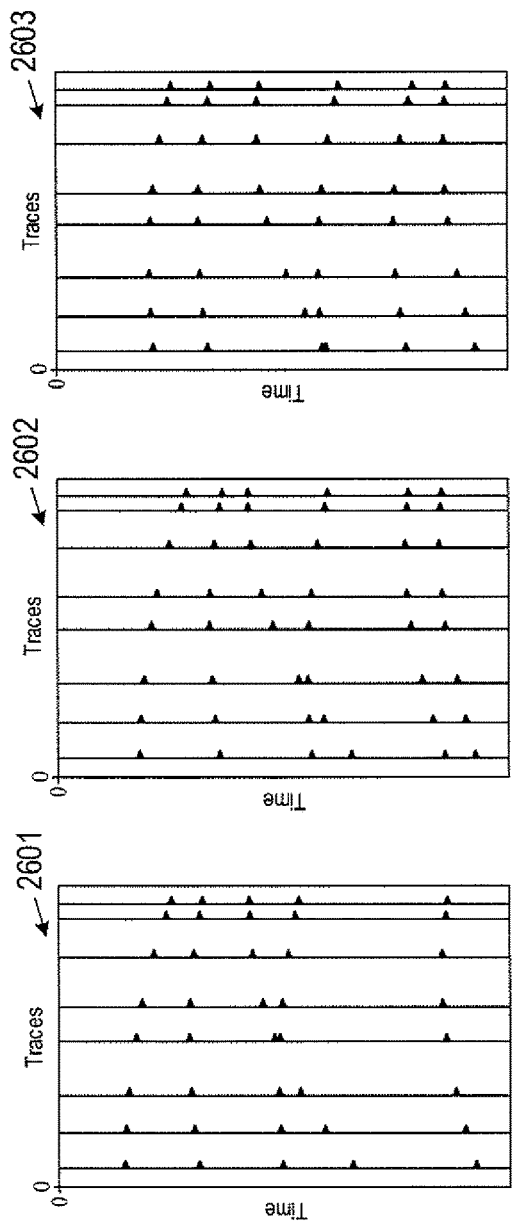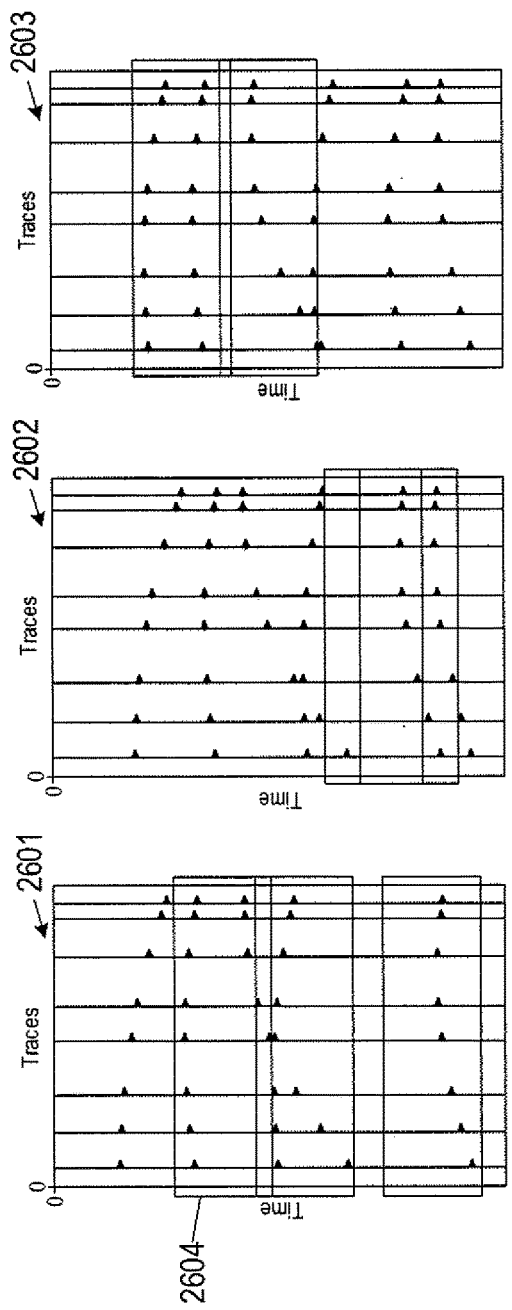
FIG. 26A
FIG. 26B

METHODS AND SYSTEMS TO INTERPOLATE SEISMIC DATA

CROSS-REFERENCE TO A RELATED APPLICATION

This application claims the benefit of Provisional Application 62/471,430, filed Mar. 15, 2017, which application is hereby incorporated by reference entirely as if fully set forth herein.

BACKGROUND

Marine seismology companies invest heavily in the development of marine seismic surveying equipment and seismic data processing techniques in order to obtain accurate, high-resolution seismic images of subterranean formations located beneath a body of water. High-resolution seismic images of a subterranean formation are used to determine the structure of subterranean formations, discover petroleum reservoirs, and monitor petroleum reservoirs during production. A typical marine seismic survey is carried out with one or more survey vessels that tow one or more seismic sources and a number of streamers through the body of water. The survey vessel contains seismic acquisition equipment, such as navigation control, seismic source control, seismic receiver control, and recording equipment. The seismic source control controls activation of the one or more seismic sources at selected times or locations. A seismic source typically comprises an array of source elements, such as air guns, that are activated to produce an acoustic impulse. The acoustic impulse is a sound wave that spreads out in all directions. A portion of the impulse that travels down through the water and into a subterranean formation propagates as a sound wave within the subterranean formation. At each interface between different types of rock and sediment, a portion of the sound wave is refracted, a portion is transmitted, and another portion is reflected back into the body of water to propagate toward the water surface. The streamers are elongated spaced apart cable-like structures towed behind a survey vessel in the direction the survey vessel is traveling (i.e., in-line direction) and are arranged substantially parallel to one another in the direction perpendicular to the in-line direction (i.e., cross-line direction). Each streamer contains a number of seismic receivers or sensors that detect pressure and/or particle motion wavefields of the sound waves reflected back into the water from the subterranean formation. The streamers collectively form a seismic data acquisition surface. The recorded pressure and/or particle motion wavefields are processed to produce seismic images of the subterranean formation.

In a typical marine seismic survey, traces of seismic data are generated by coarsely spaced receivers. Each trace has an associated receiver coordinate in a receiver-coordinate grid, each receiver coordinate corresponding to a location in the in-line and cross-line directions. This large spacing of receivers can create spatial aliasing when adjacent receivers are separated by more than half the wavelengths of the wavefields reflected into the water from a subterranean formation. For example, traces of seismic data may be spatially aliased in the cross-line direction because distances between receivers in adjacent streamers are typically greater than half the wavelengths of the reflected wavefields. Spatial aliasing may also occur in the in-line direction when one or more receivers fail to function or sporadically record seismic data. As a result, images of a subterranean formation generated from spatial aliased seismic data contain image artifacts that do not accurately represent structural features of the subterranean formation.

In an effort to correct spatial aliasing, numerous interpolation techniques have been created to interpolate missing traces of seismic data over a denser receiver-coordinate grid. However, many of these techniques are applicable only in limited cases, require a priori information, seismic data is not spatially aliased, rely on assumptions regarding the shape of reflection events, or rely on seismic signal morphology of pre-defined transforms. For example, interpolation beyond aliasing is used to interpolate traces of seismic data from spatially aliased traces of seismic data. However, interpolation beyond aliasing is an underdetermined problem because true frequency content of the seismic data is unknown. This technique requires a priori frequency information. Other methods of interpolation beyond aliasing assume local linearity of the reflection events and interpolate in the frequency-space domain using error prediction filters (See e.g., "Seismic trace interpolation in the f-x domain," by S. Spitz, Geophysics, 56, 785-794, 1991 and "Seismic interpolation with nonstationary prediction-error filters," S. Crawley, PhD thesis, Stanford University, 2001). Other interpolation methods integrate a priori information about the seismic signal morphology via sparsity in a transformation domain. These methods rely on assumptions that a densely sampled seismic wavefield follows the morphology described by the transform. Therefore, the wavefields are expected to lie in a small sub-part of the transform domain and can be recovered using a sparse optimization process. For interpolation of spatially aliased but regularly sampled seismic data, several transforms have been developed for interpolating seismic data over a finer receiver-coordinate grid with different kinds of transforms (See e.g., (Fourier transform) "Antialiase antileakage Fourier transform," M. Schonewille and A. Klaedtke, *SEG Technical Program Expanded Abstracts,* 3249-3253, 2009 and "Convergence improvement and noise attenuation considerations for beyond alias projection onto convex sets reconstruction," Geophysical Processing, 61, 138-151, 2013; (Radon transform) "Wavefield reconstruction using a Stolt-based asymptote and apex shifted hyperbolic Radon transform," A. Ibrahim et al., *SEG Technical Program Expanded Abstracts,* 3836-3841, 2015; (curvelet transform) "Hierarchical scale curvelet interpolation of aliased seismic data," M. Naghizadeh and M. Sacchi, *SEG Technical Program Expanded Abstracts,* 3656-3661, 2010; (seislet transform) "Dealiased seismic data interpolation using seislet transform with low-frequency constraint," S. Gan et al., *SEG Technical Program Expanded Abstracts,* 3900-3904, 2015; and (focal transform) "High resolution double focal transformation and its application to data reconstruction, H. Kuscha et al., *SEG Technical Program Expanded Abstracts,* 3589-3593, 2010). Researchers, developers, and practitioners of exploration-seismology-related analytical techniques seek computationally efficient approaches to interpolate seismic data that do not depend on a priori information, the seismic data may be spatially aliased, do not rely on assumptions regarding linear or non-linear properties of the reflection events, and do not rely on seismic signal morphology of pre-defined transforms to generate accurate high-resolution images of subterranean formations.

DESCRIPTION OF THE DRAWINGS

FIG. 16 shows an example of notation that represents computation of a j-th atom of a structured dictionary.

FIG. 20 shows an example of a cover set of overlapping patches extracted from the recorded seismic data gather in FIG. 13A.

FIG. 21 shows an example of a linear combination of atoms and non-zero sparse coefficients that approximates seismic data in a patch vector.

FIG. 26A shows an example of three windows of recorded seismic data 2601-2603 of irregularly spaced traces of seismic data.

FIG. 26B shows an example of overlapping, randomly selected patches of the windows of recorded seismic data in FIG. 26A.

DETAILED DESCRIPTION

Figure 1A:
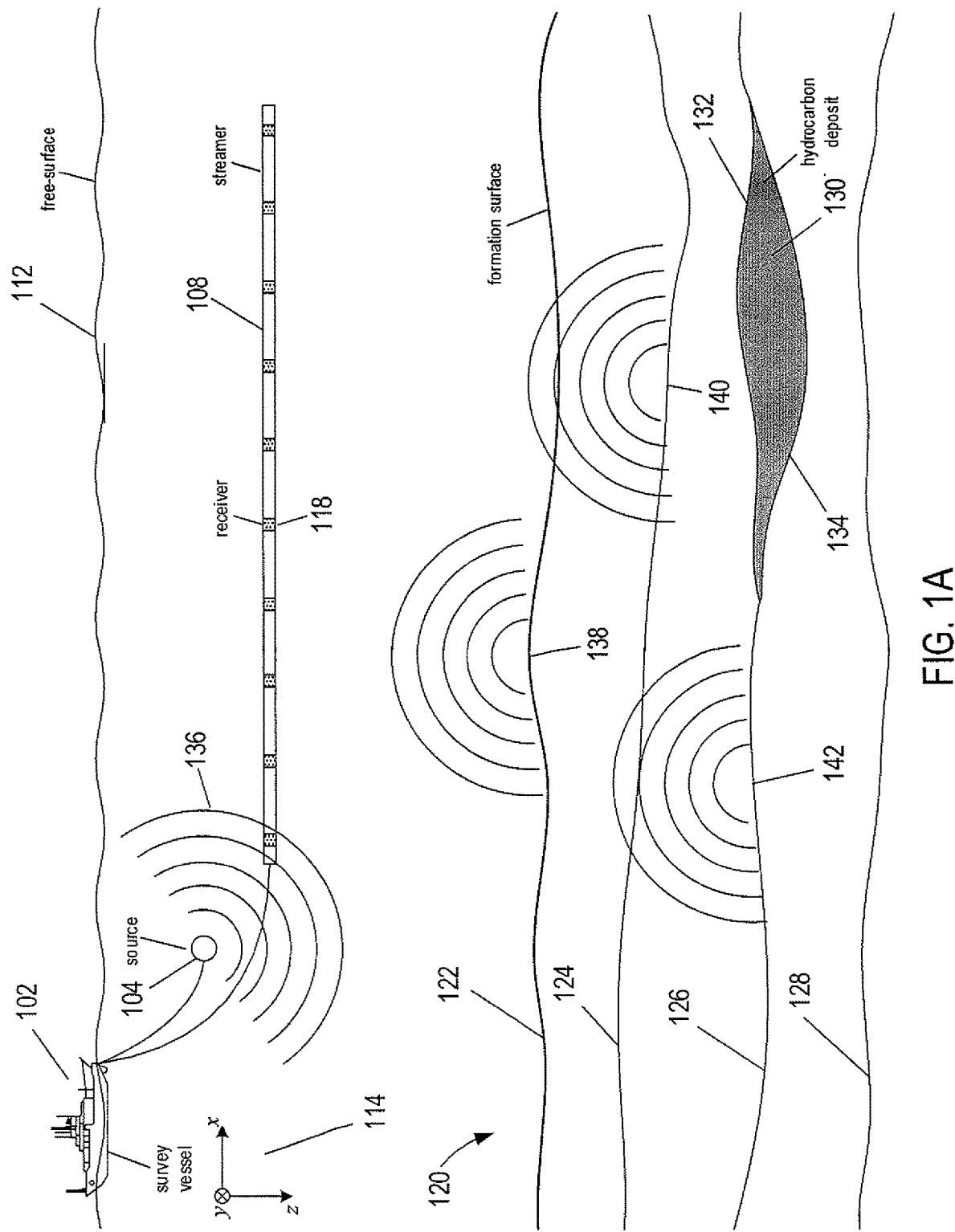
FIGS. 1A-1B show side-elevation and top views of an example seismic data acquisition system.

This disclosure is directed to processes and systems that generate seismic images of a subterranean formation from recorded seismic data gathers obtained in a marine seismic survey of the subterranean formation. The recorded seismic data gathers are typically coarsely sampled, especially in the cross-line direction, and, therefore, may be spatially aliased. The processes and systems described herein interpolate seismic data in the recorded seismic data based on structured dictionary learning. Structured dictionary learning trains a set of basis vectors, called "atoms," and corresponding sparse coefficients on patches of the recorded seismic data gather obtained from a marine seismic survey. The set of atoms is called a "dictionary." The atoms are constrained to represent linear or nonlinear reflection events in the recorded seismic data gather. The sparse coefficients are constrained by a user-selected sparsity constant. Linear combinations of the atoms are regularized and interpolated based on the shape of reflection events in the recorded seismic data gather to generate regularized and interpolated patches over a finer receiver-coordinate grid. The regularized and interpolated patches replace the original patches in the recorded seismic data gather to obtain a regularized and interpolated seismic data gather. The sparsity constraint ensures that the atoms match slopes and curves with linear and parabolic reflection events in the recorded seismic data, which prevents aliasing and reduces noise in the regularized and interpolated seismic data gather. Structured dictionary learning processes and systems can be used to reconstruct seismic data and interpolate seismic data in the in-line and cross-line directions of a receiver-coordinate grid. The regularized and interpolated seismic data gathers at finer regularly spaced receiver-coordinate grid may be used to generate high-resolution seismic images of the subterranean formation. Structured dictionary learning may also be used to extract isotropic and anisotropic wavefield parameters form the seismic data, which, in turn, can be used for applications, including model building, separation of reflections and diffractions, signal and noise separation, and imaging of the subterranean formation.

Conventional dictionary learning techniques are alternatives to pre-defining a domain transform. In conventional dictionary learning, the atoms are unstructured and do not have an analytic expression (See e.g., "Method of optimal directions for frame design," K. Engan et al., *Proceedings on 1999 IEEE International Conference on Acoustics, Speech, and Signal Processing*, pp 2443-2446, 1999; and "An algorithm for designing overcomplete dictionaries for sparse representations," M. Aharon et al., IEEE Transactions on Signal Processing, Vol. 54, 4311-4322, 2006). Conventional dictionary learning techniques determine a representation of the morphology of a redundant signal present in the seismic data to generate a dictionary that represents the seismic data in a sparse manner. The resulting dictionary is similar to and has the same role as a domain transform, but the resulting dictionary cannot be analytically expressed. Ideally, if the seismic data is represented by an analytic transform, such as a Fourier transform, the seismic data can be interpolated in another coordinate system because an analytic expression of the seismic data is known. However, such interpolation is not possible with conventional dictionary learning techniques because an analytic expression cannot be obtained from conventional dictionary learning.

In this disclosure, structured dictionary learning is used to interpolate seismic data in a regularly-spaced fine receiver-coordinate grid from coarsely sampled seismic data. The processes and systems described herein learn a dictionary in which the atoms are constrained to represent linear or nonlinear reflection events of a gather of coarsely sampled seismic data, which enables each atom to be interpolated over a finer receiver-coordinate grid than the original coarsely sampled seismic data.

Marine Seismic Surveying and Seismic Imaging

Figure 1B:
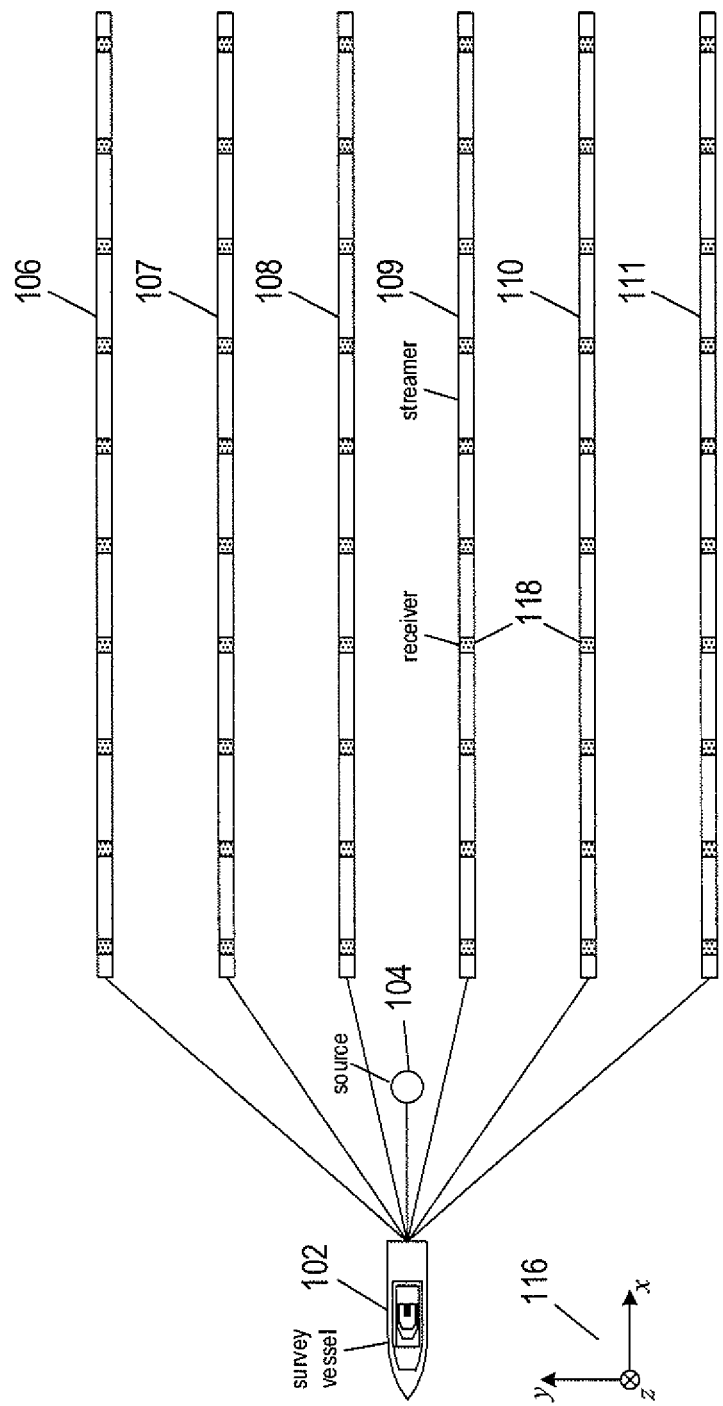

FIG. 1A includes an xz-plane 114 and FIG. 1B includes an xy-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers or in the direction the survey vessel is traveling and is referred to as the "in-line" direction. The y-direction specifies the position of a point in a direction perpendicular to the x-axis and substantially parallel to the free surface 112 and is referred to as the "cross-line" direction. The z-direction specifies the position of a point perpendicular to the xy-plane (i.e., perpendicular to the free surface 112) with the positive z-direction pointing downward away from the free surface 112. The streamers 106-111 are long cables containing power and data-transmission lines that connect receivers represented by shaded rectangles, such as receiver 118, spaced-apart along the length of each streamer to seismic acquisition equipment and data-storage devices located on board the survey vessel 102.

Streamer depth below the free surface 112 can be estimated at various locations along the streamers using depth-measuring devices attached to the streamers. For example, the depth-measuring devices can measure hydrostatic pressure or utilize acoustic distance measurements. The depth-measuring devices can be integrated with depth controllers, such as paravanes or water kites that control and maintain the depth and position of the streamers as the streamers are towed through the body of water. The depth-measuring devices are typically placed at intervals (e.g., about 300 meter intervals in some implementations) along each streamer. Note that in other implementations buoys may be attached to the streamers and used to maintain the orientation and depth of the streamers below the free surface 112.

FIG. 1A shows a cross-sectional view of the survey vessel 102 towing the source 104 above a subterranean formation 120. Curve 122, the formation surface, represents a top surface of the subterranean formation 120 located at the bottom of the body of water. The subterranean formation 120 may have a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positional coordinates of which may be determined, at least in part, by analysis of seismic data collected during a marine seismic survey. As the survey vessel 102 moves over the subterranean formation 120, the source 104 is activated (i.e., fired or shot) to produce an acoustic signal. In other implementations, the source 104 may be towed by one survey vessel and the streamers may be towed by a different survey vessel. FIG. 1A shows an acoustic signal expanding outward from the source 104 as a pressure wavefield 136 represented by semicircles of increasing radius centered at the source 104. The outwardly expanding wavefronts from the source may be spherical but are shown in vertical plane cross section in FIG. 1A. The outward and downward expanding portion of the pressure wavefield 136 and any portion of the pressure wavefield 136 reflected from the free-surface 112 are called the "source wavefield." The source wavefield eventually reaches the formation surface 122 of the subterranean formation 120, at which point the source wavefield may be partially reflected from the formation surface 122 and partially refracted downward into the subterranean formation 120, becoming elastic waves within the subterranean formation 120. In other words, in the body of water, the acoustic signal primarily comprises compressional pressure waves, or P-waves, while in the subterranean formation 120, the waves include both P-waves and transverse waves, or S-waves. Within the subterranean formation 120, at each interface between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be a reflector that becomes a potential secondary point source from which acoustic and elastic wave energy, respectively, may emanate upward toward the receivers 118 in response to the acoustic signal generated by the source 104 and downward-propagating elastic waves generated from the pressure impulse. As shown in FIG. 1A, waves of significant amplitude may be generally reflected from points on or close to the formation surface 122, such as point 138, and from points on or very close to interfaces in the subterranean formation 120, such as points 140 and 142. The upward expanding waves reflected from the subterranean formation 120 are collectively the "reflected wavefield."

The waves that compose the reflected wavefield may be generally reflected at different times within a range of times following the initial source wavefield. A point on the formation surface 122, such as the point 138, may receive a pressure disturbance from the source wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which waves are reflected from various points within the subterranean formation 120 may be related to the distance, in three-dimensional space, of the points from the activated source 104.

Acoustic and elastic waves may travel at different velocities within different materials as well as within the same material under different pressures. Therefore, the travel times of the source wavefield and reflected wavefield may be functions of distance from the source 104 as well as the materials and physical characteristics of the materials through which the wavefields travel. In addition, expanding wavefronts of the wavefields may be altered as the wavefronts cross interfaces and as the velocity of sound varies in the media traversed by the wavefront. The superposition of waves reflected from within the subterranean formation 120 in response to the source wavefield may be a generally complicated wavefield that includes information about the shapes, sizes, and material characteristics of the subterranean formation 120, including information about the shapes, sizes, and locations of the various reflecting features within the subterranean formation 120 of interest to exploration seismologists.

Subterranean formations located beneath a body of water can also be investigated using ocean bottom seismic techniques. One example of these techniques is implemented with ocean bottom cables ("OBCs"). The OBCs are similar to the towed streamer cables described above in that the OBCs include a number of spaced-apart receivers, such as receivers deployed approximately every 25 to 50 meters, but the OBCs are laid on or near the water bottom 122. The OBCs may be electronically connected to an anchored recording vessel that provides power, instrument command and control, and data telemetry of the sensor data to the recording equipment on board the vessel. Alternatively, ocean bottom seismic techniques can be implemented with autonomous systems composed of receiver nodes that are deployed and recovered using remote operated vehicles. The receiver nodes may be placed on or near the water bottom 122 in a fairly coarse grid, such as approximately 400 meters apart. Autonomous receiver systems are typically implemented using one of two types of receiver node systems. A first receiver node system is a cable system in which the receiver nodes are connected by cables to each other and are connected to an anchored recording vessel. The cabled systems have power supplied to each receiver node along a cable, and seismic data are returned to the recording vessel along the cable or using radio telemetry. A second receiver node system uses self-contained receiver nodes that have a limited power supply, but the receiver nodes typically have to be retrieved in order to download recorded seismic data. Whether using OBCs or autonomous receiver nodes, source vessels equipped with two or seismic sources as described above with reference to FIGS. 1A and 1B can be used to generate acoustic impulses at spatial and temporal intervals as the source vessels move across the free surface.

Figure 2:
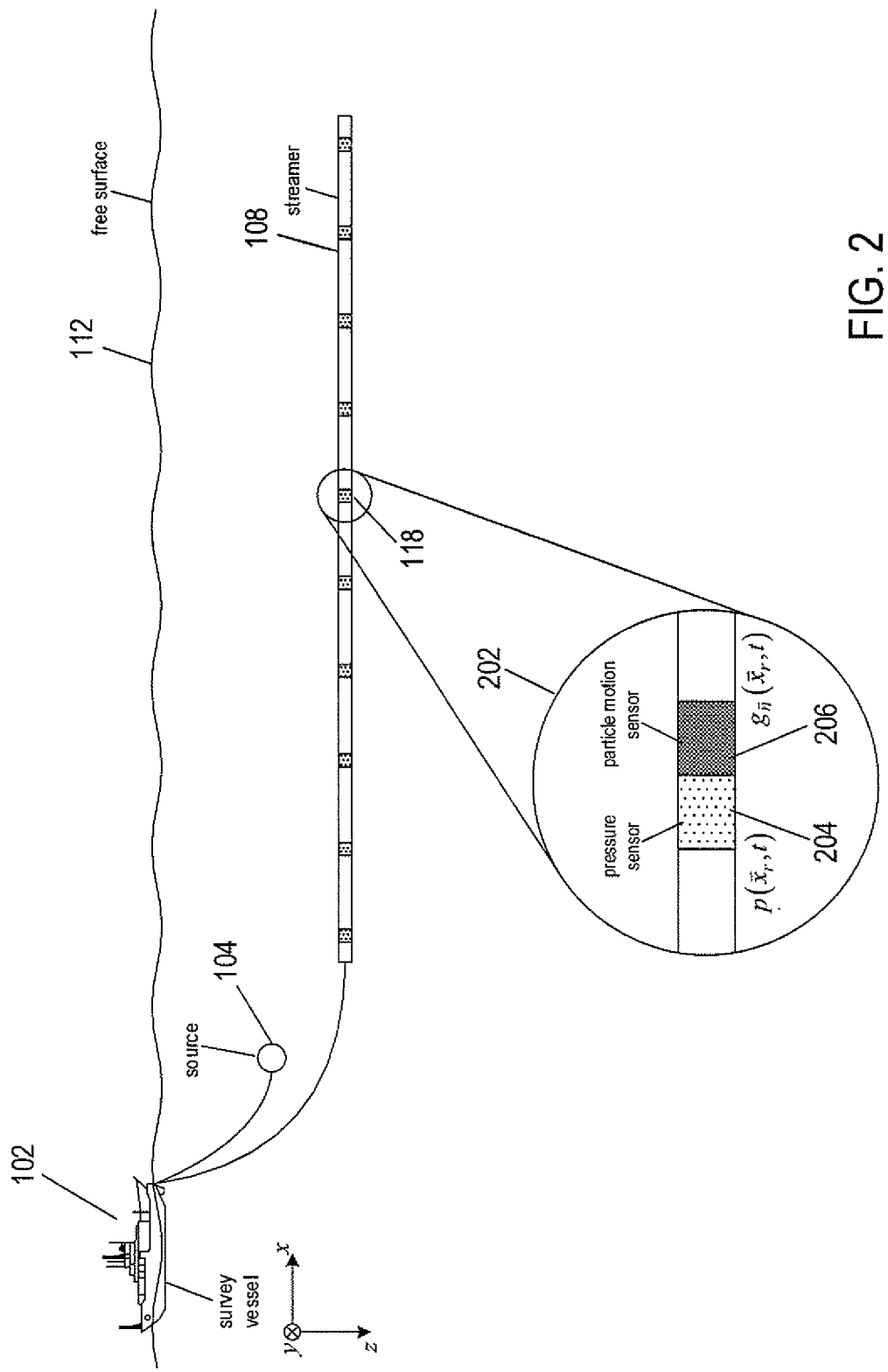
FIG. 2 shows a side-elevation view of a seismic data acquisition system with a magnified view of a receiver.

Each receiver 118 may be a multi-component sensor including particle motion sensors and a pressure sensor. A pressure sensor detects variations in water pressure over time. The term "particle motion sensor" is a general term used to refer to a sensor that may be configured to detect particle displacement, particle velocity, or particle acceleration over time. FIG. 2 shows a side-elevation view of the marine seismic data acquisition system with a magnified view 202 of the receiver 118. In this example, the magnified view 202 reveals that the receiver 118 is a multi-component sensor comprising a pressure sensor 204 and a particle motion sensor 206. The pressure sensor may be, for example, a hydrophone. Each pressure sensor is a non-directional sensor that measures changes in hydrostatic pressure over time to produce pressure data denoted by $p(\vec{x}_r, t)$, where $\vec{x}_r$ represents the Cartesian coordinates $(x_r, y_r, z_r)$ of a receiver, superscript r is a receiver index, and t represents time. The particle motion sensors may be responsive to water motion. In general, particle motion sensors detect particle motion (i.e., displacement, velocity, or acceleration) in a particular direction and may be responsive to such directional displacement of the particles, velocity of the particles, or acceleration of the particles. A particle motion sensor that measures particle displacement generates particle displacement data denoted by $g\vec{n}$ ($\vec{x}_r, t$), where the vector $\vec{n}$ represents the direction along which particle displacement is measured. A particle motion sensor that measures particle velocity (i.e., particle velocity sensor) generates particle velocity data denoted by $v\vec{n}$ ($\vec{x}_r, t$). A particle motion sensor that measures particle acceleration (i.e., accelerometer) generates particle acceleration data denoted by $a\vec{n}$ ($\vec{x}_r, t$). The data generated by one type of particle motion sensor may be converted to another type. For example, particle displacement data may be differentiated to obtain particle velocity data, and particle acceleration data may be integrated to obtain particle velocity data.

The term "particle motion data" is a general term used to refer to particle displacement data, particle velocity data, or particle acceleration data, and the term "seismic data" is used to refer to pressure data and/or particle motion data. The pressure data represents a pressure wavefield, particle displacement data represents a particle displacement wavefield, particle velocity data represents a particle velocity wavefield, and particle acceleration data represents particle acceleration wavefield. The particle displacement, velocity, and acceleration wavefields are referred to as particle motion wavefields.

The particle moon sensors are typically oriented so that the particle motion is measured in the vertical direction (i.e., $\vec{n}=(0,0,z)$) in which case $g_z(\vec{x}_r,t)$ is called vertical displacement data, $v_z(\vec{x}_r,t)$ is called vertical velocity data, and $a_z(\vec{x}_r,t)$ is called vertical acceleration data. Alternatively, each receiver may include two additional particle motion sensors that measure particle motion in two other directions, $\vec{n}_1$ and $\vec{n}_2$, that are orthogonal to $\vec{n}$ (i.e., $\vec{n}\cdot\vec{n}_1=\vec{n}\cdot\vec{n}_2=0$, where "·" is the scalar product) and orthogonal to one another (i.e., $\vec{n}_1\cdot\vec{n}_2=0$). In other words, each receiver may include three particle motion sensors that measure particle motion in three orthogonal directions. For example, in addition to having a particle motion sensor that measures particle velocity in the z-direction to give $v_z(\vec{x}_r,t)$, each receiver may include a particle motion sensor that measures the wavefield in the in-line direction in order to obtain the in-line velocity data, $v_x(\vec{x}_r,t)$, and a particle motion sensor that measures the wavefield in the cross-line direction in order to obtain the cross-line velocity data, $v_y(\vec{x}_r,t)$. In certain implementations, the receivers may be only pressure sensors, and in other implementations, the re e be only particle motion sensors. The three orthogonal velocity data sets form a velocity vector $\vec{v}=(v_x,v_y,v_z)$.

The streamers 106-111 and the survey vessel 102 may include sensing electronics and data-processing facilities that allow seismic data generated by each receiver to be correlated with the time each source of the source 104 is activated, absolute positions on the free surface 112, and absolute three-dimensional positions with respect to an arbitrary three-dimensional coordinate system. The pressure data and particle motion data may be stored at the receiver, and/or may be sent along the streamers and data transmission cables to the survey vessel 102, where the data may be stored electronically or magnetically on data-storage devices located onboard the survey vessel 102 and/or transmitted onshore to a seismic data-processing facility.

Each pressure sensor and particle motion sensor may include an analog-to-digital converter that converts time-dependent analog signals into discrete time series that consist of a number of consecutively measured values called "amplitudes" separated in time by a sample rate. The time series data generated by a pressure or particle motion sensor is called a "trace," which may consist of thousands of samples collected at a typical sample rate of about 1 to 5 samples per millisecond. A trace is a recording of a subterranean formation response to acoustic energy that passes from an activated source, into the subterranean formation where a portion of the acoustic energy is reflected and/or refracted, and ultimately detected by a sensor as described above. A trace records variations in a time-dependent amplitude that corresponds to fluctuations in acoustic energy of the wavefield measured by the sensor. In general, each trace is an ordered set of discrete spatial and time-dependent pressure or motion sensor amplitudes denoted by:

$$tr(t,\vec{x}_r,\vec{x}_s)=\{A(t_j,\vec{x}_r,\vec{x}_s)\}_{j=0}^{J-1} \quad (1)$$

where
tr represents pressure, particle displacement, particle velocity, or particle acceleration amplitude;
A represents amplitude;
$t_j$ is the j-th sample time; and
J is the number of time samples in the trace.

The coordinate location $\vec{x}_r$ of each receiver may be calculated from global position information obtained from one or more global positioning devices located along the streamers, survey vessel, and buoys and the known geometry and arrangement of the streamers and receivers. The receiver coordinates are grid points in a receiver-coordinate grid. The coordinate location $\vec{x}_s$ of the source 104 may also be obtained from one or more global positioning devices located at each source and the known geometry and arrangement of source elements of the source 104. Each trace also includes a trace header not represented in Equation (1) that identifies the specific receiver that generated the trace, receiver and source GPS spatial coordinates, and may include time sample rate and the number of time samples.

As explained above, the reflected wavefield typically arrives first at the receivers located closest to the sources. The distance from the sources to a receiver is called the "source-receiver offset," or simply "offset." A larger offset generally results in a longer arrival time delay. The traces are collected to form a "gather" that can be further processed using various seismic data processing techniques to obtain information about the structure of the subterranean formation. The traces may be sorted into different domains, such as a common-shot domain, common-receiver domain, common-receiver-station domain, and common-midpoint domain. For example, a collection of traces sorted into the common-shot domain are called a common-shot gather and a collection of traces sorted into common-receiver domain are called a common-receiver gather.

Figure 3:
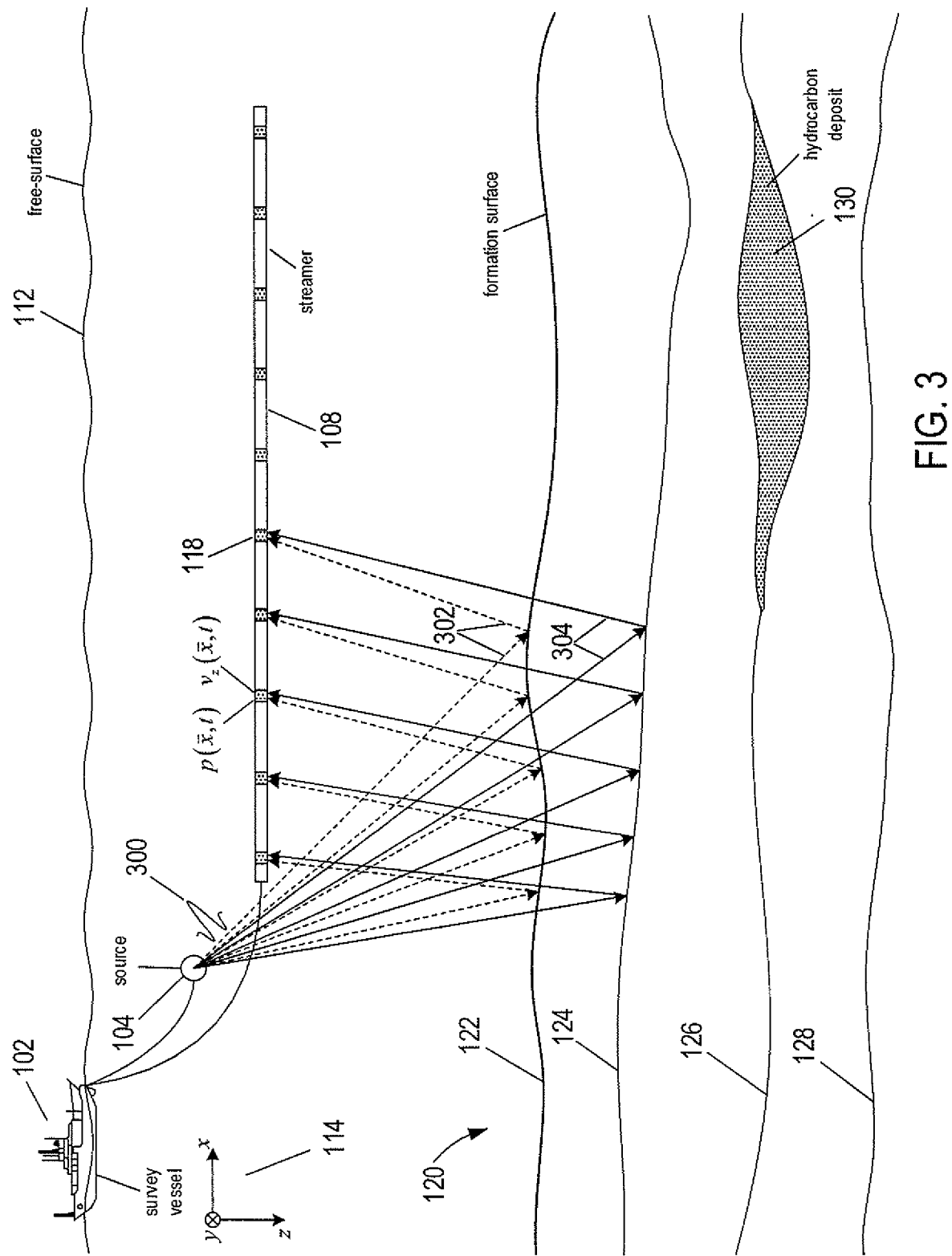
FIG. 3 shows example ray paths of an acoustic signal that travels from a source to surfaces of a subterranean formation.

FIG. 3 shows example ray paths of an acoustic signal 400 that travels from the source 104 into the subterranean formation 120. Dashed-line rays, such as rays 302, represent acoustic energy reflected from the formation surface 122 to receivers 118 located along the streamer 108, and solid-line rays, such as rays 304, represent acoustic energy reflected from the interface 124 to the receivers 118 located along the streamer 108. Note that for simplicity of illustration a small number of ray paths are represented. In the example of FIG. 3, the particle motion sensors located at each receiver 118 measures vertical particle velocity of the wavefield emanating from the subterranean formation 120 in response to the acoustic signal 300. The pressure data and vertical velocity data generated at each receiver 118 may be time sampled and recorded as separate traces. In the example of FIG. 3, the collection of traces generated by the receivers 118 along the streamer 108 for a single activation of the source 104 may be collected to form a "common-shot gather." The traces generated by the receivers located along each of the other five streamers for the same activation may be collected to form separate common-shot gathers, each gather associated with one of the streamers.

Figure 4:
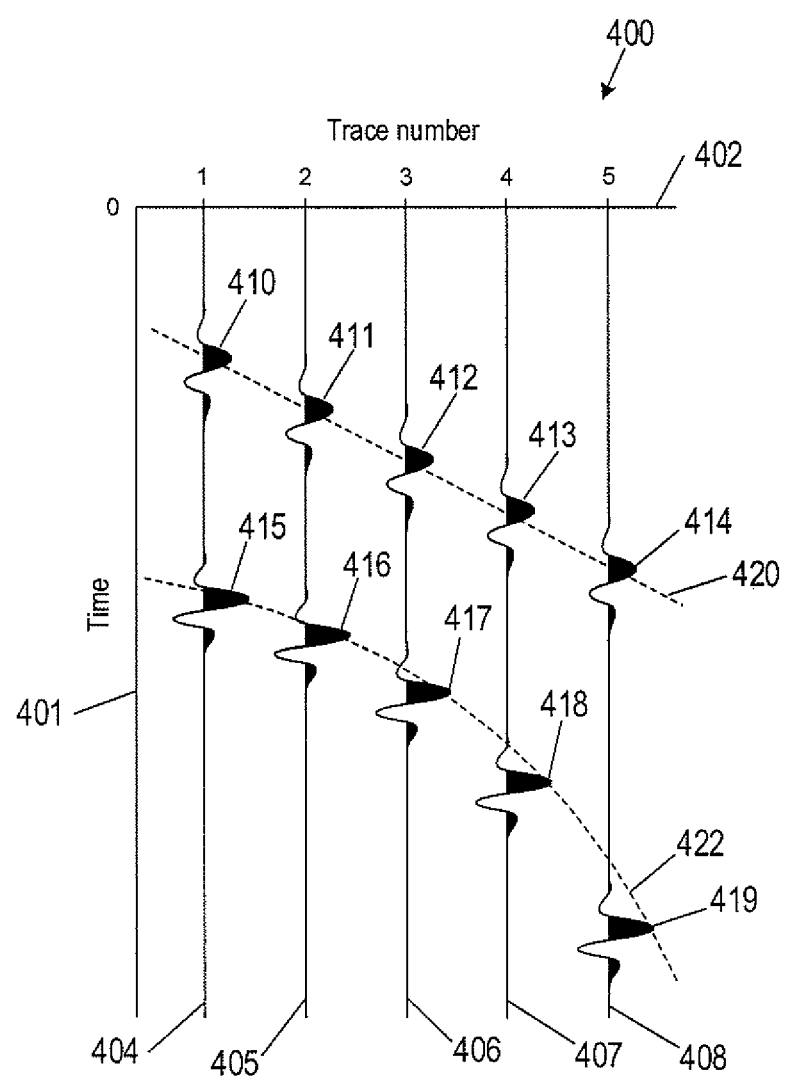
FIG. 4 shows a common-shot gather of a reflected wavefield measured by five adjacent receivers located along a streamer.

FIG. 4 shows an example common-shot gather 400 of five example traces of a reflected wavefield measured by five adjacent receivers located along the streamer 108 shown in FIG. 3. Vertical axis 401 represents time. Horizontal axis 402 represents trace numbers with trace "1" representing the seismic data generated by the receiver 118 located closest to the source 104 and trace "5" representing the seismic data generated by the receiver 118 located farther away from the source 104. The traces 404-408 may represent variation in the amplitude of either the pressure data or the particle motion data measured by corresponding sensors of the five receivers 118. The example traces include wavelets or pulses 410-419 that represent the portion of the wavefield reflected from the formation surface 122 and interface 124 of the subterranean formation measured by the pressure sensors or particle motion sensors. Peaks, colored black, and troughs of each trace represent changes in the amplitude. The distances along the traces 404-408 from time zero to the wavelets 410-414 represent two-way travel times of the acoustic energy output from the source 104 to the formation surface 122 and to the receivers 118 located along the streamer 108. Wavelets 415-419 represent longer two-way travel times of the acoustic energy output from the source 104 to the interface 124 and to the same receivers 118 located along the streamer 108. The amplitude of the peak or trough of the wavelets 410-419 indicates the magnitude of the reflected acoustic energy recorded by the receivers 118.

The arrival times versus source-receiver offset is generally longer with increasing source-receiver offset. As a result, the wavelets that correspond to a formation surface, or a subterranean interface, are collectively called a "reflection event." The reflection events in common-shot gather 400 are examples of linear and parabolic reflection events. Line 420 represents the wavelets 410-414 recorded in the gather as a linear reflection event. Curve 422 represents the wavelets 415-419 recorded in the gather as a parabolic reflection event.

Figure 5:
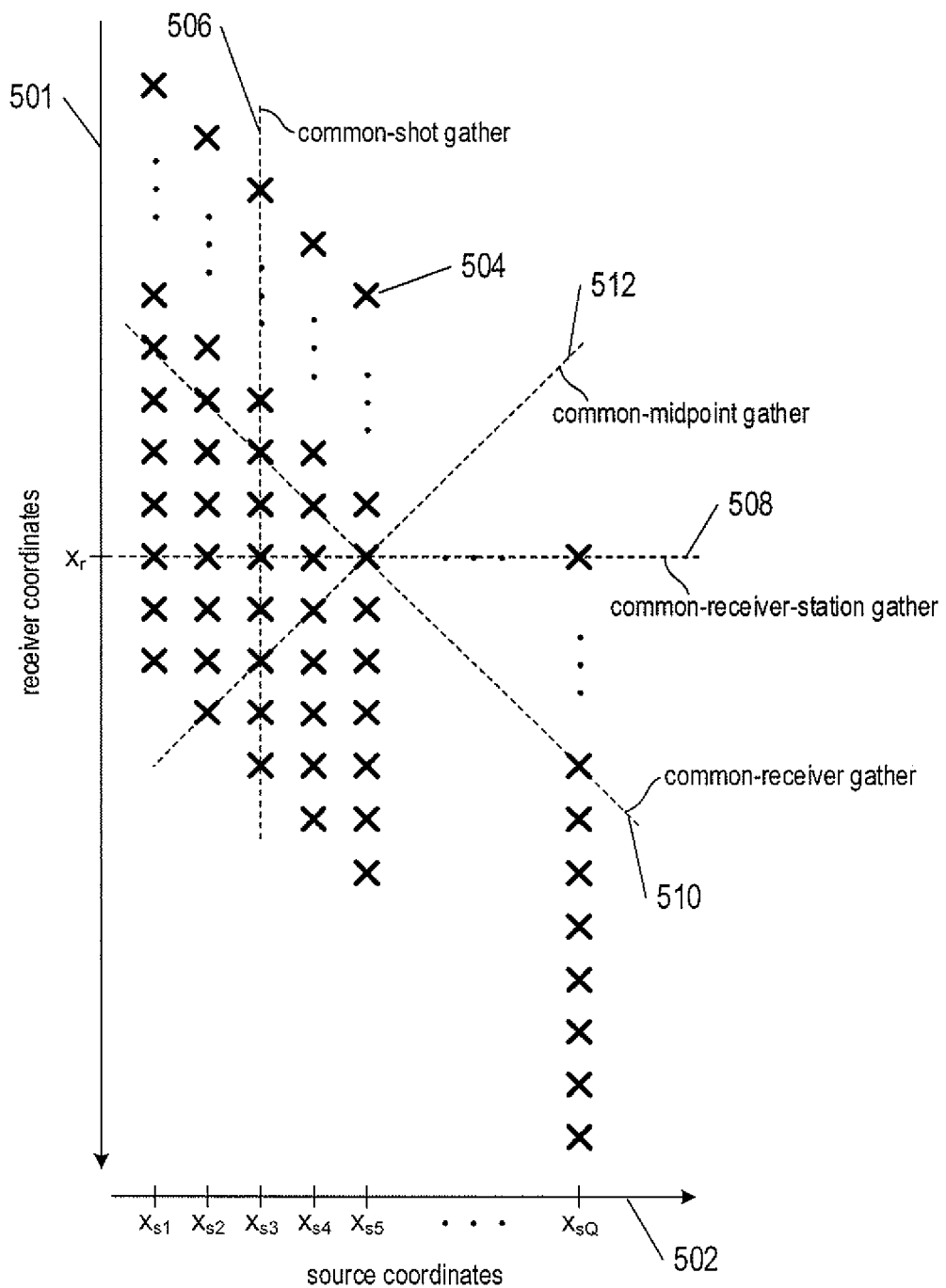
FIG. 5 shows a plot of different ways seismic data may be sorted into different domains.

The pressure and vertical velocity data recorded in a time or spatial interval may be sorted into any one of many different domains, including the common-shot domain, common-receiver-station domain, common-midpoint domain, and common-receiver domain. FIG. 5 shows a plot of different ways seismic data may be sorted into different domains. Vertical axis 501 is an in-line receiver coordinate axis, and horizontal axis 502 is an in-line source coordinate axis. Each X, such as X 504, represents a receiver-coordinate location when the source is activated at a source-coordinate location. A dashed line 506 identifies the receiver-coordinate locations of receivers in the same streamer. A common-shot gather is formed from the seismic data generated by the receivers when the source is activated at source-coordinate location $x_{s3}$. A dashed line 508 identifies a receiver-coordinate location, $x_r$, called a "common-receiver station," where different receivers are located when the source is activated at the Q different source-coordinate locations. The seismic data generated by the receivers that are approximately located at the common-receiver station $x_r$, for each activation of the source are collected to form a common-receiver-station gather. Seismic data generated by receivers at the receiver-coordinate locations along diagonal dashed line 510 are collected to form a common-receiver gather. Seismic data generated by receivers at the receiver-coordinate locations along a diagonal represented by dashed line 512 are collected to form a common-midpoint ("CMP") gather. The CMP is the point on the formation surface halfway between the location of the source and the receiver and is the same for a number of source-receiver pairs. This redundancy of source-receiver pairs often increases the quality of stacked seismic data. The CMP is not to be confused with common depth points that are located directly below the CMP at interfaces within the subterranean formation.

Seismic data processing is applied to the recorded seismic data to generate an image of a subterranean formation surveyed in a marine seismic survey. Seismic data processing is typically implemented in a series of modules or routines, each module comprising a series of computer implemented machine-readable instructions. The output of one module is input to a subsequent module. For example, seismic data processing comprises modules that attenuate the various forms of noise, regularize the coordinate locations of the traces, interpolate missing or corrupted seismic data, and migrate the seismic data to generate an image of the subterranean formation.

Figure 6:
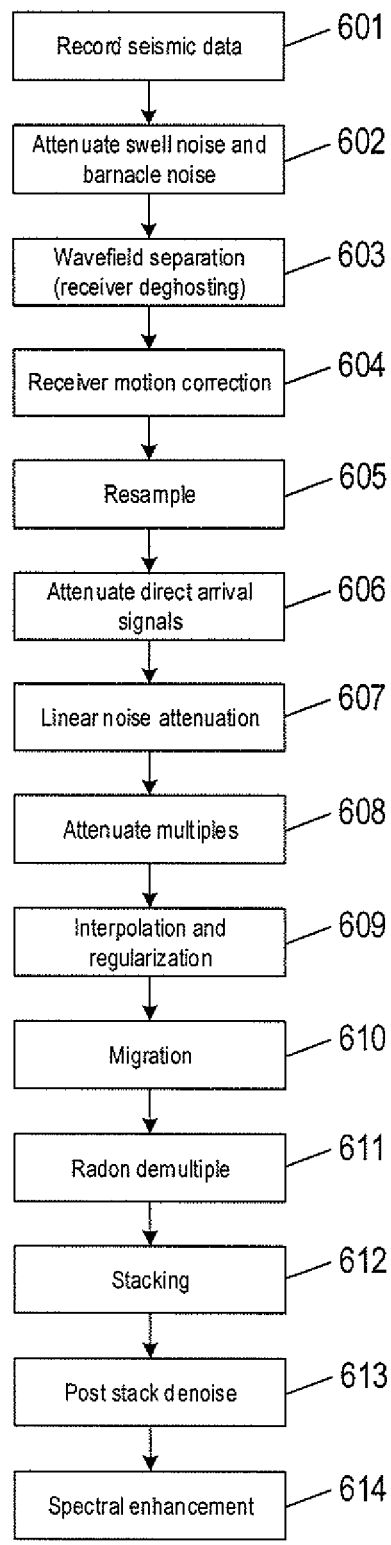
FIG. 6 shows an example series of seismic data processing modules that may be applied to recorded seismic data to generate an image of a subterranean formation.

FIG. 6 shows an example series of seismic data processing modules that may be applied to recorded seismic data collected in a marine seismic survey of a subterranean formation described above to generate an image of the subterranean formation. Each block represents a different module of computer implemented machine-readable instructions stored in one or more data-storage devices and executed using one or more processors of computer system. It should be noted that the series of modules represented in FIG. 6 is not an exhaustive list of the modules used to compute an image of a subterranean formation from recorded seismic data. The series of modules are representative of computer implemented instructions used to generate an image of a subterranean formation from recorded seismic data. Processing of recorded seismic data to generate an image of a subterranean formation may include additional modules or certain modules may be omitted, depending on how the recorded seismic data is collected, conditions under which the recorded seismic data is collected, and depth of the body of water above the subterranean formation.

In FIG. 6, block 601 represents recording seismic data as described above with reference to FIGS. 1A-5. The recorded seismic data may be pressure data recorded using receivers configured with pressure sensors alone or the recorded seismic data may be pressure and particle motion data recorded using receivers configured with collocated pressure and particle motion sensors. In block 602, swell noise and barnacle noise in the recorded seismic data is attenuated. In block 603, when the recorded seismic data is measured with pressure and particle motion sensors, the particle motion data is used to separate, or decompose, the pressure data into up-going and down-going pressure data. The up-going pressure data represents pressure wavefields traveling upward from the subterranean formation toward the receivers. The down-going pressure data represents pressure wavefields reflected downward from the free surface toward to the receivers. A down-going pressure wavefield is called a receiver ghost and is typically considered an echo. If the down-going pressure wavefield is not removed or attenuated, the down-going pressure wavefield recorded in the seismic data creates a ghost image of the subterranean formation within the final image of the subterranean formation. As a result, the down-going pressure wavefield is removed in block 603. When the recorded seismic data comprises pressure data alone, receiver de-ghosting is used to attenuate the down-going pressure wavefield of the pressure data to obtain the up-going pressure data. Seismic data processing continues with the up-going pressure data. In block 604, because the receivers are moving during recording of the wavefield, receiver-motion correction is applied to the up-going seismic data to correct for receiver motion that occurred during the survey. In block 605, the up-going seismic data is resampled. For example, the traces of up-going seismic data may be resampled to have the same sampling rate, such as a sample rate of 4 data points per millisecond. In block 606, direct arrival signal attenuation is applied to the resampled, up-going seismic data to attenuate a source wavefield that travels directly from the source to the receivers and source wavefield reflections from the free surface. In block 607, linear noise in the resampled, up-going seismic data is attenuated by modeling linear noise in the seismic data followed by subtracting the modeled linear noise from the resampled, up-going seismic data. In block 608, multiples may be attenuated in the resampled, up-going seismic data. The resulting seismic data represents the primary reflected wavefields from the subterranean formation. Because the receivers undulate during seismic data recording, the receiver coordinates of the traces of seismic data are not regularly spaced during recording of the seismic data. In block 609, regularization and interpolation may be applied to the resampled, up-going seismic data. Regularization corrects irregularly spaced receiver coordinates of the traces to points of a regularly spaced grid of receiver coordinates. Interpolation replaces corrupted traces or fills in traces of the resampled, up-going seismic data at regular grid points, such as interpolating traces of seismic data from traces of coarsely sampled seismic data in the cross-line direction where receivers are spaced farther apart than in the in-line direction. In block 610, migration is applied to the resampled, up-going seismic data in either the space-time coordinate system (i.e., time migration) or Cartesian coordinate system (i.e., depth migration) to obtain migrated seismic data or an image of the subterranean formation. Time and depth migration techniques compute a velocity field (e.g., using Dix conversion, time-to-depth conversion, or any other migration velocity analysis technique) that is used to re-locate reflection events recorded in the seismic data in either time or depth to the location where the reflection event occurred within the subterranean formation, thereby resulting in a more accurate image of dips and orientations of interfaces within the subterranean formation. Time migration is typically used with vertically varying velocities and does not account for ray bending at interfaces. On the other hand, depth migration accounts for ray bending at interfaces but requires an accurate velocity field model. Depth migration is typically used when there is lateral variation in the velocity field. Blocks 611-613 represent post processing techniques that may be applied to further enhance and increase the resolution of the seismic image obtained in block 610. In block 611, a higher-resolution de-multiples attenuation process, called "Radon demultiple," may be applied to the migrated seismic data to further attenuate multiples recorded in the migrated seismic data. In block 612, the image of the subterranean formation obtained in block 611 may be stacked using an averaging process that combines offset-dependent migrated seismic data to obtain post-stacked migrated ("PSM") seismic data, which increases the clarity of the final seismic image by decreasing random noise content across the offsets. In block 613, post-stack denoising may be applied to the image to further reduce random noise content.

Sparse Representation Problem Applied to a Recorded Signal

The sparse representation problem determines a sparse representation of a recorded signal, denoted by $\vec{y}$, as a linear combination of unit column vectors called "atoms" and a sparse coefficient vector, denoted by $\vec{x}$. The atoms form the columns of a matrix D called the dictionary. The sparse representation of the recorded sign $\vec{y}$ is given by $D\vec{x}$. The dictionary D is known and a sparse coefficient vector $\vec{x}$ is unknown and obtained by solving a sparse optimization problem expressed as follows:

$$\min_{\vec{x}} \|\vec{y} - D\vec{x}\|_2^2 \text{ subject to the constraint that } \|\vec{x}\|_0 \leq L \quad (2)$$

where $\|\cdot\|_2$ is an L-2 norm;

$\|\cdot\|_0$ is the number of non-zero elements in a vector, e.g., the sparse coefficient vector $\vec{x}$; and L is a user-selected limit, called a sparsity constant, on the number of non-zero elements in the sparse coefficient vector $\vec{x}$, The recorded signal $\vec{y}$ has N elements (i.e., $\vec{y} \in \mathbb{R}^N$). The dictionary is given by $$D = [\vec{a}_1 \vec{a}_2 \ldots \vec{a}_K] \quad (3)$$

The K columns of the dictionary D are atoms denoted by $\vec{a}_1, \vec{a}_2, \ldots, \vec{a}_K$ that are each unit column vectors with N elements (i.e., $\vec{a}_k \in \mathbb{R}^N$). In other words, the dictionary is an N×K matrix. The sparse coefficient vector $\vec{x}$ is a column vector that comprises K elements (i.e., $\vec{x} \in \mathbb{R}^K$). The sparse optimization problem of Equation (2) may be solved to determine the sparse coefficient vector $\vec{x}$ using a matching pursuit technique, such as orthogonal matching pursuit ("OMP") (For a description of OMP, see e.g., "Orthogonal matching pursuit: recursive function approximation with applications to wavelet decomposition," Y. C. Pati et al., *Proceedings of the 27th Annual Asilomar Conference on Signals, Systems, and Computers*, pp. 40-44, 1993). A matching pursuit technique determines a best matching projection of multidimensional data onto a span of an over-complete dictionary. Other techniques for computing the dictionary and sparse coefficient vector as described above with reference to Equation (2) include "Cosamp: Iterative signal recovery from incomplete and inaccurate samples," by D. Needell and J. Tropp, *Applied and Computational Harmonic Analysis*, vol. 26, pp. 301-321, 2009; "Adaptive greedy approximations," by G. Davis, et al., *Avellaneda Constructive Approximation*, vol. 13, pp. 57-98, 1997; and "Sparse solution of underdetermined systems of linear equations by stagewise orthogonal matching pursuit," by D. L. Donoho et al., *IEEE Transactions on Information Theory*, vol. 58, pp. 1094-1121, 2012.

Dictionary Learning

In contrast to the sparse representation problem, in dictionary learning, the dictionary and the sparse coefficient vector are unknown. Dictionary learning techniques are directed to determining atoms of a dictionary and the sparse coefficient vector from recorded signals. For seismic data, dictionary learning may be applied to two-dimensional seismic data gathers. The atoms represent the shape or contour of reflection events in recorded seismic data and may be used to compute a sparse and accurate representation of the recorded seismic data. Dictionary learning is carried out by extracting M patches of a two-dimensional seismic data gather, where M is a positive integer. Each patch comprises segments of adjacent traces of the two-dimensional seismic data gather. Each segment of a patch contains seismic data in the same time interval. Each patch is vectorized to obtain a set of M patch vectors, denoted by $\vec{y}_1$, $\vec{y}_2, \ldots, \vec{y}_M$. The set of M patch vectors are the training set for learning the dictionary and a sparse coefficient matrix.

Figure 7:
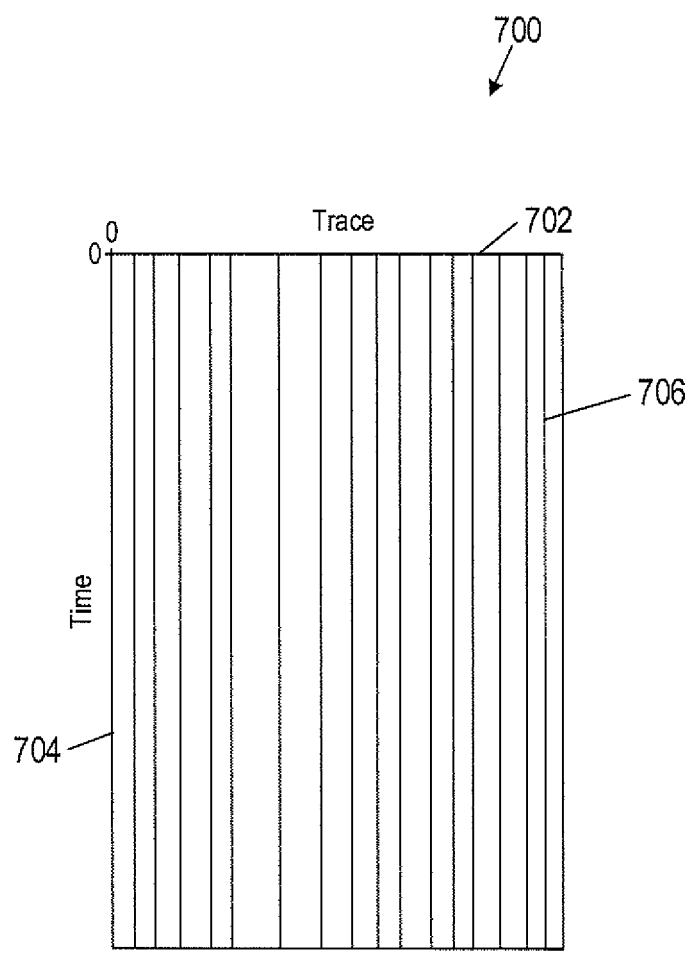
FIG. 7 shows an example of a recorded seismic data gather.

FIG. 7 shows an example of a recorded seismic data gather 700 of 18 traces. Horizontal axis 702 represents trace coordinates (i.e., receiver coordinates) or channel number indices of the traces. Vertical axis 704 represents time. Vertical lines, such as vertical line 706, represent traces of seismic data generated by either pressure sensors or particle motion sensors. The traces of seismic data shown in the example of FIG. 7 may have been obtained from sorting a three-dimensional set of seismic data into one of many different domains described above with reference to FIG. 5.

Figure 8:
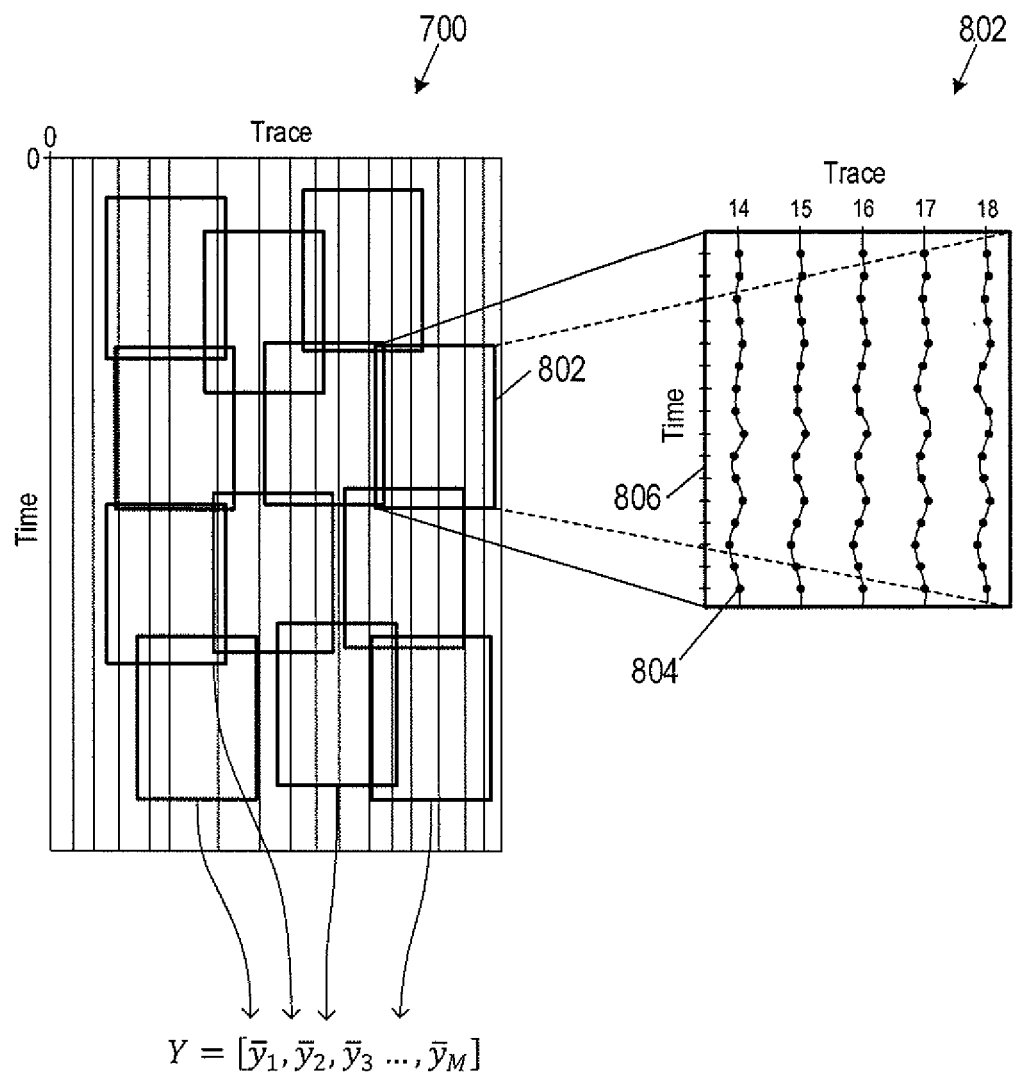
FIG. 8 shows an example of patches of the seismic data gather in FIG. 7.

FIG. 8 shows an example set of patches of the seismic data gather shown in FIG. 7. The patches may be randomly selected over the full seismic data gather. In FIG. 8, each patch of seismic data is represented by a rectangle, such as rectangle 802, that encloses segments of adjacent traces of seismic data in a time interval. For example, FIG. 8 shows an enlarged view of a patch 802. Patch 802 contains five segments of adjacent traces 14-18. In the enlarged view, the segments are represented by wiggle lines that represent variations in the amplitudes at time samples represented by dots, such as dot 804, recorded in a time interval 806.

Figure 9:
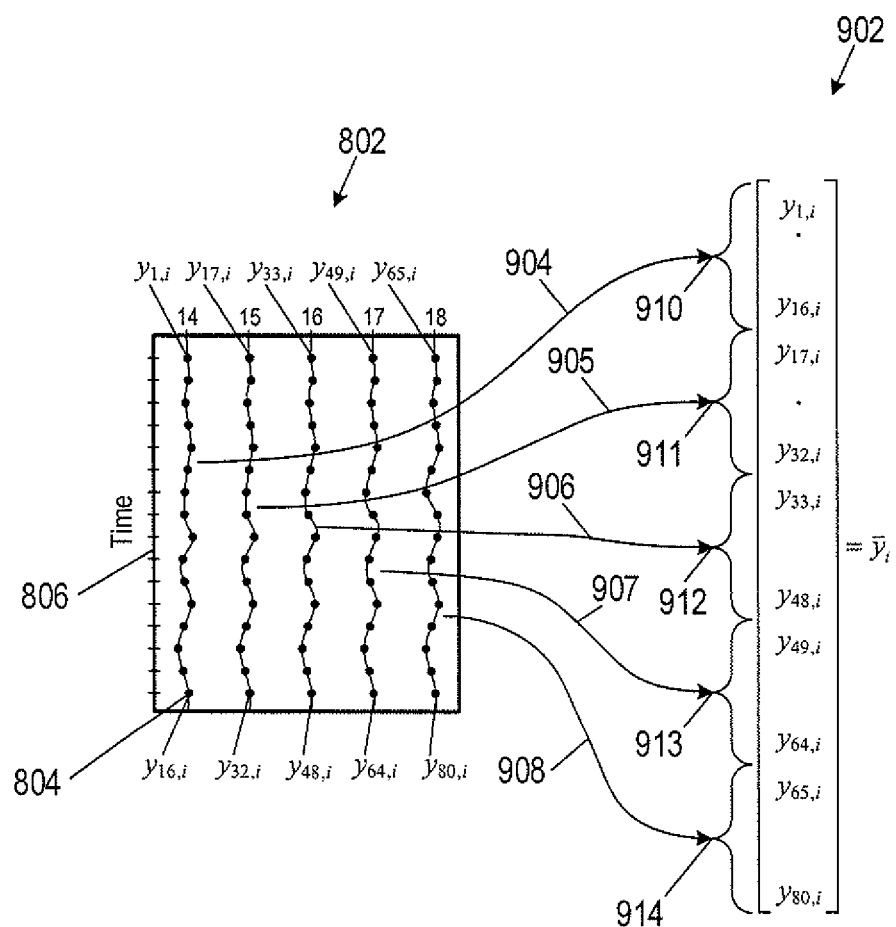
FIG. 9 shows an example of vectorizing a patch of seismic data to obtain a column patch vector.

FIG. 9 shows an example of vectorizing the patch 802 of seismic data shown in FIG. 8A to obtain a column patch vector 902 denoted by $\vec{y}$. Vectorization is a transformation that maps amplitudes of each trace in a patch to a different section of a column patch vector. In the example of FIG. 9, the patch 802 contains segments of the five adjacent traces 14-18 with seismic data in the same time interval 806, where each segment contains 16 amplitudes of the traces 14-18. For example, $y_{i,1} = y_i(t_1, o_1)$ is the amplitude recorded at time $t_1$ at receiver coordinate $o_1$ and $y_{i,16} = y_i(t_{16}, o_{16})$ is the amplitude recorded at time $t_{16}$ at receiver coordinate $o_{16}$ of the segment of the trace 14 contained in the time interval 806 of the patch 802. Directional arrows 904-908 represent mapping the five segments of the traces 14-18 to five sections 910-914 of the patch vector $\vec{y}_i$, respectively.

Given a set of M patch vectors $\vec{y}_1, \vec{y}_2, \ldots, \vec{y}_M$, conventional dictionary learning computes a dictionary $D \in \mathbb{R}^{N \times K}$ and sparse coefficient vectors $\vec{x}_1, \vec{x}_2, \ldots, \vec{x}_M$ that minimize a sparse optimization problem:

$$\min_{\{\vec{x}_i\}_{i=1}^M, D} \sum_{i}^{M} \|\vec{y}_i - D\vec{x}_i\|_2^2 \text{ subject to the constraint that} \quad (5)$$

$$\|\vec{x}_i\|_0 \leq L \text{ for } i = 1, \ldots, M$$

where K<<M.

Note that because there are no constraints on the dictionary D, the learned atoms are unstructured. As a result, conventional dictionary methods cannot be used to interpolate seismic data.

Interpolation of Seismic Data with Structured Dictionary Learning

Processes described herein are directed to applying structured dictionary learning to execute the interpolation and regularization module 609 of the seismic data processing described above with reference to FIG. 6 and obtain high-resolution seismic images of a subterranean formation. Structured dictionary learning imposes additional constraints that force learned atoms of a structured dictionary to represent reflection events recorded in seismic data gathers. Unlike conventional dictionary learning, the atoms generated by structured dictionary learning enable interpolation of regularly sampled seismic data over a finer receiver-coordinate grid and enable interpolation and regularization of coarse and irregularly sampled data over a finer receiver-coordinate grid. The atoms represent actual reflection events in recorded seismic data gathers. The reflection events may be linear or parabolic and are defined by corresponding reflection event parameters.

Structured dictionary learning may be expressed as finding a dictionary of atoms and spatial coefficient vectors that satisfy:

$$\min_{\{\vec{x}_i\}_{i=1}^M, \{\vec{a}_j\}_{j=1}^K} L(D, X) = \min_{\{\vec{x}_i\}_{i=1}^M, \{\vec{a}_j\}_{j=1}^K} \sum_{i=1}^{M} \sum_{n=1}^{N} \left( y_{n,i} - \sum_{j=1}^{K} x_{j,i} a_j(t_n, o_n) \right)^2 \quad (6a)$$

where $y_{n,i}$ is the n-th element of the i-th patch vector $\vec{y}_i$ (i.e., $y_i(t_n, o_n)$);

$x_{j,i}$ is the j-th element of i-th spatial coefficient vector $\vec{x}_i$; and $a_j(t_n, o_n)$ is the n-th element of the j-th atom, $\vec{a}_j$, at time $t_n$ and receiver coordinate $o_n$.

Structured dictionary learning of Equation (6a) is executed by minimizing a cost function, L(D,X), subject to the following two constraints. First, each sparse coefficient vector is subject to the constraint:

$$\|\vec{x}_i\|_0 \leq L \quad (6b)$$

Second, the elements, $a_j(t_n, o_n)$, of the atoms, $\vec{a}_j$, in the dictionary D are constrained by various geometrical structures of the reflection events represented in the recorded seismic data gather and are determined based on the morphology or shape of the reflection events. Each atom represents a geometric structure of a reflections event. The geometrical structure of a reflection event may be linear or parabolic. As a result, linear, parabolic, hyperbolic, and cubic polynomials are computed, as described below, to represent the geometric structures of these reflection events. Processes described below are directed to structured dictionary learning with atoms representing linear or parabolic reflection events.

In Equation (6a), the cost function L(D,X) is a quadratic error with respect to using the structured dictionary D to represent the training set Y. As a result, minimizing the cost function L(D,X) imposes the constraint that the atoms of the dictionary represent reflection events in the seismic data in the training set Y. There are two constraints that are imposed while minimizing the cost function. The first constraint represented by Equation (6b) is on the sparsity of the sparse coefficient vectors. The sparsity constant L limits representation of each patch to at most L atoms. The threshold L in Equation (6b) is user-defined and balances a sparse representation of the training set when L is small with a more accurate representation of the training set when L is large. The second constraint in minimizing the cost function relates to the geometrical structure of the atoms, which corresponds, as described herein, to linear or parabolic reflection events in the recorded seismic data gather. If linear reflection events are present in the seismic data gathers, each atom $\vec{a}_j$ is constrained to contain a linear reflection event. If parabolic reflection events are present m the seismic data gathers, each atom $\vec{a}_j$ is constrained to contain a parabolic reflection event.

A linear reflection event in a recorded seismic data gather is represented by a slope parameter, denoted by s. Processes are directed to learning atoms constrained to represent linear reflection events that are constant along the slopes of the linear reflection events in a recorded seismic data gather. Let $s_j$ represent a slope of a linear reflection event. Processes described below use structured dictionary learning to obtain an atom $\vec{a}_j$ with a corresponding linear reflection event of slope $s_j$. A linear interpolation function that receives as input a time sample, t, and a receiver coordinate, $o_j^{ref}$, interpolates an amplitude at a different point along a linear reflection event with slope $s_j$ and is given by:

$$a_j(t, o_j^{ref}) = a_j(t + s_j \Delta o, o_j^{ref} + \Delta o) \quad (6c)$$

where $o_j^{ref}$ is also called a "reference coordinate;"

$\Delta o$ is a spatial variation or shift from the reference coordinate; and t is a time sample of amplitude measurement.

The slope parameter $s_j$ is not predefined. The slope parameter $s_j$ is computed, as described below, by minimizing the cost function in Equation (6a) constrained to linear reflection events. The learned atoms are continuously defined in space via linear time moveout by interpolating amplitudes of wavelets of the atoms using Equation (6c).

Figure 10A:
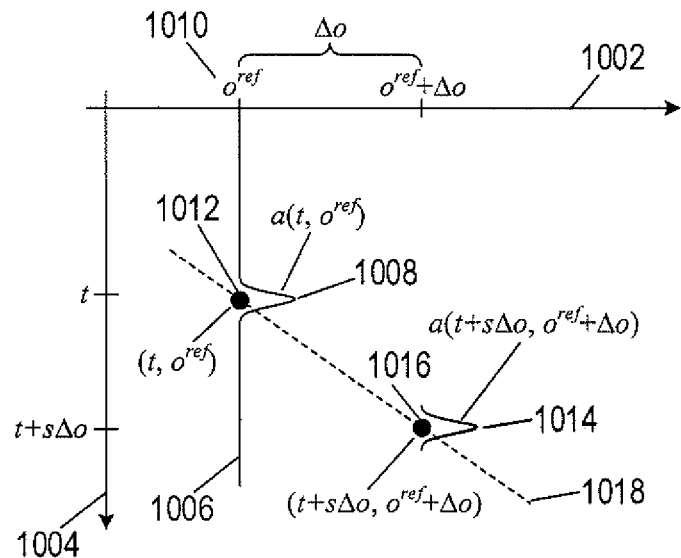
FIG. 10A shows a plot of a wavelet interpolated along a line from a wavelet in a trace.

FIG. 10A shows a plot of a wavelet interpolated along a line of slope s from a recorded wavelet in a single trace. Horizontal axis 1002 represents receiver coordinates. Vertical axis 1004 represents time. A line 1006 with a wavelet 1008 represents a portion of a trace with receiver coordinate 1010. The notation $a(t, o^{ref})$ represents the amplitude of the wavelet 1008 centered at time sample t and receiver coordinate $o_{ref}$ identified by dot 1012. Equation (6c) can be used to interpolate a wavelet 1014 with the same amplitude at a different location represented by dot 1016 along the line 1018 with slope s. In other words, Equation (6c) interpolates the wavelet 1015 at the location 1016 with the same amplitude as the recorded wavelet 1008 at the coordinate 1012.

A parabolic reflection event in a recorded seismic data gather is represented by a slope parameter, s, and a curvature parameter, denoted by c. Processes are directed to learning atoms constrained to represent parabolic reflection events that are constant along parabolas of the recorded seismic data gather. A parabolic function that receives as input a time sample, t, to interpolate an amplitude at a different point along a parabolic reflection event is given by:

$$a_j(t, o_j^{ref}) = a(t + s_j \Delta o + c_j o^2, o_j^{ref} + \Delta o) \quad (6d)$$

The slope and curvature parameters $s_j$ and $c_j$ and the receiver coordinate $o_j^{ref}$ are not predefined. The parameters $s_j$, $c_j$, and $o_j^{ref}$ are computed, as described below, to minimize the cost function in Equation (6a) constrained to parabolic reflection events. The learned atoms are continuously defined in space via parabolic time moveout by interpolating amplitudes of wavelets of the atoms using Equation (6d).

Figure 10B:
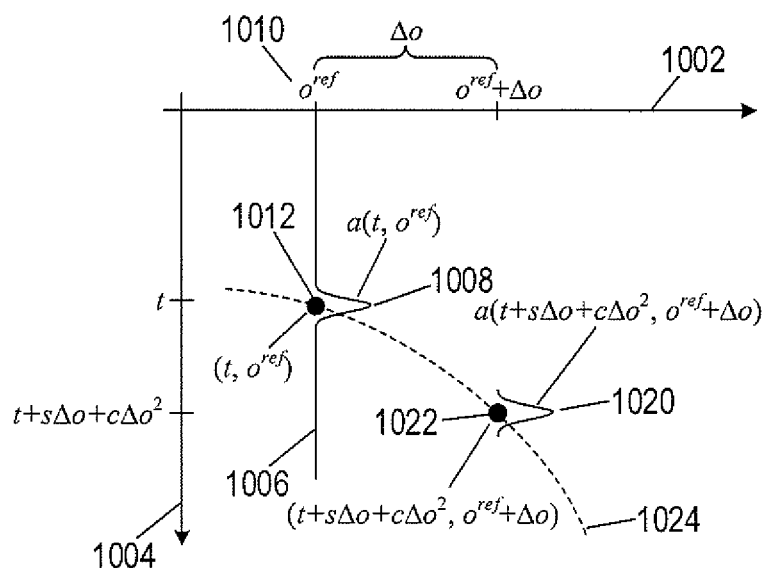
FIG. 10B shows a plot of a wavelet interpolated along a parabola from a wavelet in a trace.

FIG. 10B shows a plot of a wavelet interpolated along a parabola from a recorded wavelet in a single trace. A line 1006 with a wavelet 1008 represents a portion of a trace generated by a receiver located at receiver coordinate 1012. Equation (6d) can be used to interpolate a wavelet 1020 at a different location represented by dot 1022 along a parabola 1024. In other words, Equation (6d) interpolates the amplitude at the location 1022 with the same amplitude at the coordinate 1012.

Minimization of the cost function given by Equation (6a) is carried out iteratively in a sparse coding stage and a dictionary update stage. The p-th iteration of this two-stage process can be summarized as follows: In the sparse coding stage, each sparse coefficient vector associated with a patch vector of the training set is updated using $$\vec{x}_i = \underset{\vec{x}}{\operatorname{argmin}} \|\vec{y}_i - D^{(p-1)} \vec{x}_i\|_2 \text{ subject to } \|\vec{x}_i\|_0 \leq L \text{ for} \quad (7a)$$

$$i = 1, \ldots, M$$

where p=1, . . . , P and P is the number of iterations; and $D^{(p-1)}$ is the dictionary computed during the (p-1)-th dictionary update.

In the dictionary update stage, the atoms are updated using $$\{\vec{a}_j\}_{j=1}^K = \min_{\{\vec{a}_j\}_{j=1}^K} \sum_{i=1}^M \sum_{n=1}^N \left( y_{n,i} - \sum_{j=1}^K x_{j,i} a_j(t_n, o_n) \right)^2 \quad (7b)$$

Each atom is computed at the sampling locations of the seismic data to construct the discrete dictionary matrix $D^{(p)}$. For example, the sample at the n-th row and j-th column of the dictionary matrix $D^{(p)}$ is assigned the value $a_j(t_n, o_n)$. The trained dictionary is not necessarily complete and may be highly redundant. Due to the high degree of redundancy in the dictionary, the sparse approximation in Equation (7a) is computed with a matching pursuit technique, such as OMP. Depending on the geometrical structure of the atoms in the dictionary, minimization of the quadratic error in equation (7b) may be computed using singular value decomposition subject to the constraints given by Equations (6c) and (6d), which are added to enforce the geometric structure to the atoms.

Iteratively solving Equation (6a) according to Equations (7a) and (7b) establishes a relationship between the M patch vectors and a matrix product of the structured dictionary D and M sparse coefficient vectors as follows:

$$Y \approx DX \quad (7c)$$

where $Y = [\vec{y}_1, \vec{y}_2, \ldots, \vec{y}_M]$;

$D = [\vec{a}_1, \vec{a}_2, \ldots, \vec{a}_K]$; and $X = [\vec{x}_1, \vec{x}_2, \ldots, \vec{x}_M]$;

The matrix Y of M patch vectors is called a training set that is used to determine the structured dictionary and the M sparse coefficient vectors. The matrix X is called a sparse coefficient matrix. The dictionary and sparse coefficient matrices of Equation (7c) are obtained by iteratively updating the sparse coefficient vectors and atoms according to Equations (7a) and (7b).

Figure 11:
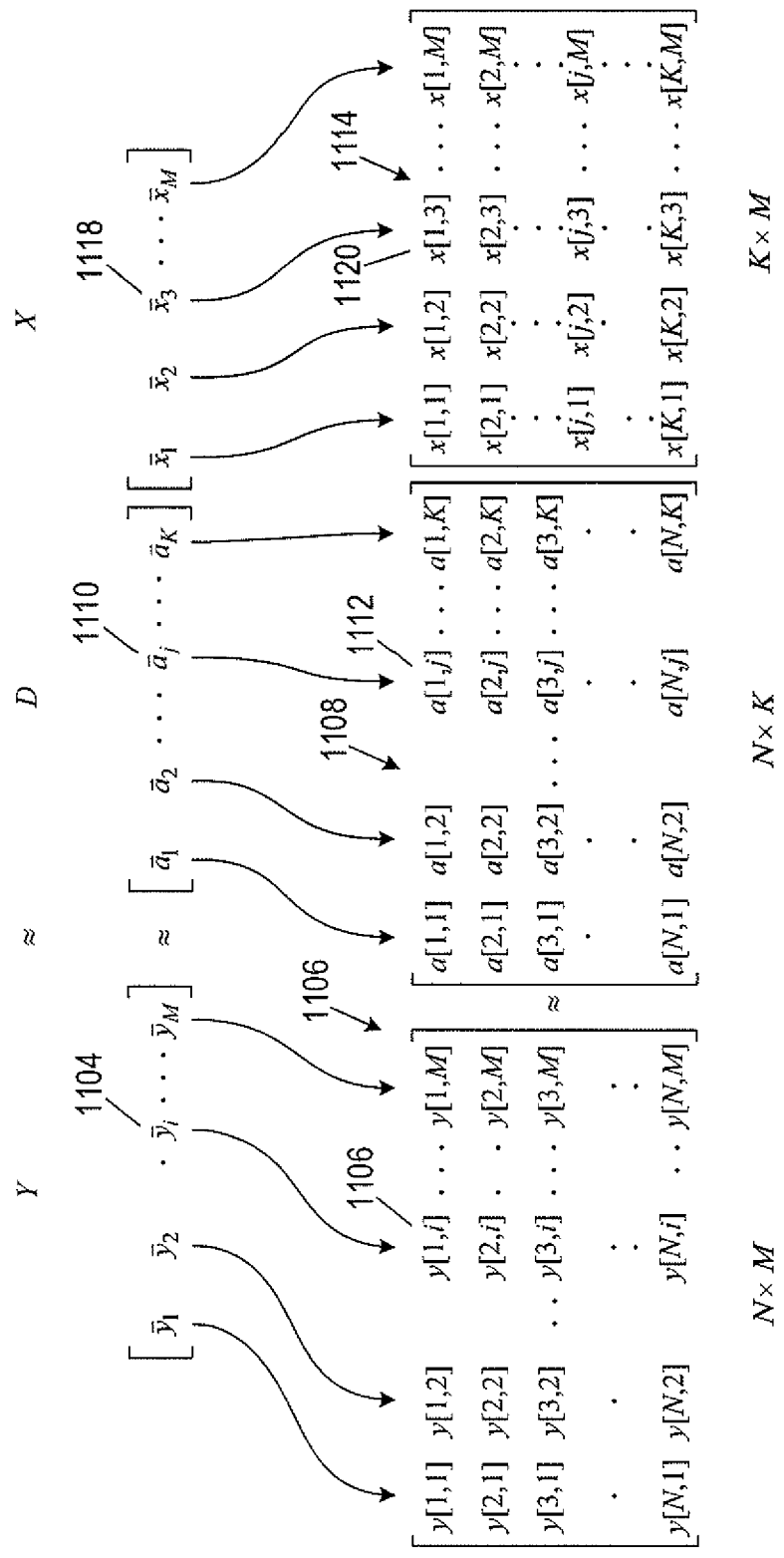
FIG. 11 shows an expanded representation of a matrix equation that represents a relationship between patch vectors and a structured dictionary multiplied by a sparse coefficient matrix.

FIG. 11 shows an expanded representation of Equation (7c) and reveals the notation of matrix elements in each of the matrices Y, D, and X. Elements in the matrix Y are denoted by y[n,i], where n=1, . . . , N and i=1, . . . , M. Elements in the matrix D are denoted by D[n,j], where n= 1, . . . , N and j=1, . . . , K. Elements in the matrix X are denoted by x[j,i], where j=1, . . . , K and i=1, . . . , M. As shown in FIG. 11, patch vectors of the training set Y are represented by columns in a matrix 1102. For example, elements of a patch vector $\vec{y}_i$ 1104 the training set Y are in column 1106. Atoms in the dictionary D are represented by columns in a matrix 1108. For example, elements of atom $\vec{a}_j$ 1110 in the dictionary D are in column 1112. Sparse coefficients in the sparse coefficient matrix X are represented by columns in a matrix 1114. For example, elements of sparse coefficient vector $\vec{x}_3$ 1116 in the sparse coefficient matrix X are in column 1120.

Figure 12:
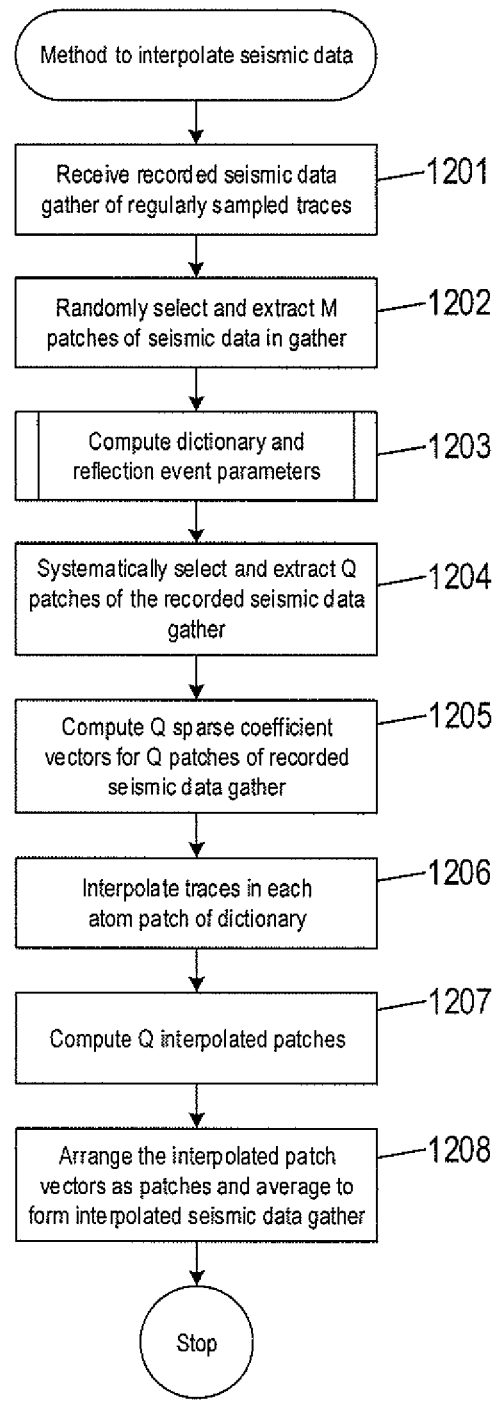
FIG. 12 shows a method to interpolate seismic data from regularly spaced traces of recorded seismic data.

FIG. 12 shows a method to interpolate seismic data from regularly spaced traces of recorded seismic data. The method is composed of computer implemented modules, or routines, each comprising a series of machine-readable instructions stored in one or more data-storage devices and executed using one or more processors of a computer system described below with reference to FIG. 37. In block 1201, a recorded seismic data gather of regularly spaced traces generated in a marine seismic survey of a subterranean formation is received.

Figures 13A, 13B:
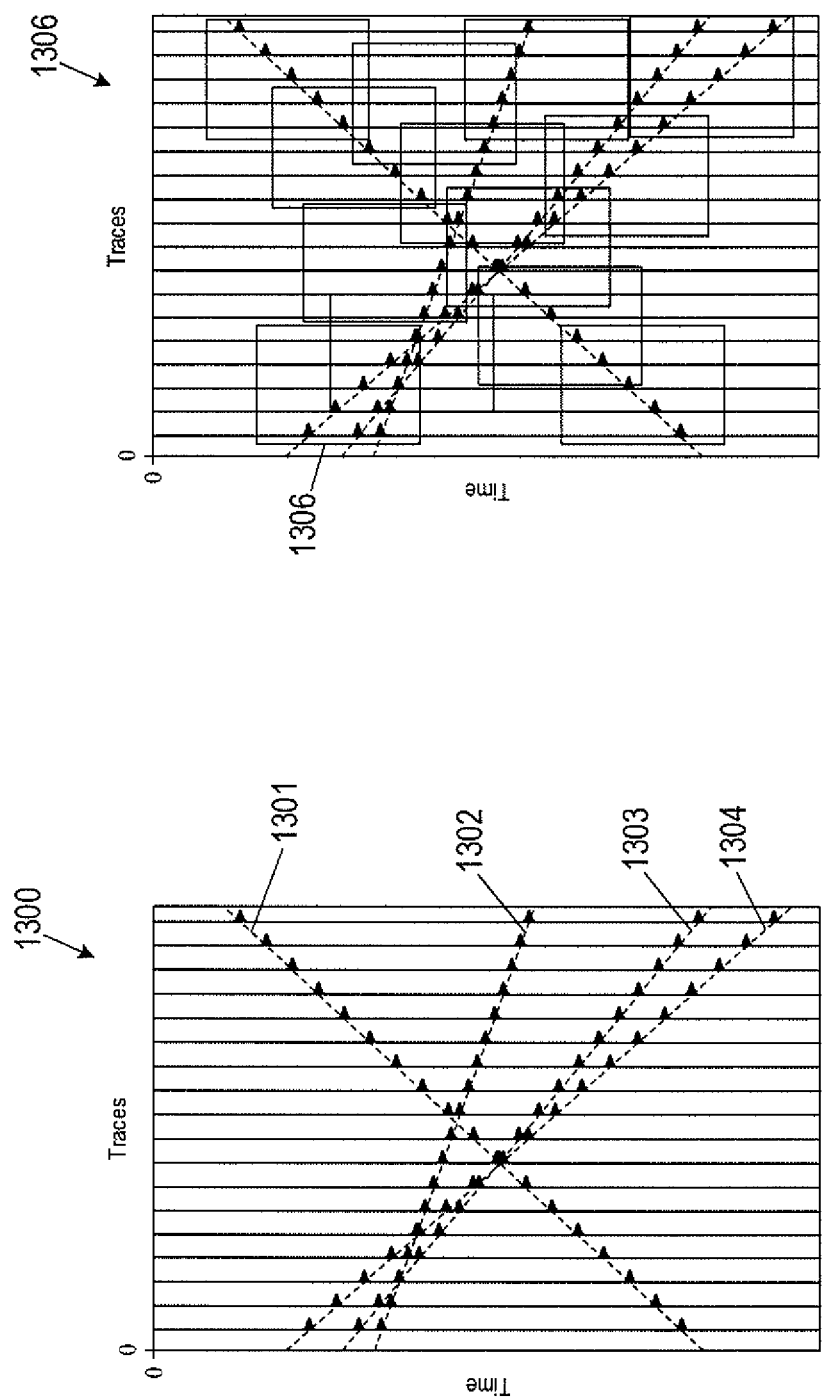
FIG. 13A shows an example of a recorded seismic data gather with regularly spaced traces.
FIG. 13B shows an example of overlapping, randomly selected patches of the recorded seismic data gather in FIG. 13A.

FIG. 13A shows an example of a recorded seismic data gather 1300 with regularly spaced traces. For example, the traces in the recorded seismic data gather 1300 may be regularly sampled in-line traces generated by regularly spaced receivers located along a streamer. In this example, the recorded seismic data gather 1300 records linear reflection events identified by wavelets located along dashed lines 1301-1304.

Returning to FIG. 12, in block 1202, M overlapping, randomly selected patches are extracted from the recorded seismic data gather. In certain implementations, the overlapping patches may be extracted from a window of the recorded seismic data gather.

FIG. 13B shows an example of overlapping, randomly selected patches of the recorded seismic data gather 1300, such as patch 1306. As shown in FIG. 13B, the patches appear randomly distributed and certain patches overlap more than one patch.

Returning to FIG. 12, in block 1203, a module "compute dictionary and reflection event parameters" is called to compute a structured dictionary and reflection event parameters from the M overlapping, randomly selected patch vectors extracted in block 1202. Because the reflection events of the recorded seismic data gather received in block 1201 are linear reflection events, each atom $\vec{a}_j$ of the learned structure dictionary D=$[\vec{a}_1\ \vec{a}_2\ \ldots\ \vec{a}_K]$ has a corresponding slope $s_j$. The collection of K slopes are the reflection event parameters represented by a vector $\vec{s}=[s_1,\ \ldots,\ s_K]$. Computation of the structured dictionary and reflection event parameters in block 1203 for a recorded seismic data gather with regularly spaced traces and linear reflection events are now described with reference to FIGS. 14-19.

Figure 14:
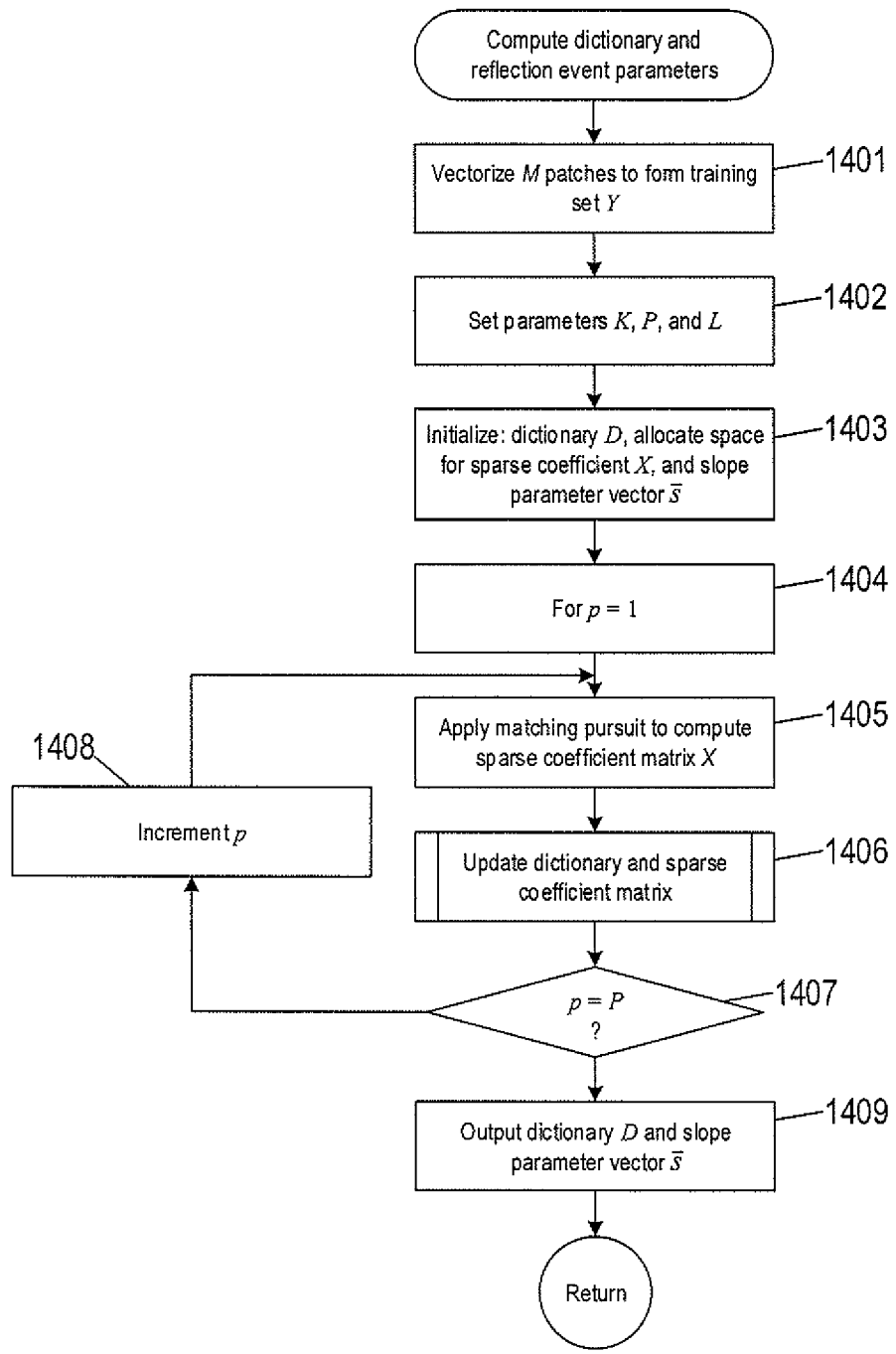
FIG. 14 shows a control-flow diagram that represents a module "compute dictionary and reflection event parameters" called in FIG. 12.

FIG. 14 shows a control-flow diagram that represents the module "compute dictionary and reflection event parameters" called in block 1203 of FIG. 12 for linear reflection events in the recorded seismic data gather. In block 1401, the M overlapping, randomly selected patches extracted in block 1202 of FIG. 12 are vectorized to form M corresponding patch vectors of a raining set Y=$[\vec{y}_1, \vec{y}_2, \ldots, \vec{y}_M]$, as described above with reference to FIG. 9. In block 1402, the number of dictionary atoms, K, number of iterations, P, and sparsity constant L are set. In block 1403, sparse coefficient vectors of a sparse coefficient matrix X are initialized to zero. Slope parameters of a slope parameter vector $\vec{s}$ are initialized to zero. Atoms of the structured dictionary D may be initialized with a random selection of K normalized patch vectors of the training set Y. For example, the atoms of the structured dictionary may be initialized as follows:

$$D = \left[\frac{\vec{y}_{19}}{\|\vec{y}_{19}\|_2}, \frac{\vec{y}_{67}}{\|\vec{y}_{67}\|_2}, \ldots, \frac{\vec{y}_3}{\|\vec{y}_3\|_2}\right] \tag{8}$$

A loop beginning with block 1404, repeats the computational operations represented by blocks 1405 and 1406 for P iterations. In block 1405, a matching pursuit technique, such as OMP, is used to compute coefficient matrix X, as described above with reference to Equations (2) and (7a). In block 1406, a module "update dictionary and sparse coefficient matrix" is called to update the dictionary and sparse coefficient matrix subject to the constraints for linear reflection events given in Equations (6b) and (6c), as described above with reference to Equation (7b). The module also computes for each atom a corresponding slope parameter of the slope parameter vector $\vec{s}$. In decision block 1407, blocks 1405 and 1406 are repeated for P iterations. When increment parameter p, incremented in block 1408, equals the set number of iterations P, control flows to block 1409. In block 1409, the structured dictionary D and slope parameter vector $\vec{s}$ are returned. Note that the corresponding sparse coefficient matrix X used to compute the structured dictionary from the M overlapping, randomly select patches of the recorded seismic data gather in block 1405 is discarded.

Figure 15:
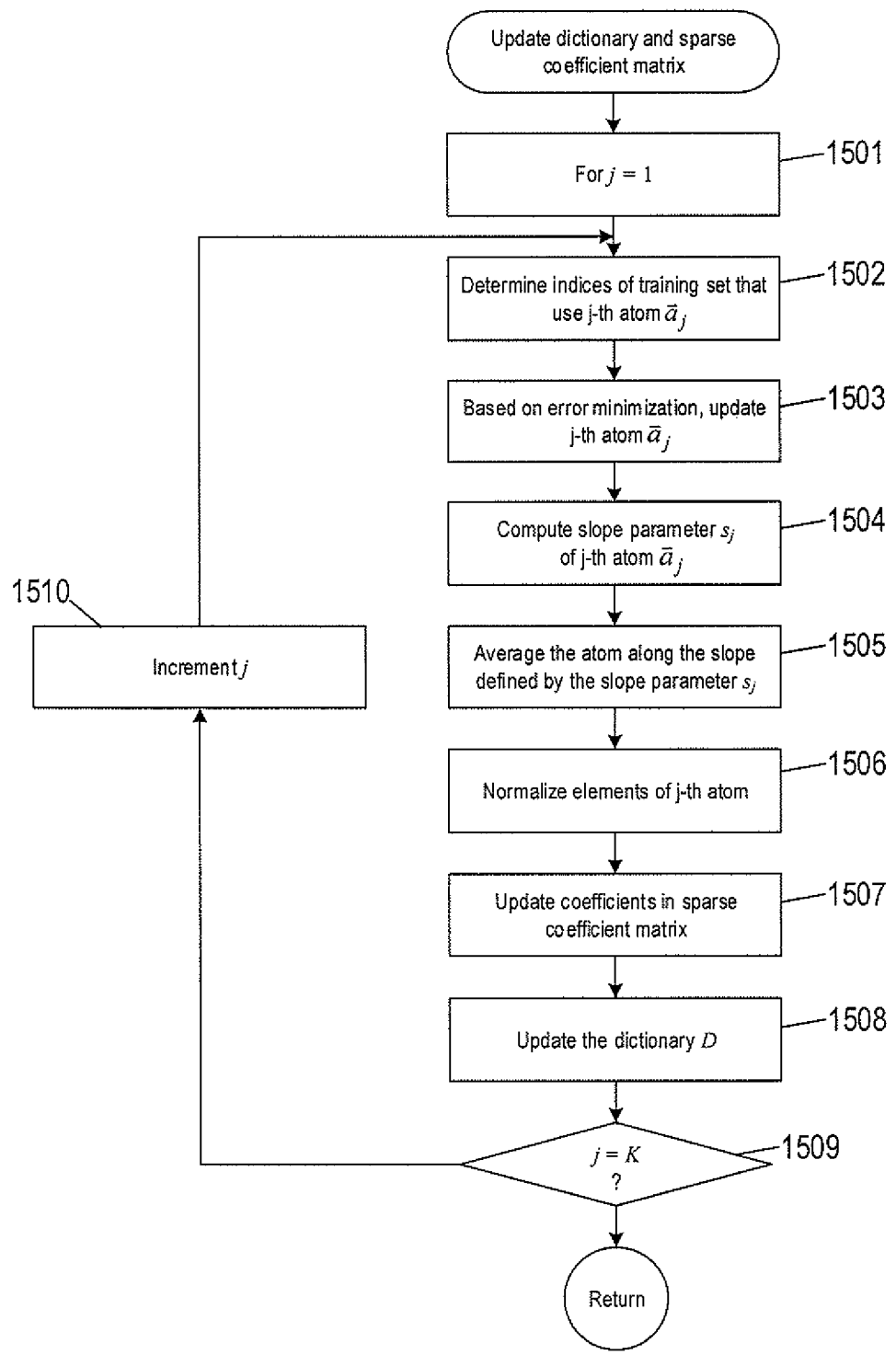
FIG. 15 shows a control-flow diagram that represents the module "update dictionary and sparse coefficient matrix" called in FIG. 14.

FIG. 15 shows a control-flow diagram that represents the module "update dictionary and sparse coefficient matrix" called in block 1406 of FIG. 14 to update atoms of the structured dictionary and the sparse coefficient matrix and compute slope parameters of the slope parameter vector for each of the K atoms. A loop beginning with block 1501 repeats the computational operations represented by blocks 1502-1508 for each of the K atoms in the structured dictionary D. In block 1502, a set of column indices of non-zero matrix elements in the j-th row of the sparse coefficient matrix are identified and represented as follows:

$$\Omega_j = \{k | X[j,k] \neq 0\} \tag{9}$$

where
k is a column of the sparse coefficient matrix; and
$\Omega_j$ is the set of non-zero column indices of the j-th row of the sparse coefficient matrix X.

In block 1503, the j-th atom of the structured dictionary is computed (i.e., updated) as follows:

$$\vec{a}_j = (Y[:,\Omega_j] - DX[:,\Omega_j] + D[:,j]X[j,\Omega_j])X[j,\Omega_j]^T \tag{10}$$

where
$Y[:,\Omega_j]$ is the matrix Y with non-zero elements with column indices in the set
$X[:,\Omega_j]$ is the matrix X with non-zero elements with column indices in the set $\Omega_j$;
$D[:,j]$ is the j-th atom (i.e., $\vec{a}_j$) of the dictionary D;
$X[j,\Omega_j]$ is the j-th row of non-zero elements of the matrix X; and
T represents the transpose.

Equation (10) computes an updated atom based on error minimization in Equation (6a), as described above with reference to Equation (7b).

FIG. 16 shows an example of the notation used in Equation (10) to compute the j-th atom in block 1503 of FIG. 15. In the example of FIG. 16, suppose the set of non-zero column indices $\Omega_j$ of the j-th row of the sparse coefficient matrix X is $\{2,3,5,7\}$. The general form of Equation (10) 1602 to compute the j-th atom $\vec{a}_j$ appears in FIG. 16. An expanded representation 1604 of Equation (10) 1602 is displayed for the set $\Omega_j=\{2,3,5,7\}$. The term $Y[:,\Omega_j]$ 1606 in Equation (10) 1602 is represented by matrix 1607 with only column vectors for patch vectors $\vec{y}_2, \vec{y}_3, \vec{y}_5$, and $\vec{y}_7$. The term $X[:,\Omega_j]$ 1608 Equation (10) 1602 is represented by matrix 1609 with sparse coefficient vectors $\vec{x}_2, \vec{x}_3, \vec{x}_5$, and $\vec{x}_j$. The term $D[:,j]$ 1610 in Equation (10) 1602 represents the j-th atom $\vec{a}_j$ 1611. The term $X[j,\Omega_j]$ 1612 in Equation (10) 1602 represents the j-th row 1613 of the matrix X with non-zero elements.

Returning to FIG. 15, in block 1504, the slope parameter $s_j$ associated with the linear reflection event in the j-th atom $\vec{a}_j$ is computed. The slope parameter $s_j$ is the j-th element of the slope parameter vector $\vec{s}$. The j-th atom $\vec{a}_j$ is converted from a vector to an atom patch.

Figure 17A:
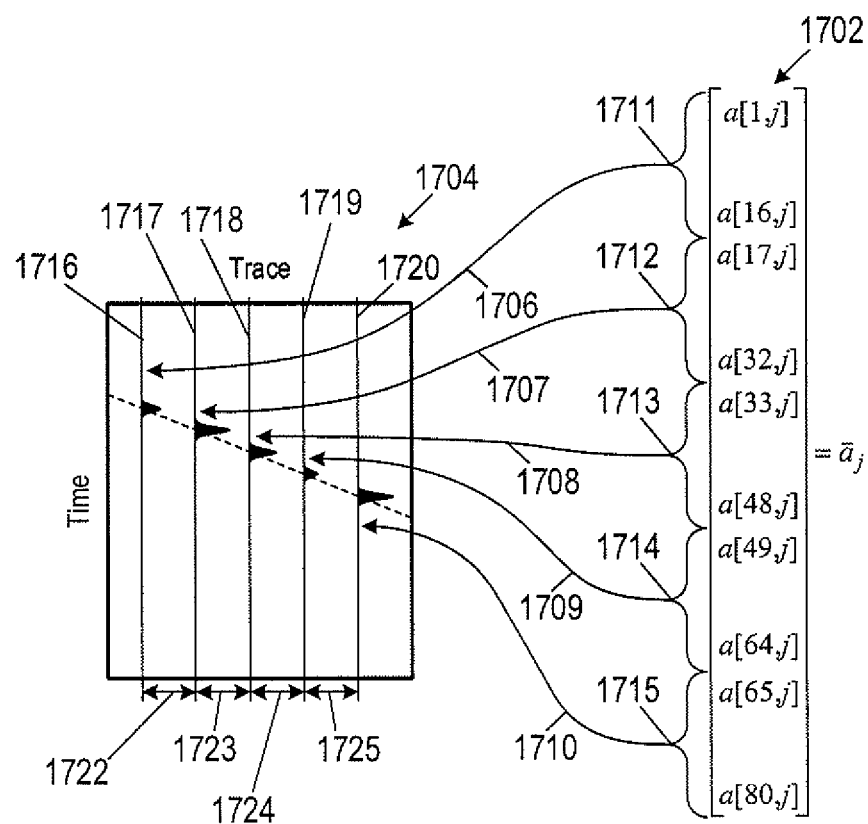
FIG. 17A shows converting an example atom into traces of an atom patch.

FIG. 17A shows converting an example j-th atom $\vec{a}_j$ 1702 with 80 elements into five traces of an atom patch 1704. Directional arrows 1706-1710 represent mapping elements in five sections 1711-1715 to obtain traces 1716-1721, respectively. Wavelets located along the traces 1716-1721 represent a linear reflection event. Directional arrows 1722-1725 represent evenly spaced apart traces with the traces spaced apart to match the spacing between regularly spaced traces of the recorded seismic data gather. For each pair of adjacent traces, a time shift $\Delta t_i$ that maximizes the cross correlation of the two traces is computed. The cross correlation is a vector with values between −1 and 1. Each value measures the similarity between the two adjacent traces after a relative time shift from one trace to the other. The time shift that corresponds to the largest cross correlation value is selected. The time shift is the travel time difference of the reflection event measure by two adjacent receivers.

Figure 17B:
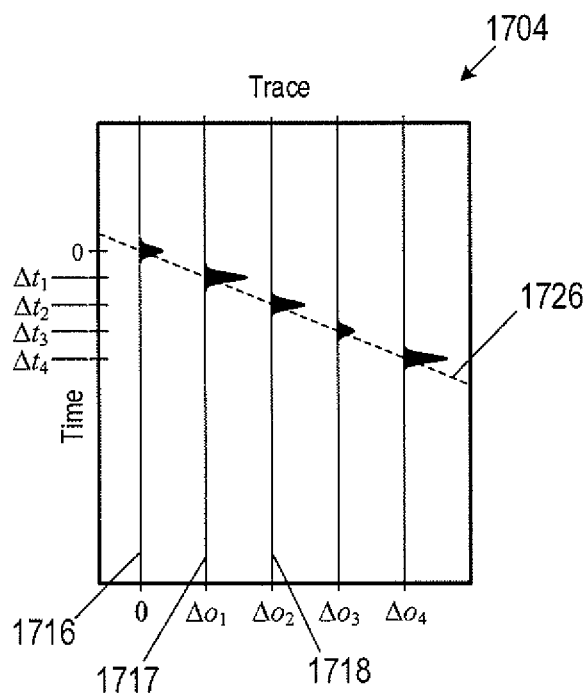
FIG. 17B shows an example of time shifts and corresponding space locations for traces in the atom patch of FIG. 17A.

FIG. 17B shows an example of time shifts and corresponding space locations for traces in the atom patch 1704. The first trace 1716 is at time zero and a time shift of the second trace 1717 determined by cross correlation is $\Delta t_1$. A time shift between the second trace 1717 and the third trace 1718 determined by cross correlation is $\Delta t_2$. The time shifts are accumulated and expressed relative to the first trace at time zero by $$\Delta \hat{t} = [0 \Delta t_1 \Delta t_1 + \Delta t_2 \dots]$$

Receiver locations of the traces are also determined relative to the first trace 1715 located at zero. The second trace 1717 is located $\Delta o_1$ distance from the first trace and the third trace is located $\Delta o_2$ distance from the second trace. The receiver locations are accumulated and expressed relative to the first trace by $$\Delta \hat{o} = [0 \Delta o_1 \Delta o_1 + \Delta o_2 \dots]$$

The slope parameter $s_j$ is computed by fitting the relative travel times $\Delta \hat{t}$ with a first-order polynomial function, i.e., by computing a slope parameter $s_j$ that minimizes the error $\|\Delta \hat{t} - s_j \Delta \hat{o}\|_2$. The slope parameter $s_j$ is associated with the j-th atom patch 1704 and represents the dip from horizontal as represented by dashed line 1726 in FIG. 17B.

Returning to FIG. 15, in block 1505, amplitudes of the traces along the slope of the atom patch are averaged. The traces of the atom are time shifted according to the linear move out $\Delta \hat{t} = s_j \Delta \hat{o}$ to flatten the linear reflection event, then the traces are averaged, and shifted back.

Figure 18A:
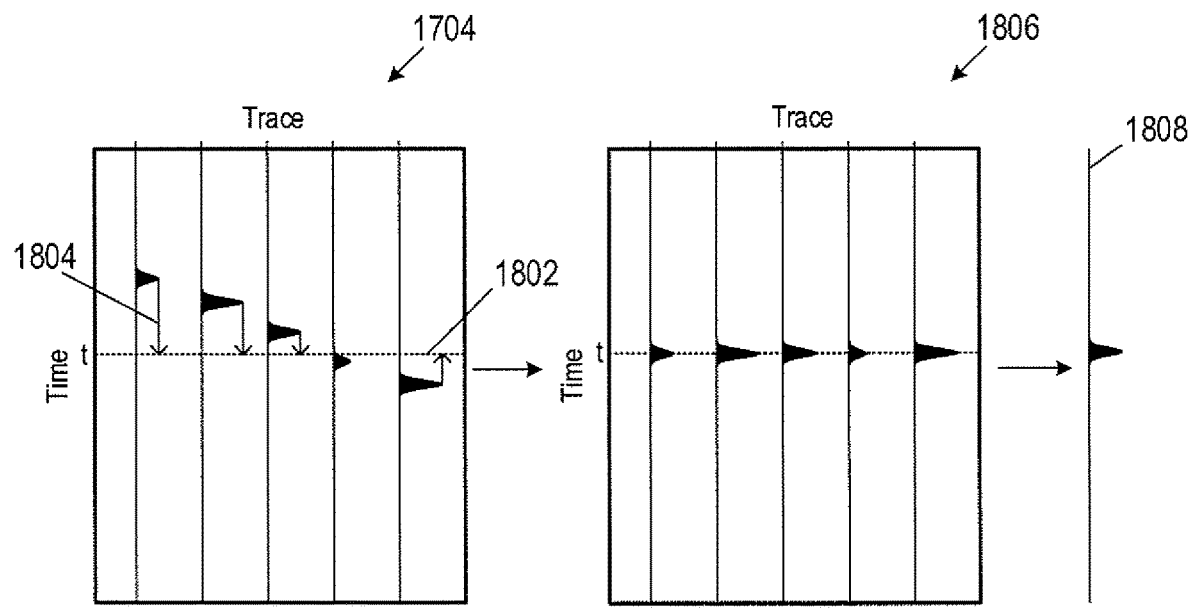
FIGS. 18A-18B show an example of averaging amplitudes of traces along a linear reflection event of an atom patch.
Figure 18B:
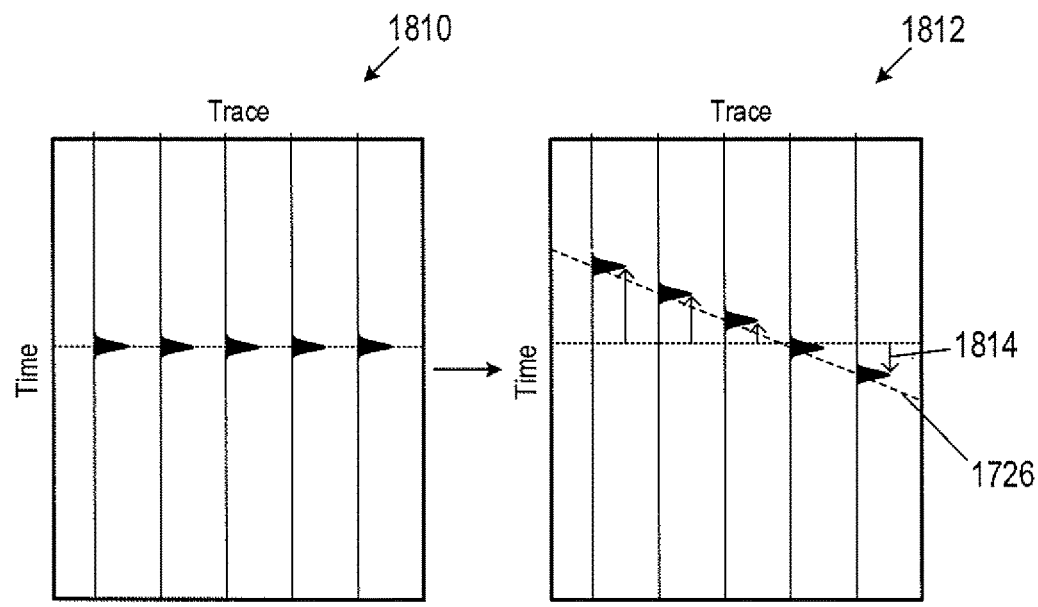

FIGS. 18A-18B show averaging amplitudes of the traces along a line of the atom patch. In FIG. 18A, amplitudes along the line 1726 with slope parameter $s_j$ in FIG. 17B are flattened by time shifting the amplitudes to a time t represented by dotted line 1802 as represented by directional arrows, such as directional arrow 1804. Time shifting produces a time-shifted atom patch 1806 with a flat reflection event at time t. Note that the waveform and amplitude of wavelets along the flat reflection event vary slightly. The amplitudes of the wavelets are averaged to obtain an average trace 1808 that is used to replace traces of the time-shifted atom patch 1806 to obtain a constant-amplitude time-shifted atom patch 1810. The traces of constant-amplitude time-shifted atom patch 1810 are time shifted back to obtain an averaged atom patch 1812 as represented by direction arrows, such as directional arrow 1814. The wavelets along the line 1726 in averaged atom patch 1812 reproduce the original dip of the linear reflection event in atom patch 1704 but the wavelets have the same amplitudes along the linear reflection event.

Returning to FIG. 15, in block 1506, the j-th atom is normalized as follows:

$$\vec{a}_j = \frac{\vec{a}_j}{\|\vec{a}_j\|_2} \quad (11)$$

In block 1507, using the normalized atoms obtained in block 1506, non-zero sparse coefficients in the j-th row of the sparse coefficient matrix X are computed (i.e., updated) as follows:

$$X[j,\Omega_j] = \vec{a}_j^T (Y[:,\Omega_j] - DX[:,\Omega_j] + D[:,j]X[j,\Omega_j]). \quad (12)$$

Equation (12) updates the sparse coefficients using the atom $\vec{a}_j$ to make the sparse coefficients consistent with the atom modifications in blocks 1502-1506 and minimize the cost function of Equation (6a). In block 1508, the j-th atom of the dictionary is updated by replacing the elements of the j-th atom in the structured dictionary D with the elements of the normalized j-th atom computed in Equation (11):

$$D[:,j] = \vec{a}_j \quad (13)$$

In decision block 1509, the computational operations of blocks 1501-1508 are repeated for K iterations. When increment parameter j, incremented in block 1510, equals K, control flows back to FIG. 14. The slope parameters of each of the linear reflection events of the K atom patches in the structure dictionary D form the slope vector $\vec{s} = [s_1, \dots, s_K]$.

Figure 19:
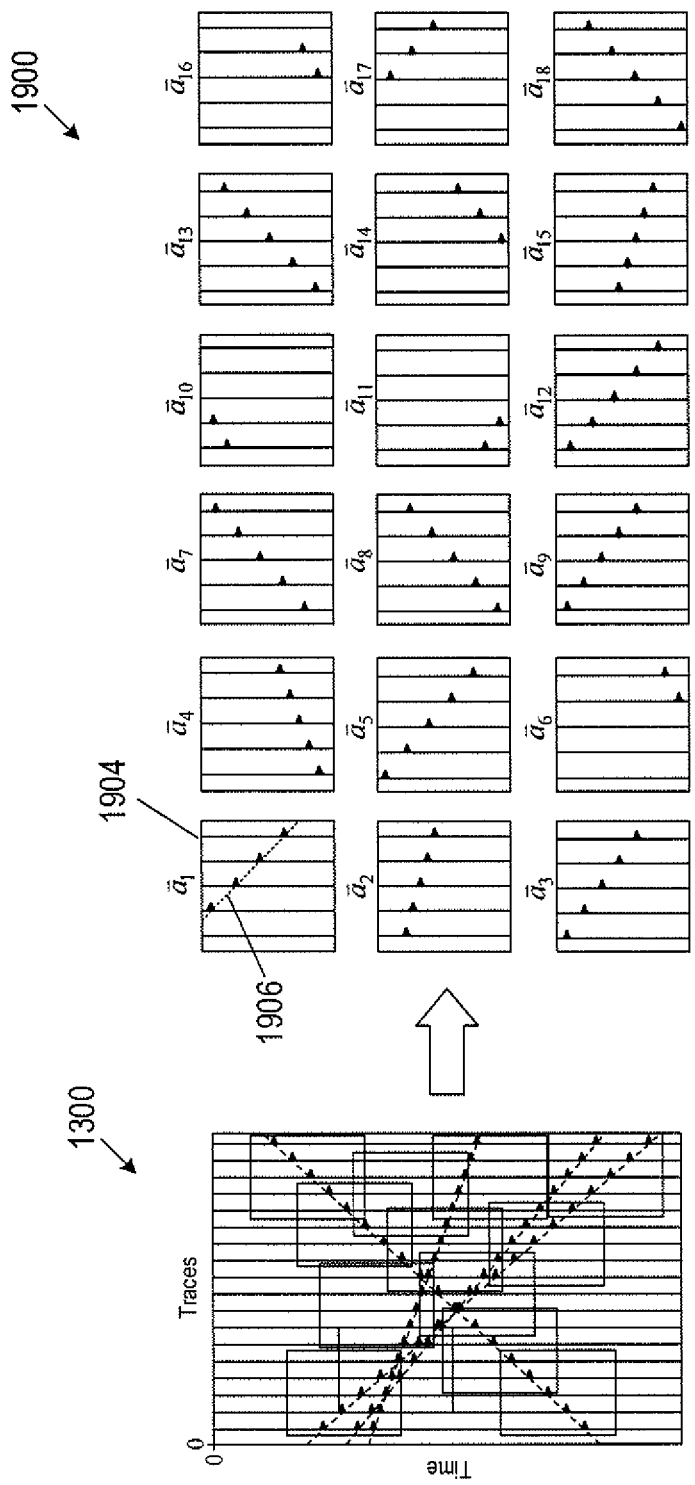
FIG. 19 shows examples of atoms and associated atom patches computed from overlapping, randomly selected patches of the recorded seismic data gather in FIG. 13.

FIG. 19 shows examples of atoms and associated atom patches 1902 computed from the overlapping, randomly selected patches of the recorded seismic data gather 1300 computed in block 1203 of FIG. 12. Each atom patch represents a linear reflection event with a different corresponding slope parameter. For example, atom $\vec{a}_1$ has a corresponding atom patch 1904 that represents a linear reflection event with a corresponding slope parameter $s_1$ represented by dashed line 1906.

Returning to FIG. 12, in block 1204, a cover set of overlapping patches of the recorded seismic data gather are extracted. The patches may be determined and extracted in a deterministic and systematic manner to cover the full set of seismic data in the recorded seismic data gather. The patches overlap other patches of seismic data. For example, each patch may overlap with up to about 80% of the seismic data encompassed by an adjacent patch. Each of the patches is vectorized as described above with reference to FIG. 9 to form a cover set of patch vectors given by:

$$\hat{Y} = [\hat{y}_1, \dots, \hat{y}_Q] \quad (14)$$

where
Q is number of patches in the cover set of patch vectors (i.e., Q≥M); and hat notation "^" denotes a patch vector in the cover set.

FIG. 20 shows an example of a cover set of 20 overlapping patches extracted from the recorded seismic data gather 1300. As shown in FIG. 20, overlapping rectangles, such as bolded rectangle 2002, represent overlapping patches of traces of the recorded seismic data gather 1300. The segments of traces in the patch 2002 are vectorized as described above with reference to FIG. 9 to form a patch vector $\hat{y}_i$.

Returning to FIG. 12, in block 1205, using a matching pursuit technique, such as OMP, a full sparse coefficient matrix $\hat{X}$ is computed from the structured dictionary D computed in block 1203 and the cover set of patch vectors obtained in block 1204 such that a product of the full sparse coefficient matrix and the structured dictionary approximate the cover set of patch vectors as follows:

$$\hat{Y} \approx D\hat{X} \qquad (15a)$$

where $\hat{X} = [\hat{x}_1, \ldots, \hat{x}_Q]$.

For i=1, . . . , Q, each patch vector in the cover set of patch vectors $\hat{Y}$ relates to a corresponding sparse coefficient vector in the full sparse coefficient matrix $\hat{X}$ as follows:

$$\hat{y}_i \approx D\hat{x}_i \qquad (15b)$$

FIG. 21 shows an example of a linear combination of atoms 2102 and non-zero sparse coefficients that approximates the seismic data in a patch vector of the patch 2002 according to Equation (15b):

$$\hat{y}_i \approx \hat{x}_{11,i}\vec{a}_{11} + \hat{x}_{54,i}\vec{a}_{54} + \hat{x}_{301,i}\vec{a}_{301} + \hat{x}_{49,i}\vec{a}_{49} +$$
$$\hat{x}_{286,i}\vec{a}_{286} + \qquad (16)$$

The quantities $\hat{x}_{11,i}$, $\hat{x}_{54,i}$, $\hat{x}_{301,i}$, $\hat{x}_{49,i}$, and $\hat{x}_{286,i}$ represent the non-zero elements of the sparse coefficient vector $\hat{x}_i$. Other patch vectors that correspond to patches of the cover set of patch vectors are approximated in the same manner with a different corresponding sparse coefficient vector of the full sparse coefficient matrix.

Returning to FIG. 12, in block 1206 each atom patch that corresponds to an associated atom of the structured dictionary $D = [\vec{a}_1 \, \vec{a}_2 \, \ldots \, \vec{a}_K]$ computed in block 1203 is interpolated over a finer, regularly spaced receiver-coordinate grid using the reflection event parameter (i.e., slope parameter) associated with the atom to obtain a corresponding interpolated atom patch. Each interpolated atom patch is vectorized as described above with reference to FIG. 9 to form an interpolated structured dictionary given by:

$$\hat{D} = [\hat{a}_1 \hat{a}_2 \ldots \hat{a}_K] \qquad (17)$$

where $\hat{a}_j$ is the j-th interpolated atom over a finer, regularly spaced receiver-coordinate grid and corresponds to the j-th atom $\vec{a}_j$ of the structured dictionary D.

Figure 22A:
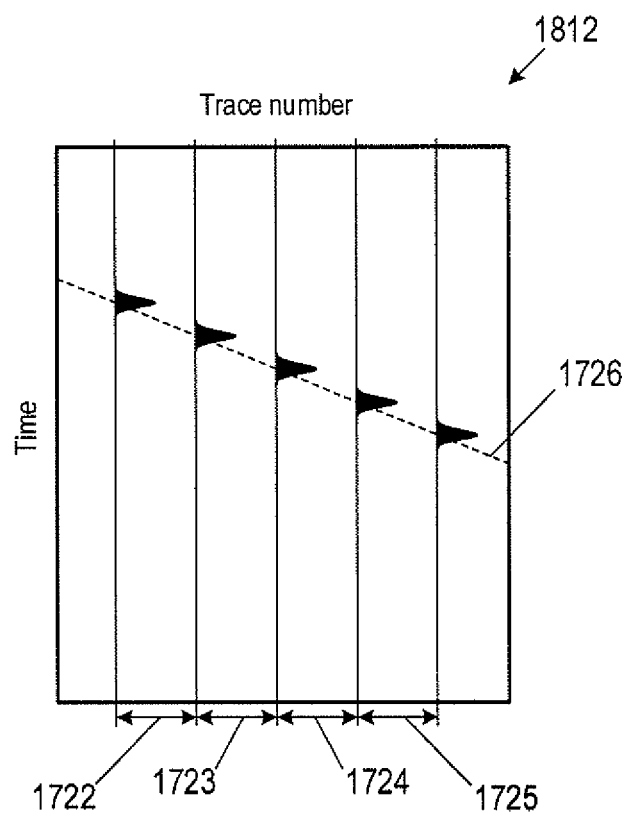
FIGS. 22A-22B show interpolation applied to an averaged atom patch.
Figure 22B:
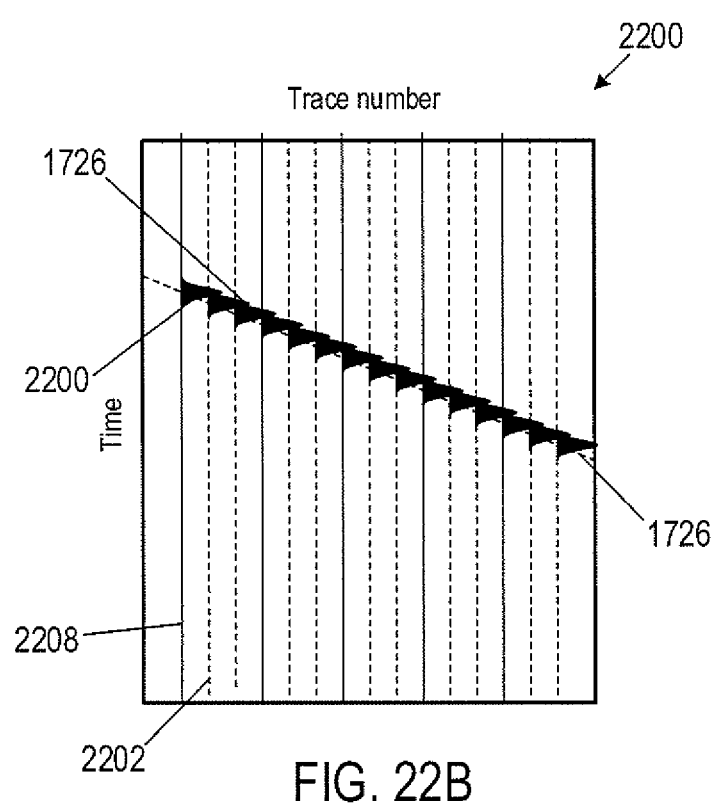

FIGS. 22A-22B show interpolation applied to the averaged atom patch 1812 of FIG. 18B. FIG. 22A shows the averaged atom patch 1812 with wavelets that correspond to the linear reflection event identified by dashed line 1726. In FIG. 22B, interpolation is carried out by adding traces represented by dashed lines, such as trace 2202, to finer, regularly spaced receiver-coordinate grid locations between the traces of the atom patch 1812 to generate interpolated atom patch 2200. Wavelets of the interpolated traces are computed to lie along the linear reflection event using the slope parameter $s_j$ in the linear function given by Equation (6c), as described with reference to FIG. 10A. For example, wavelet 2204 of interpolated trace 2202 is computed using the linear function of Equation (6c) applied to the average wavelet 2206 of recorded trace 2608. The interpolated atom patch 2200 may be vectorized as described above with reference to FIG. 9 to obtain a corresponding interpolated atom $\hat{a}_j$ of the interpolated structured dictionary $\hat{D}$.

Returning to FIG. 12, in block 1207, for each patch vector of the cover set of patch vectors, a corresponding interpolated patch vector is computed as a linear combination of the interpolated structured dictionary and non-zero elements of the corresponding sparse coefficient vector of the full sparse coefficient matrix. In other words, for i=1, . . . , Q, an interpolated patch vector, denoted by $\tilde{y}_i$, is computed as a linear combination of the interpolated structured dictionary and non-zero elements of a corresponding sparse coefficient vector $\hat{x}_i$ of the full sparse coefficient matrix $\hat{X}$ as follows:

$$\tilde{y}_i = \hat{D}\hat{x}_i \qquad (18a)$$

The cover set of interpolated patch vectors computed from the interpolated structured dictionary and the sparse coefficient matrix is represented by:

$$\tilde{Y} = \hat{D}\hat{X} \qquad (18b)$$

where $\tilde{Y} = [\tilde{y}_1, \ldots, \tilde{y}_Q]$.

In block 1208, each interpolated patch vector $\tilde{y}_i$ is converted into an interpolated patch that replaces a corresponding patch in the recorded seismic data gather. Amplitudes of seismic data in overlapping regions of the interpolated patches are averaged to form an interpolated seismic data gather.

Figure 23:
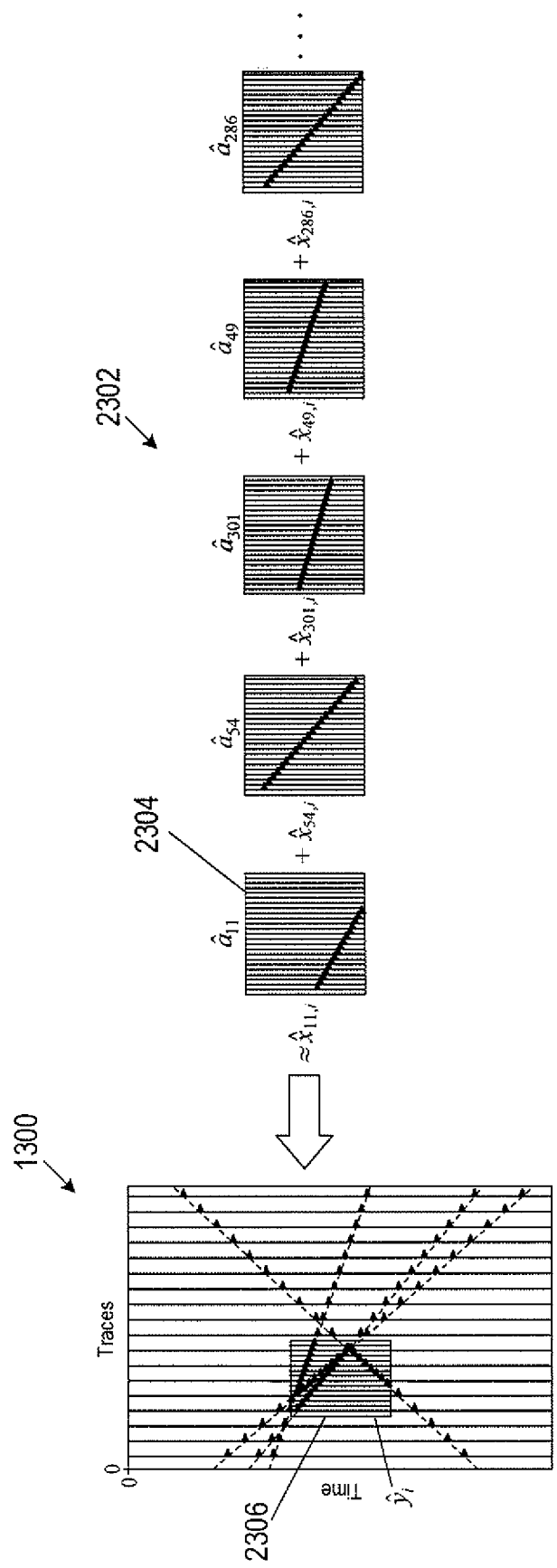
FIG. 23 shows an example of a linear combination of interpolated atoms and non-zero sparse coefficients used to compute an interpolated patch vector.

FIG. 23 shows an example of a linear combination 2302 of interpolated atoms and corresponding non-zero sparse coefficients used to compute an interpolated patch vector according to Equation (18b):

$$\tilde{y}_i = \hat{x}_{11,i}\hat{a}_{11} + \hat{x}_{54,i}\hat{a}_{54} + \hat{x}_{301,i}\hat{a}_{301} + \hat{x}_{49,i}\hat{a}_{49} + \hat{x}_{286,i}\hat{a}_{286} + \qquad (19)$$

Note that Equation (19) is an example of a linear combination of the interpolated atoms and non-zero elements of the corresponding sparse coefficient vector $\hat{x}_i$. The interpolated atoms of Equation (19) have replaced the atoms of Equation (16) to compute interpolated patch vector $\tilde{y}_i$. For example, interpolated atom $\hat{a}_{11}$ replaced atom $\vec{a}_{11}$ in Equation (16) to compute the interpolated patch vector $\tilde{y}_i$. As shown in FIG. 23, the interpolated patch vector $\tilde{y}_i$ is converted into an interpolated patch 2306 that replaces the patch 2002 in the recorded seismic data gather 1300. Conversion of an interpolated patch vector into an interpolated patch may be carried out by mapping sections of the interpolated patch vector to receiver coordinates of the finer receiver-coordinate grid. Other patches of the cover set of patch vectors are replaced by interpolated patches as a linear combination of the interpolated structured dictionary and corresponding sparse coefficient vectors of the full sparse coefficient matrix.

Figure 24A:
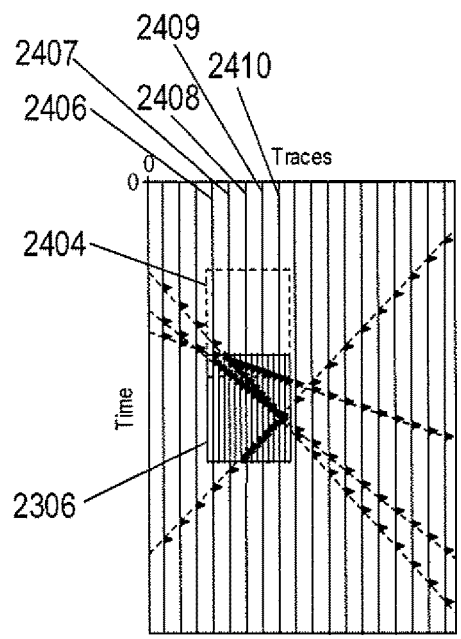
FIGS. 24A-24D show an example of combining interpolated patches to generate an interpolated seismic data gather.
Figure 24B:
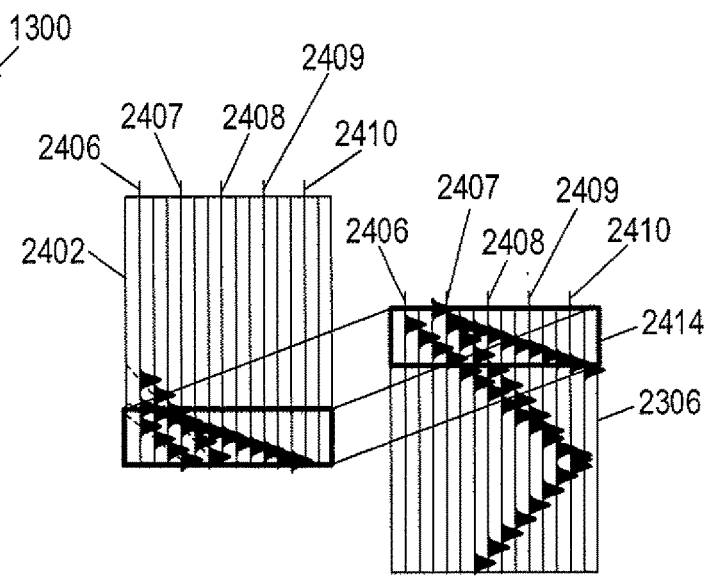
Figure 24C:
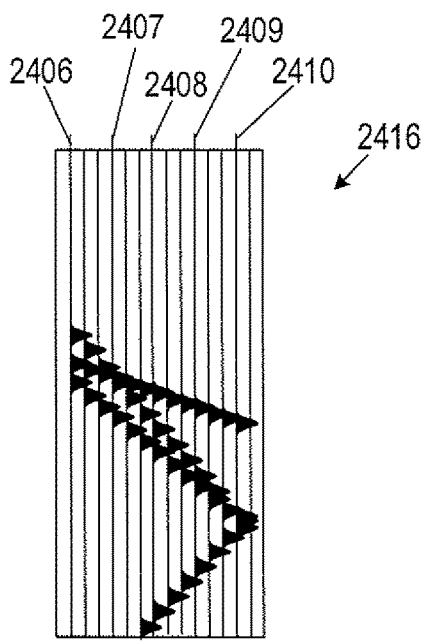
Figure 24D:
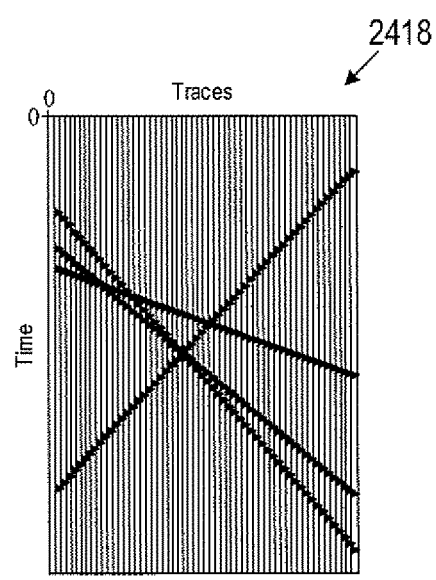

FIGS. 24A-24D show an example of combining interpolated patches to generate an interpolated seismic data gather as described above with reference to block 1208 of FIG. 12. FIG. 24A shows the interpolated patch 2306 obtained as described above with reference to FIG. 23. FIG. 24B shows an interpolated patch 2402 that corresponds to patch 2404 of the recorded seismic data gather 1300 in FIG. 24A and is obtained as described above with reference to FIGS. 22 and 23. As shown in FIG. 24B, the interpolated patches 2402 and 2306 are aligned with traces 2406-2410. Highlighted rectangles 2412 and 2414 outline overlapping amplitudes of seismic data of the interpolated patches 2402 and 2306. The interpolated patches 2402 and 2306 are combined by averaging the amplitudes at time samples of traces in the overlapping regions 2412 and 2414 to obtain an interpolated region 2416 shown in FIG. 24C. The interpolated patches that replace patches of the recorded seismic data gather 1300 are combined by average amplitudes at time samples of overlapping amplitudes of seismic data to obtain an interpolated seismic data gather 2418 as shown in FIG. 24D. The interpolated seismic data gather 2418 can be further processed as described above with reference to FIG. 6 to generate an image of the subterranean formation substantially free of aliasing effects.

Figure 25:
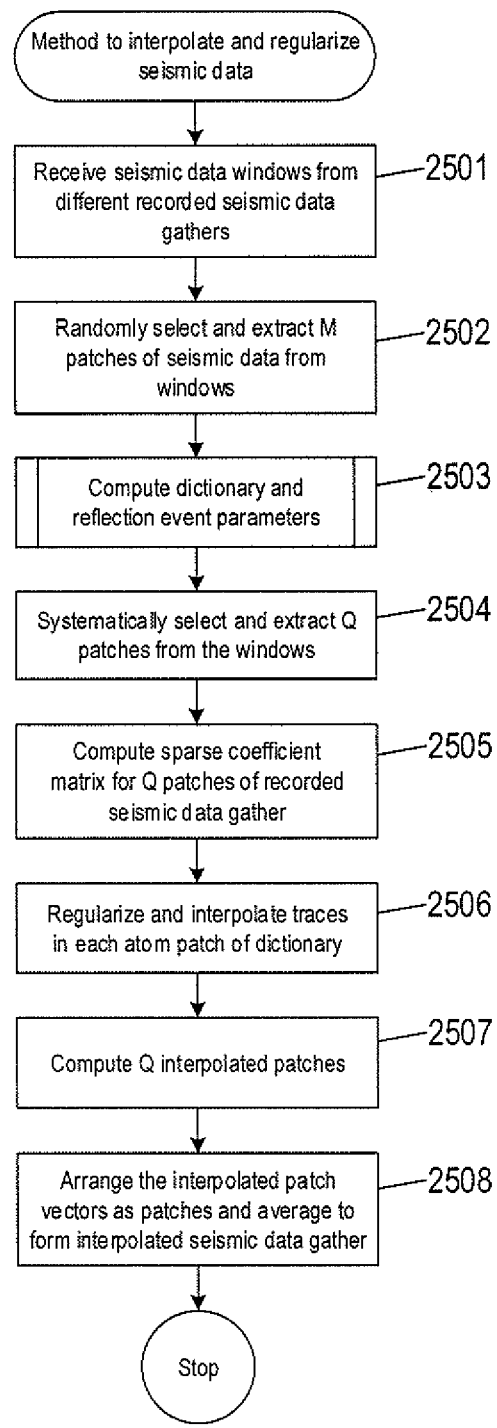
FIG. 25 shows a method to interpolate and regularize recorded seismic data from irregularly spaced traces of recorded seismic data.

FIG. 25 shows a method to interpolate and regularize seismic data from irregularly spaced traces of recorded seismic data. The method is composed of computer implemented modules, or routines, each comprising a series of machine-readable instructions stored in one or more data-storage devices and executed using one or more processors of a computer system described below with reference to FIG. 37. In block 2501, two-dimensional windows of different recorded seismic data gathers generated in a marine seismic survey of a subterranean formation are received. The windows may be extracted from different seismic gathers. The windows are selected to maximize redundancy of the information in the seismic data, which improves structured dictionary learning. For example, to interpolate in the cross-line direction, cross-line windows of seismic data having the same in-line offset may be selected from consecutive shot gathers with the same in-line offset.

FIG. 26A shows an example of three windows of recorded seismic data 2601-2603 of irregularly spaced traces of seismic data. For example, each of windows of recorded seismic data 2601-2603 may be composed of traces of seismic data generated by the eight receivers of eight streamers with different cross-line offset (i.e., different cross-line coordinates $y_r$), the same in-line offset (i.e., same receiver coordinate $x_r$) for three consecutive activations of the source. In this example, the windows of recorded seismic data 2601-2603 record parabolic reflection events.

Returning to FIG. 25, in block 2502, M overlapping, randomly selected patches are extracted from the windows of recorded seismic data. The patches are large enough to capture the moveout of the parabolic reflection events. In other words, the patches span the spatial dimension of the windows.

FIG. 26B shows an example of overlapping, randomly selected patches of the windows of recorded seismic data 2601-2603, such as patch 2604. As shown in FIG. 26B, the patches appear randomly distributed and certain patches overlap more than one patch. Unlike the patches extracted from the recorded seismic data gather 1300 in FIG. 13B, the patches in FIG. 26B span the spatial extent of the windows of recorded seismic data 2601-2603. In other words, the patches contain segments of all eight traces in the windows 2601-2603.

Returning to FIG. 25, in block 2503, a module "compute dictionary and reflection event parameters" is called to compute a structured dictionary and reflection event parameters from the M overlapping, randomly selected patch vectors extracted in block 2502. Because the reflection events of the windows of recorded seismic data received in block 2501 are parabolic reflection events, each atom $\vec{a}_j$ of the learned structure dictionary $D=[\vec{a}_1 \vec{a}_2 \ldots \vec{a}_K]$ has a corresponding slope parameter $s_j$, curvature parameter $c_j$, and receiver coordinates $o_j^{ref}$. The collection of K slope parameters, curvature parameters, and receiver coordinates are the reflection event parameters represented by vectors $\vec{s} = [s_1, \ldots, s_K]$, $\vec{c} = [c_1, \ldots, c_K]$, and $\vec{o}^{ref} = [o_1^{ref}, \ldots, o_k^{ref}]$. Computations of the structured dictionary and reflection event parameters in block 2503 for the windows of recorded seismic data with coarse and irregularly spaced traces are now described with reference to FIGS. 27-31.

Figure 27:
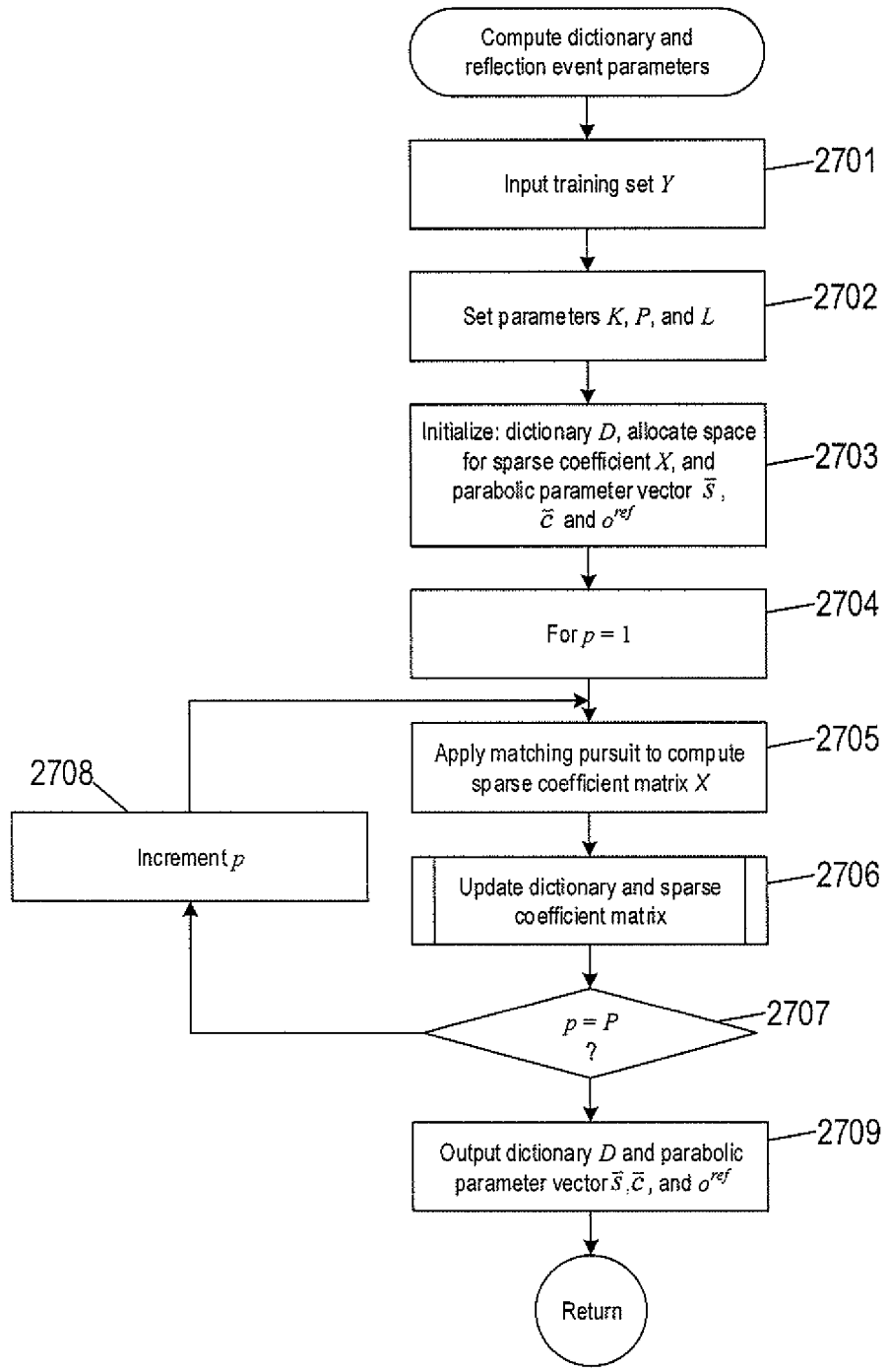
FIG. 27 shows a control-flow diagram that represents the module "compute dictionary and reflection event parameters" called in FIG. 25.

FIG. 27 shows a control-flow diagram that represents the module "compute dictionary and reflection event parameters" called in block 2503 of FIG. 25 for parabolic reflection events in the windows of recorded seismic data gather. In block 2701, the M overlapping, randomly selected patches extracted in block 2502 of FIG. 25 are vectorized to form M corresponding patch vectors of a training set $Y=[\vec{y}_1, \vec{y}_2, \ldots, \vec{y}_M]$, as described above with reference to FIG. 9. In block 2502, the number of dictionary atoms, number of iterations, P, and sparsity constant L are set. In block 2503, sparse coefficient vectors of a sparse coefficient matrix X are initialized to zero. Slope parameters of a slope parameter vector $\vec{s}$ are initialized to zero. Curvature parameters of a curvature parameter vector $\vec{c}$ are initialized to zero. Elements of receiver coordinate vector $\vec{o}^{ref}$ are initialized to zero. Atoms of the structured dictionary D may be initialized with a random selection of K normalized patch vectors of the training set, as described above with reference to Equation (8). A loop beginning with block 2704, repeats the computational operations represented by blocks 2705 and 2706 for P iterations. In block 2705, a matching pursuit technique, such as OMP, is used to compute the structured dictionary D and sparse coefficient matrix X, as described above with reference to Equations (2) and (7a). In block 2706, a module "update dictionary and sparse coefficient matrix" is called to update the dictionary and sparse coefficient matrix subject to the constraints for linear reflection events given in Equations (6b) and (6d), as described above with reference to Equation (76). The module also computes for each atom a corresponding slope, curvature, and receiver coordinate parameters of the slope, curvature, and receiver coordinate parameter vectors $\vec{s}$, $\vec{c}$, and $\vec{o}^{ref}$. In decision block 2707, blocks 2705 and 2706 are repeated for P iterations. When increment parameter p, incremented in block 2708, equals the set number of iterations P, control flows to block 2709. In block 2709, the structured dictionary D and parameter vectors $\vec{s}$, $\vec{c}$, and $\vec{o}^{ref}$ are returned. Note that the corresponding sparse coefficient matrix X used to compute the structured dictionary from the M overlapping randomly selected patches of the recorded seismic data gather in block 2705 is discarded.

Figure 28:
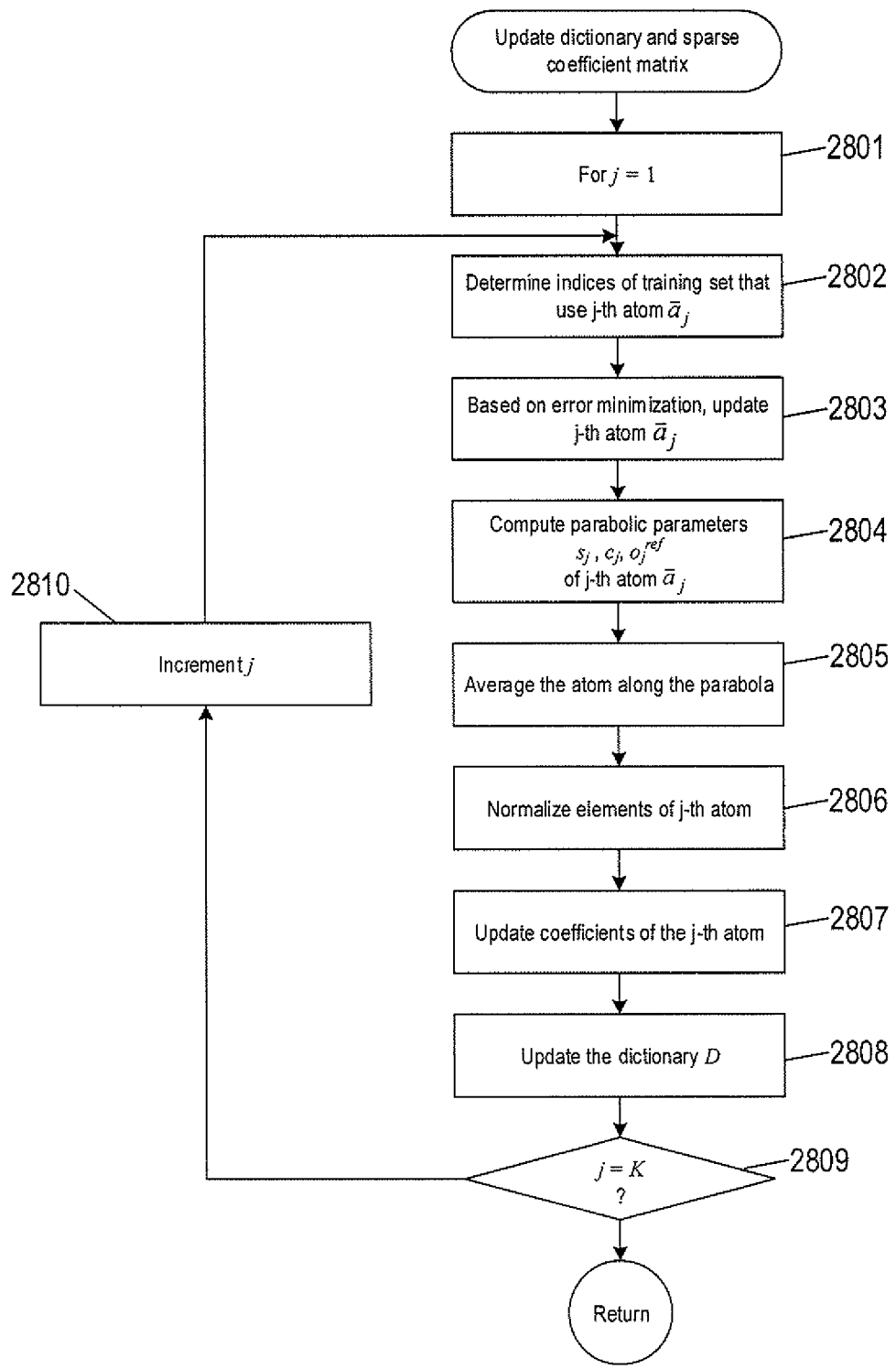
FIG. 28 shows a control-flow diagram that represents the module "update dictionary and sparse coefficient matrix" called in FIG. 27.

FIG. 28 shows a control-flow diagram that represents the module "update dictionary and sparse coefficient matrix" called in block 2706 of FIG. 27 to update atoms of the structured dictionary and the sparse coefficient matrix and compute reflection event parameters for each of the K atoms. A loop beginning with block 2801 repeats the computational operations represented by blocks 2802-2808 for each of the K atoms in the structured dictionary D. In block 2802, column indices of non-zero matrix elements in the j-th row of the sparse coefficient matrix are identified and represented as described above with reference to Equation (9). In block 2803, the j-th atom of the structured dictionary is computed (i.e., updated) as described above with reference to Equation (10). In block 2804, the slope parameter $s_j$, curvature parameter $c_j$, and reference coordinate $o_j^{ref}$ associated with the parabolic reflection event in the j-th atom $\vec{a}_j$ are computed. The slope parameter $s_j$ is the j-th element of the slope parameter vector $\vec{s}$. The j-th atom $\vec{a}_j$ is converted from a vector to an atom patch.

Figure 29A:
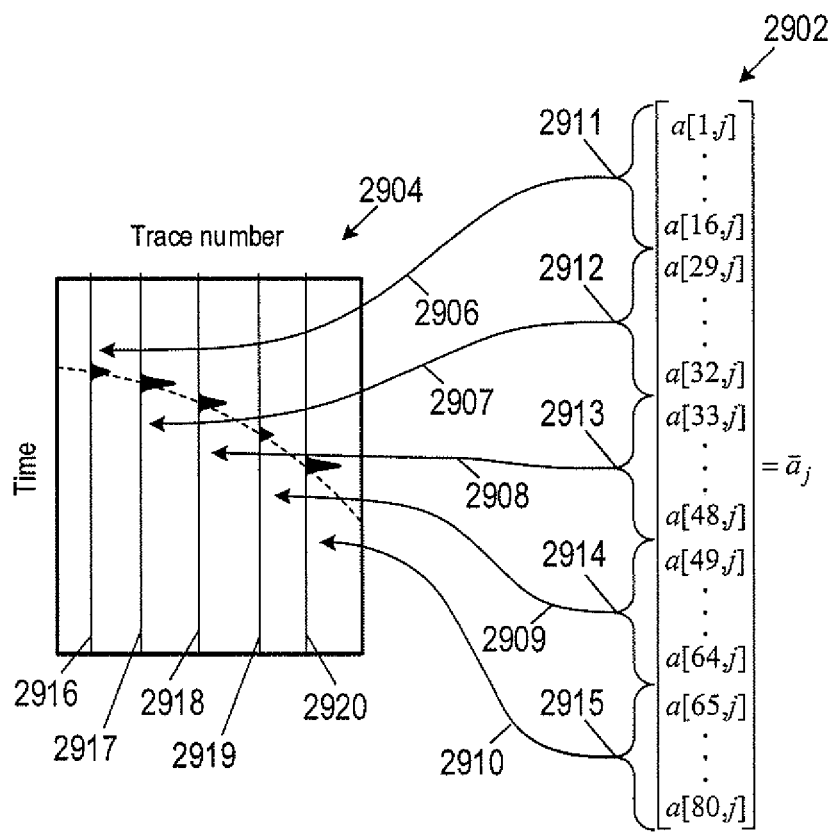
FIG. 29A shows converting an example atom into traces of an atom patch.
Figure 29B:
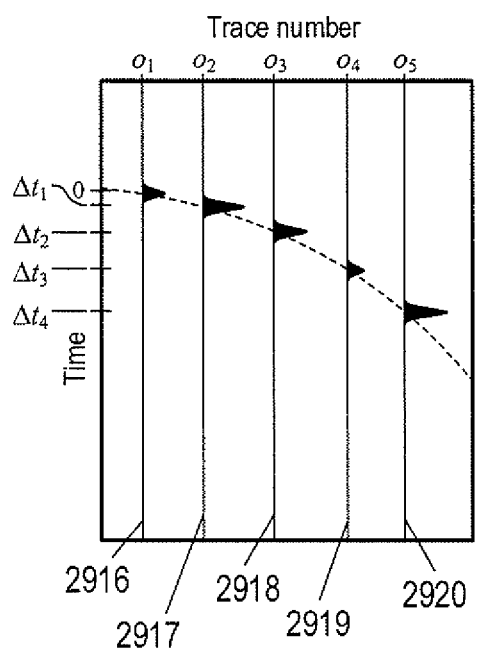
FIG. 29B shows an example of time shifts and corresponding receiver locations for traces in the atom patch of FIG. 29A.

FIG. 29A shows converting an example j-th atom $\vec{a}_j$ 2902 with 80 elements into five traces of an atom patch 2904. Directional arrows 2906-2910 represent mapping elements in five sections 2911-2915 to obtain traces 2916-2921, respectively. Wavelets located along the traces 2916-2921 represent a parabolic reflection event. For each pair of adjacent traces, a time shift $\Delta t_i$ that maximizes the cross correlation of the two adjacent traces is computed. For example, between the first and the second trace, a time shift $\Delta t_1$ is computed. The time shift is the travel time difference of the reflection event for the two adjacent receivers recorded in the adjacent traces. FIG. 29B shows an example of time shifts and corresponding receiver locations $o_1$, $o_2$, $o_3$, $o_4$, and $o_5$ for traces in the atom patch 2904. The first trace 2916 is located at time zero and a time shift $\Delta t_1$ of the second trace 2917 is determined by cross correlation between the first and second traces. The time shifts are accumulated and expressed relative to a central trace 2918, which sets a reference location $o^{ref}$ of the atom to the location of the central trace (i.e., $o^{ref}=o_3$):

$$\Delta \hat{t} = [0\ \Delta t_1 \Delta t_1 + \Delta t_2 \ldots ] - \Delta t_{ref}$$

where $\Delta t_{ref}$ is the accumulating time shift between the first trace and the central trace of the atom patch.

The parameters $s_j$, $c_j$, and $o_j^{ref}$ are computed by fitting the relative travel time $\Delta t$ to a second-order polynomial function that minimizes an error given by:

$$\|\Delta \hat{t} - s_j(\hat{o} - o_j^{ref}) - c_j(\hat{o} - o_j^{ref})^2\|_2$$

where $\hat{o} = [o_1\ o_2 \ldots]$ are the receiver locations of the traces with parabolic parameters $c_j$, $s_j$, and $o_j^{ref}$.

Figure 30A:
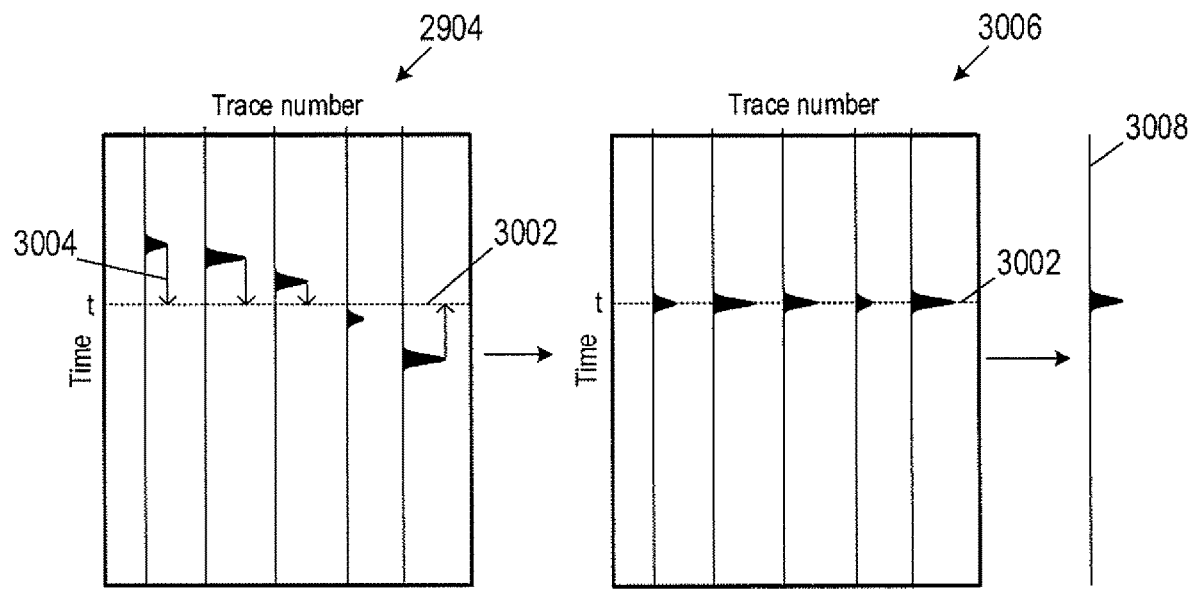
FIGS. 30A-30B show averaging amplitudes of traces along a parabola of an atom patch.
Figure 30B:
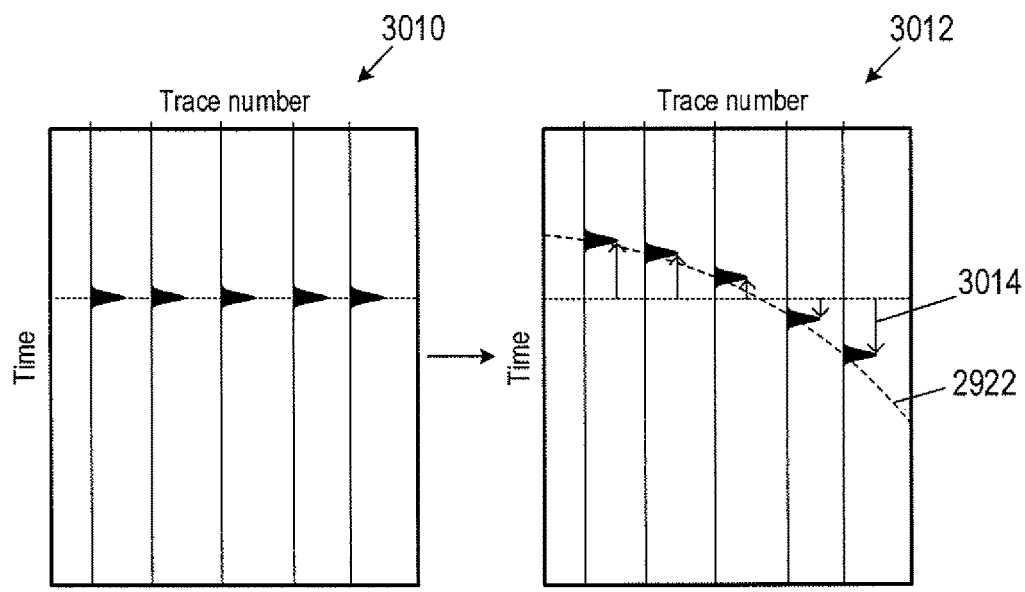

FIGS. 30A-30B show averaging amplitudes of the traces along a parabola of an atom patch. In FIG. 30A, amplitudes along the curve 2922 in FIG. 29B are flattened by time shifting the amplitudes to a time t represented by dotted line 3002 as represented by directional arrows, such as directional arrow 3004. Time shifting produces a time-shifted atom patch 3006 with a flat reflection event at time t. Note that the waveform and amplitude of wavelets along the flat reflection event vary slightly. These amplitudes are averaged to obtain an average trace 3008 that is used to replace traces of the time-shifted atom patch 3006 to obtain a constant-amplitude time-shifted atom patch 3010. The amplitudes of the traces in constant-amplitude time-shifted atom patch 3010 are time shifted back to obtain averaged atom patch 3012 as represented by direction arrows, such as directional arrow 3014. Note that averaged atom patch 3012 reproduces the original dip of the parabolic reflection event in atom patch 2904 but the wavelets have the same amplitudes along the parabolic reflection event.

Returning to FIG. 28, in block 2806, the j-th atom is normalized as described above with reference to Equation (11). In block 2807, using the normalized atoms obtained in block 2806, non-zero sparse coefficients in the j-th row of the sparse coefficient matrix X are computed (i.e., updated) as described above with reference to Equation (12). In block 2808, the j-th atom of the dictionary is updated by replacing the elements of the j-th atom in the structured dictionary D with the elements of the normalized j-th atom computed in Equation (11) as described above with reference to Equation (13). In decision block 2809, the computational operations of blocks 2801-2808 are repeated for K iterations. When increment parameter j, incremented in block 2810, equals K, control flows back to FIG. 27. The slope, curvature, and receiver coordinates parameters of each of the parabolic reflection events of the K atom patches in the structure dictionary D form the parameter vectors $\vec{s} = [s_1, \ldots, s_K]$, $\vec{c} = [c_1, \ldots, c_K]$, $\vec{o}^{ref} = [o_1, \ldots, o_K^{ref}]$.

Figure 31:
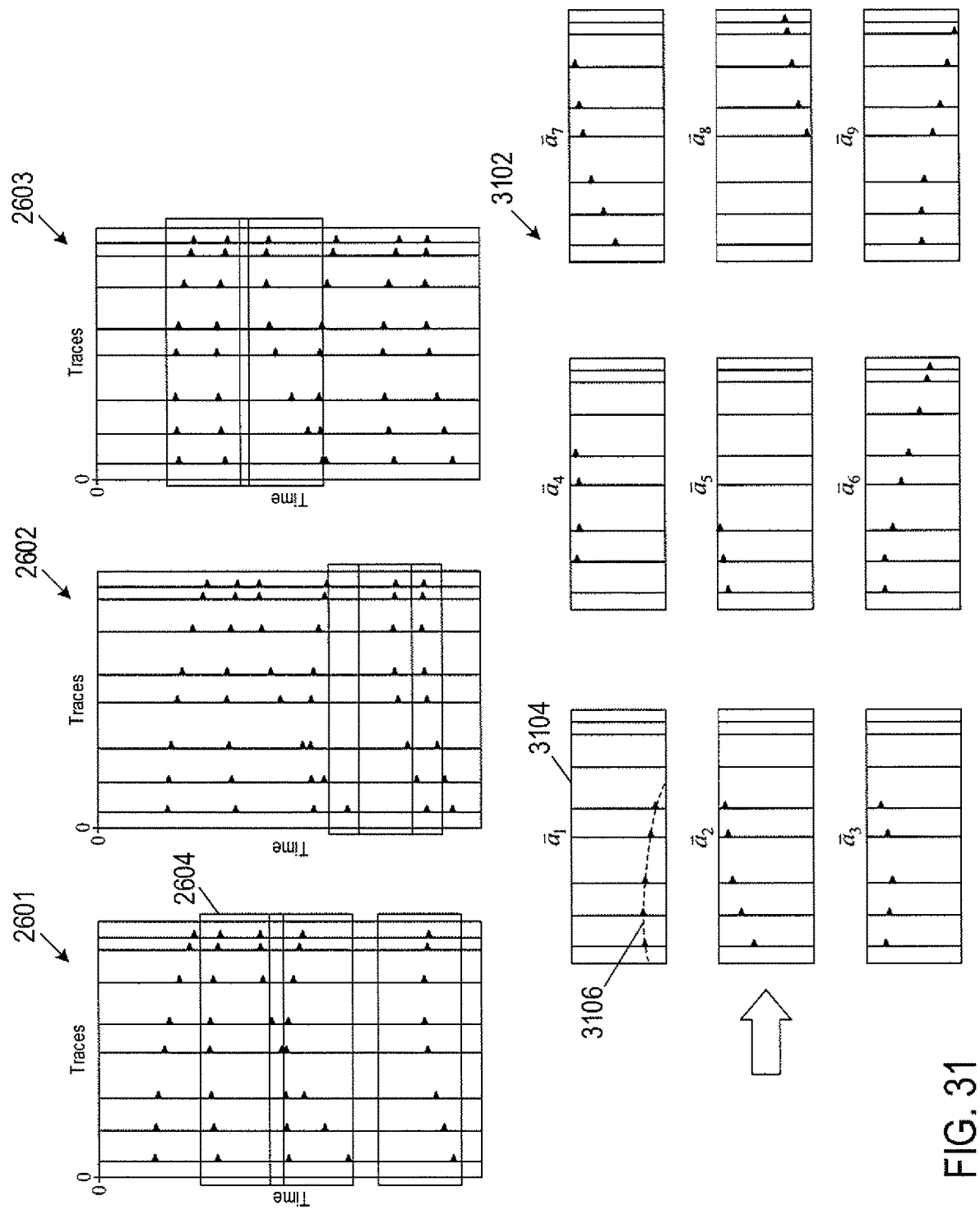
FIG. 31 shows examples of atoms and associated atom patches computed from overlapping, randomly selected patches of the windows of recorded seismic data in FIG. 24A.

FIG. 31 shows examples of atoms and associated atom patches 3102 computed from the randomly selected patches of the windows of recorded seismic data 2601-2603 computed in block 2503 of FIG. 25. Each atom patch represents a parabolic reflection event with different corresponding slope, curvature, and receiver coordinate parameters. For example, atom $\vec{a}_1$ has a corresponding atom patch 3104 that records a parabolic reflection event represented by dashed curve 3106.

Returning to FIG. 25, in block 2504, a cover set of overlapping patches of the windows of recorded seismic data are extracted. The patches may be determined and extracted in a deterministic and systematic manner to cover the full set of seismic data in the recorded seismic data gather. Each patch may overlap with up to about 80% of the seismic data encompassed by an adjacent patch. Each of the patches is vectorized as described above with reference to FIG. 9 to form a cover set of patch vectors as described above with reference to Equation (14).

Figure 32:
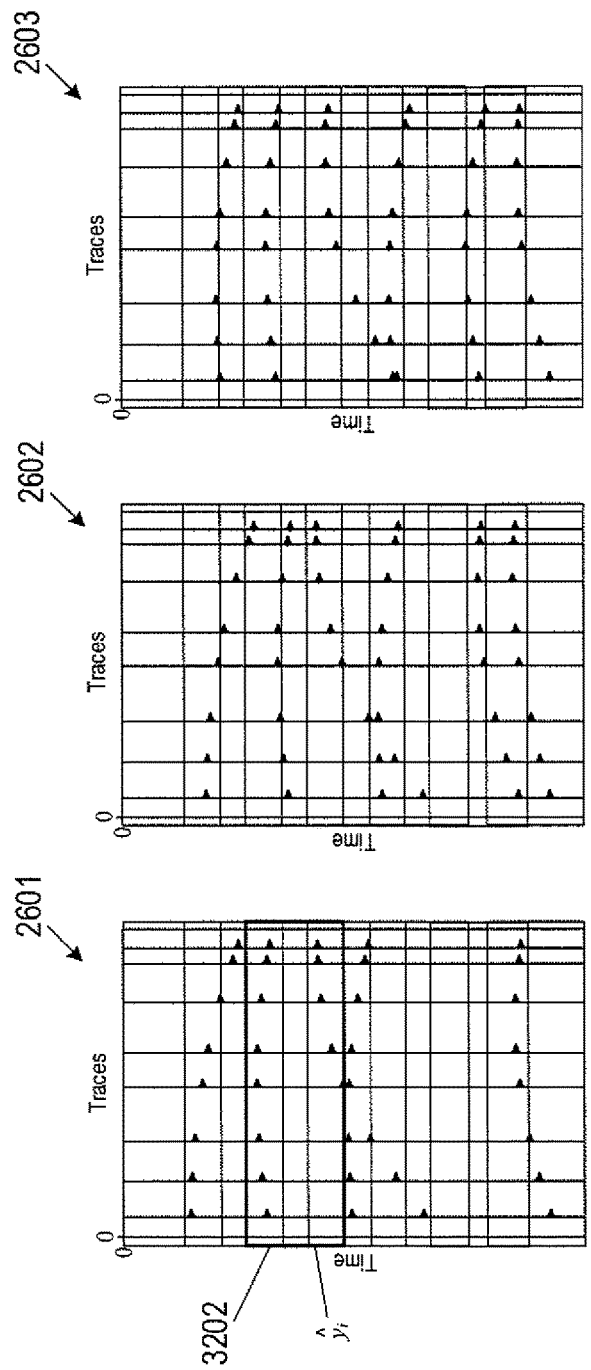
FIG. 32 shows an example of a cover set of overlapping patches extracted from the windows of recorded seismic data in FIG. 24A.

FIG. 32 shows an example of a cover set of 21 overlapping patches extracted from the windows of recorded seismic data 2601-2603. As shown in FIG. 32, overlapping rectangles, such as bolded rectangle 3202, represent overlapping patches of traces of the windows of recorded seismic data 2601-2603. The overlapping patches span the full spatial width of the windows. For example, patch 3202 encompasses all eight traces of the window 2601. The segments of traces in the patch 3202 are vectorized as described above with reference to FIG. 9 to form a patch vector $\hat{y}_i$.

Returning to FIG. 25, in block 2505, using a matching pursuit technique, such as OMP, a full sparse coefficient matrix $\hat{X}$ is computed from the structured dictionary D computed in block 2503 and the cover set of patch vectors obtained in block 2504 such that a product of the full sparse coefficient matrix and the structured dictionary approximate the cover set of patch vectors represented by Equations (15a) and (15b).

Figure 33:
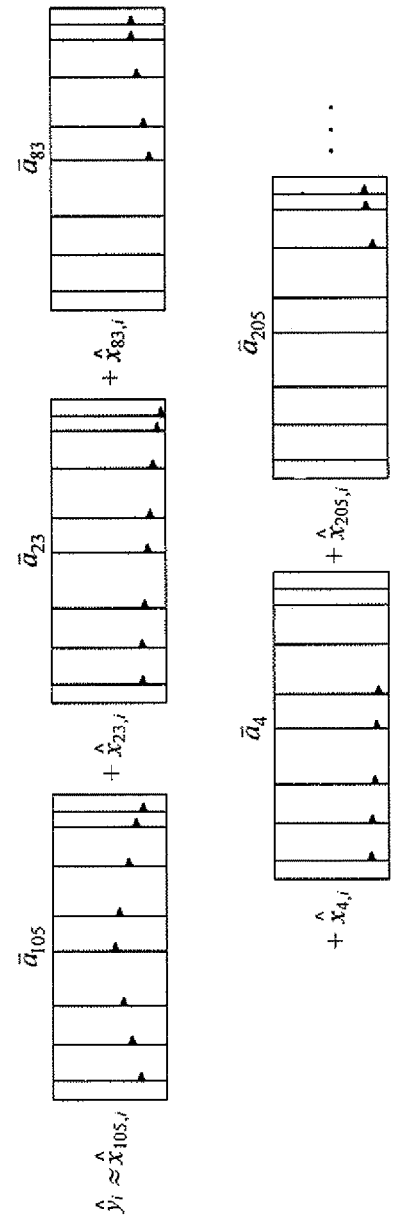
FIG. 33 shows an example of a linear combination of atoms and non-zero sparse coefficients that approximates seismic data in a patch vector.

FIG. 33 shows an example of a linear combination of atoms and non-zero sparse coefficients that approximates the seismic data in a patch vector of the patch 3202 of FIG. 32 according to Equation (15b):

$$\hat{y}_i \approx \hat{x}_{11,i} \vec{a}_{11} + \vec{a}_{23,i} \vec{a}_{23} + \hat{x}_{301,i} \vec{a}_{301} + \hat{x}_{83,i} \vec{a}_{83} + \hat{x}_{4,i} \vec{a}_4 + \hat{x}_{205,i} \vec{a}_{205} + \quad (20)$$

The quantities $\hat{x}_{11,i}$, $\hat{x}_{23,i}$, $\hat{x}_{83,i}$, $\hat{x}_{4,i}$, and $\hat{x}_{205,i}$ represent the non-zero elements of the sparse coefficient vector $\hat{x}_i$ that correspond to the patch vector $\hat{y}_i$. Other patch vectors that correspond to patches of the cover set of patch vectors are approximated in the same manner with a different corresponding sparse coefficient vector of the full sparse coefficient matrix.

Returning to FIG. 25, in block 2506, each atom patch that corresponds to an associated atom of the structured dictionary $D = [\vec{a}_1\ \vec{a}_2 \ldots \vec{a}_K]$ computed in block 2503 is interpolated over a finer, regularly spaced receiver-coordinate grid using the reflection event parameter (i.e., slope parameter) associated with the atom to obtain a corresponding interpolated structured dictionary $\hat{D} = [\vec{a}_1\ \vec{a}_2 \ldots \vec{a}_K]$ as described with reference to Equation (17).

Figure 34A:
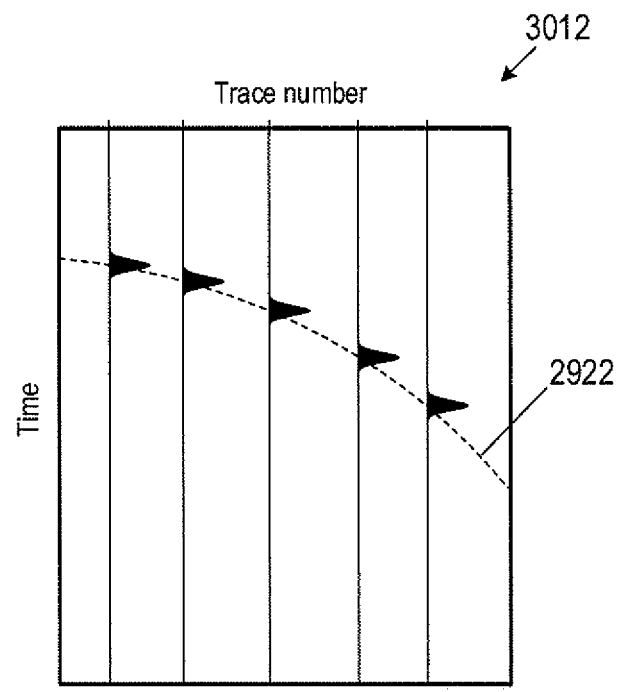
FIGS. 34A-34B show regularization and interpolation applied to an averaged atom patch.
Figure 34B:
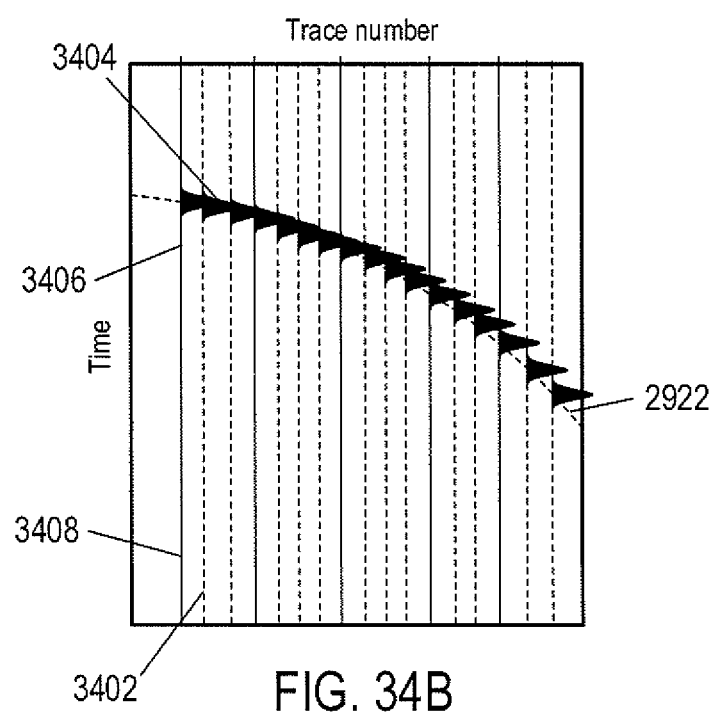

FIGS. 34A-34B show regularization and interpolation applied to the atom patch 3012 of FIG. 30B. FIG. 34A shows the averaged atom patch 3012 with wavelets that correspond to the parabolic reflection event identified by curve 2922. In FIG. 34B, regularized traces represented by dashed lines, such as trace 3402, are added to selected regularized receiver locations of the averaged atom patch 3012. Wavelets of the interpolated traces are computed to lie along the parabolic reflection event using the slope parameter $s_j$, curve parameter $c_j$, and reference coordinate $o_j^{ref}$ in the parabolic function given by Equation (6d), as described above with reference to FIG. 10B. For example, wavelet 3404 of added trace 3402 is interpolated by applying Equation (6d) to the average wavelet 3406 of recorded trace 3408. The interpolated atom patch 2200 may be vectorized as described above with reference to FIG. 9 to obtain a corresponding interpolated atom ad in the interpolated structured dictionary $\tilde{D}$.

Returning to FIG. 25, in block 2507, for each patch vector of the cover set of patch vectors, a corresponding interpolated patch vector is computed from the interpolated structured dictionary and the corresponding sparse coefficient vector of the full sparse coefficient matrix. In other words, for $i=1, \ldots, Q$, an interpolated patch vector is computed from the interpolated structured dictionary and a corresponding sparse coefficient vector in the full sparse coefficient matrix as described above with reference to Equation (18a).

Figure 35:
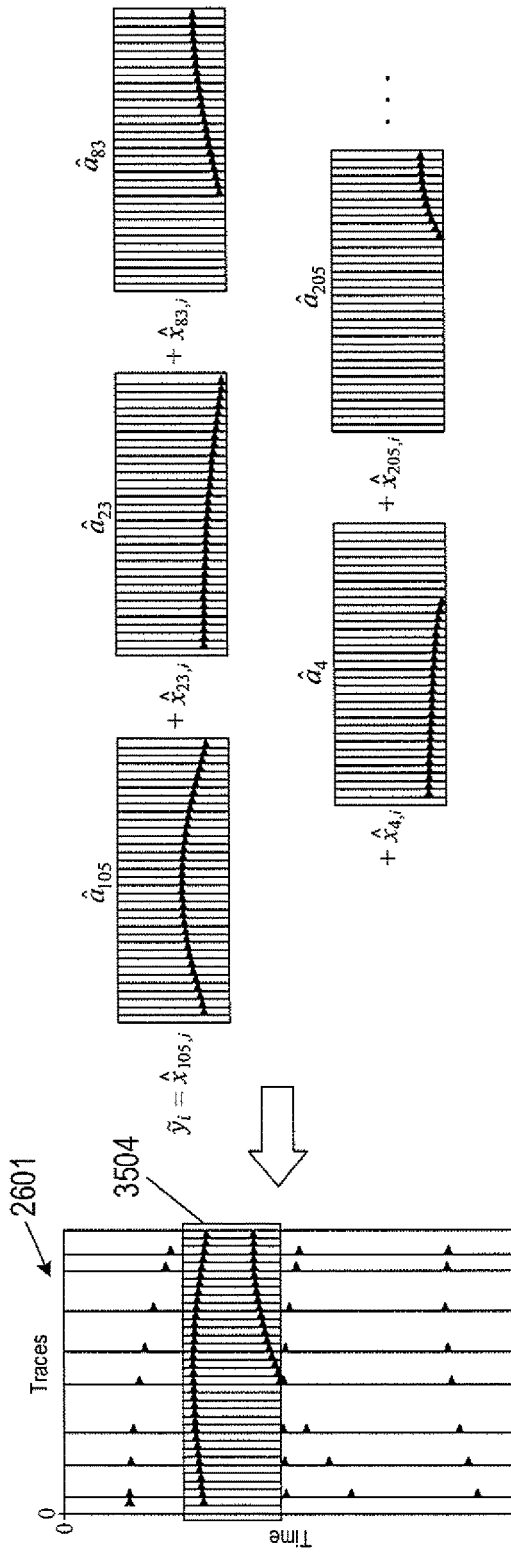
FIG. 35 shows an example of a linear combination of interpolated atoms and non-zero sparse coefficients used to compute an interpolated patch vector.

FIG. 35 shows an example of a linear combination 3502 of interpolated atoms and corresponding non-zero sparse coefficients used to compute an interpolated patch vector according to Equation (18b):

$$\tilde{y}_i = \hat{x}_{11,i}\hat{a}_{11} + \hat{a}_{23,i}\hat{a}_{23} + \hat{x}_{301,i}\hat{a}_{301} + \hat{x}_{83,i}\hat{a}_{83} + \hat{x}_{4,i}\hat{a}_4 + \hat{x}_{205,i}\hat{a}_{205}+ \quad (21)$$

Note that Equation (21) is an example of a linear combination of the interpolated atoms and non-zero elements of the corresponding sparse coefficient vector $\hat{x}_i$. Equation (21) has been obtained by replacing the atoms of Equation (20) by the corresponding interpolated atoms to compute interpolated patch vector $\tilde{y}_i$. For example, interpolated atom $\hat{a}_{11}$ replaced atom $\vec{a}_{11}$ in Equation (20) to compute the interpolated patch vector $\tilde{y}_i$. As shown in FIG. 35, the interpolated patch vector $\tilde{y}_i$ is converted into an interpolated patch 3504 that replaces the patch 3202 in the window 2601. Conversion of an interpolated patch vector into an interpolated patch may be carried out by mapping sections of the interpolated patch vector to receiver coordinates of the finer receiver-coordinate grid. Other patches of the cover set of patch vectors are replaced by interpolate patches in the same manner as a linear combination of the interpolated structured dictionary and corresponding sparse coefficient vectors of the full sparse coefficient matrix.

Returning to FIG. 25, in block 2508, each interpolated patch vector is converted into an interpolated patch that replaces a corresponding patch in the windows of the recorded seismic data. Amplitudes of seismic data in overlapping regions of the interpolated patches are averaged, as described above with reference to FIGS. 24A-24D, to form interpolated windows of the seismic data.

Figure 36:
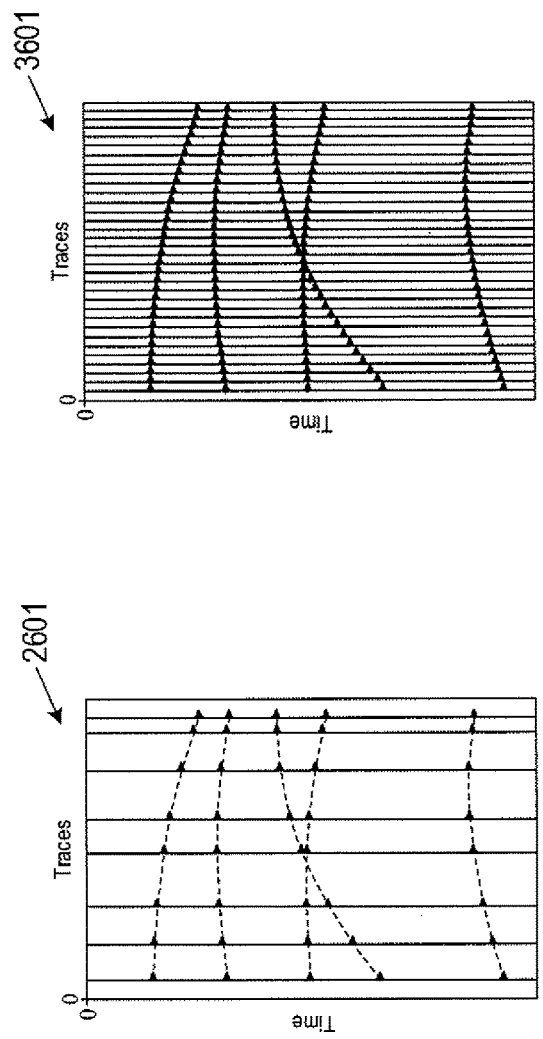
FIG. 36 shows an example of an interpolated window of seismic data obtained from averaging amplitudes of seismic data in overlapping regions of interpolated patches for the window of seismic data shown in FIG. 26A.

FIG. 36 shows an example of an interpolated window of seismic data 3601 obtained from averaging amplitudes of seismic data in overlapping regions of interpolated patches for the window of seismic data 1300 as described above with reference to FIGS. 24A-24D. The interpolated traces are regularized to a finer receiver-coordinate grid. The interpolated window of seismic data 3601 can be further processed as described above with reference to FIG. 6 to generate an image of the subterranean formation substantially free of aliasing effects.

In an alternative process, instead of randomly selecting and extracting patches to compute a structured dictionary, as described above with reference to blocks 1202 and 1203 of FIG. 12 and with reference to blocks 2502 and 2503 of FIG. 25, a cover set of patches may be extracted from a recorded seismic data gather or a cover set of patches may be extracted from multiple windows of seismic data. As a result, the sparse coefficient matrix X computed in block 1205 of FIG. 12 and block 2505 of FIG. 25 from the structured dictionary would contain a sparse coefficient vector for each patch of the recorded seismic data gather or of the multiple windows of seismic data. In this process, the steps described above with references FIGS. 21 and 33 may be omitted. However, computing a structured dictionary in either block 1203 of FIG. 12 or block 2503 of FIG. 25 using a cover set of patches from the seismic data is very computationally expensive. As a result, computation of structured dictionary learning may be carried out with only randomly selected patches extracted in blocks 1202 of FIG. 12 and block 2502 of FIG. 25.

Figure 37:
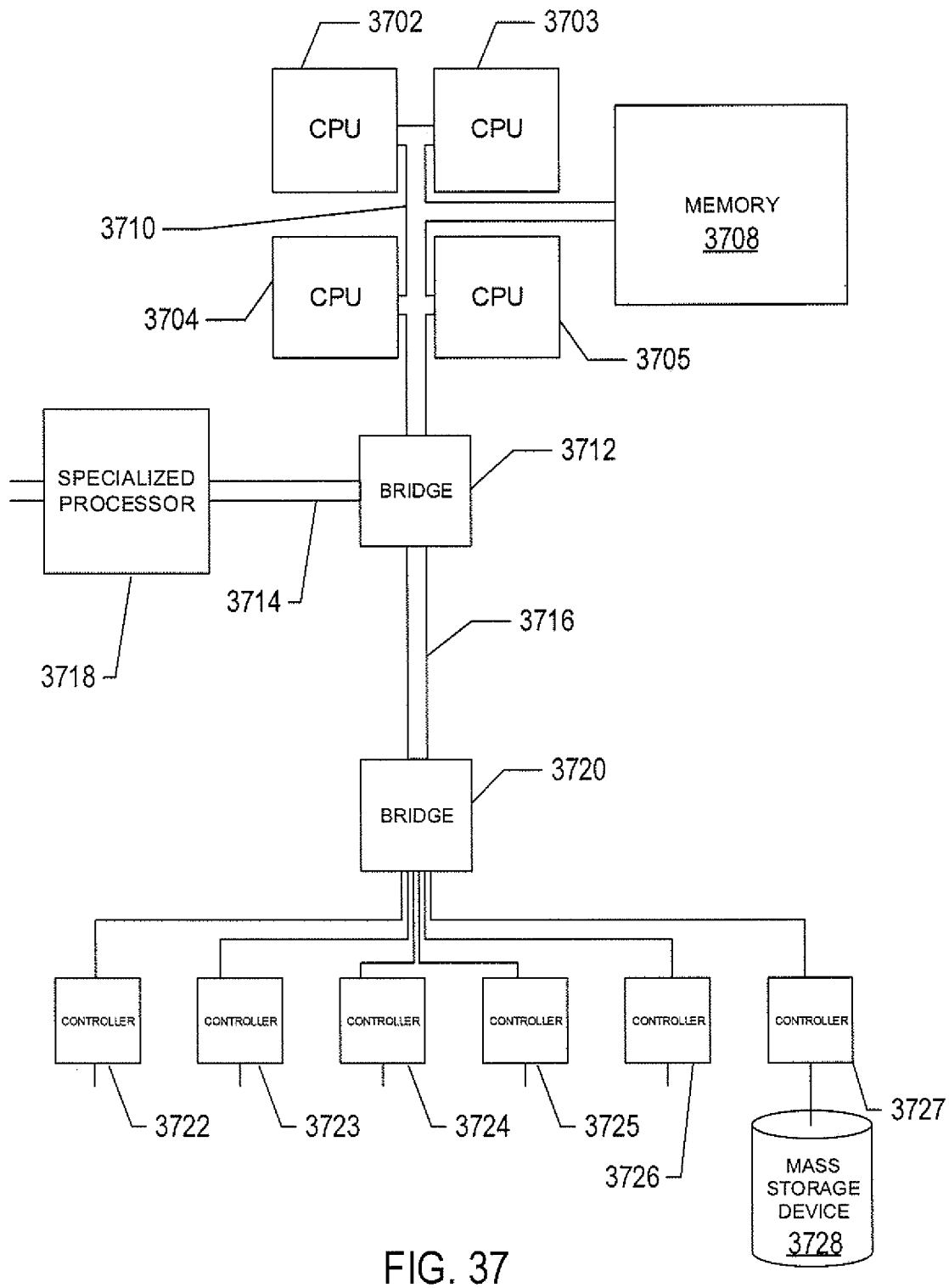
FIG. 37 shows an example of a computer system that executes efficient methods for interpolating seismic data and generating an image of subterranean formation.

FIG. 37 shows an example of a computer system that executes efficient methods for interpolating seismic data and generating an image of subterranean formation and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 3702-3705, one or more electronic memories 3708 interconnected with the CPUs by a CPU/memory-subsystem bus 3710 or multiple busses, a first bridge 3712 that interconnects the CPU/memory-subsystem bus 3710 with additional busses 3714 and 3716, or other types of high-speed interconnection media, including multiple, high-speed serial interconnects. The busses or serial interconnections, in turn, connect the CPUs and memory with specialized processors, such as a graphics processor 3718, and with one or more additional bridges 3720, which are interconnected with high-speed serial links or with multiple controllers 3722-3727, such as controller 3727, that provide access to various different types of computer-readable media, such as computer-readable medium 3728, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 3728 is a data-storage device, including electronic memory, optical or magnetic disk drive, USB drive, flash memory and other such data-storage device. The computer-readable medium 3728 can be used to store machine-readable instructions that encode the computational methods described above and can be used to store encoded data, during store operations, and from which encoded data can be retrieved, during read operations, by computer systems, data-storage systems, and peripheral devices.

Experimental Results

Figure 38:
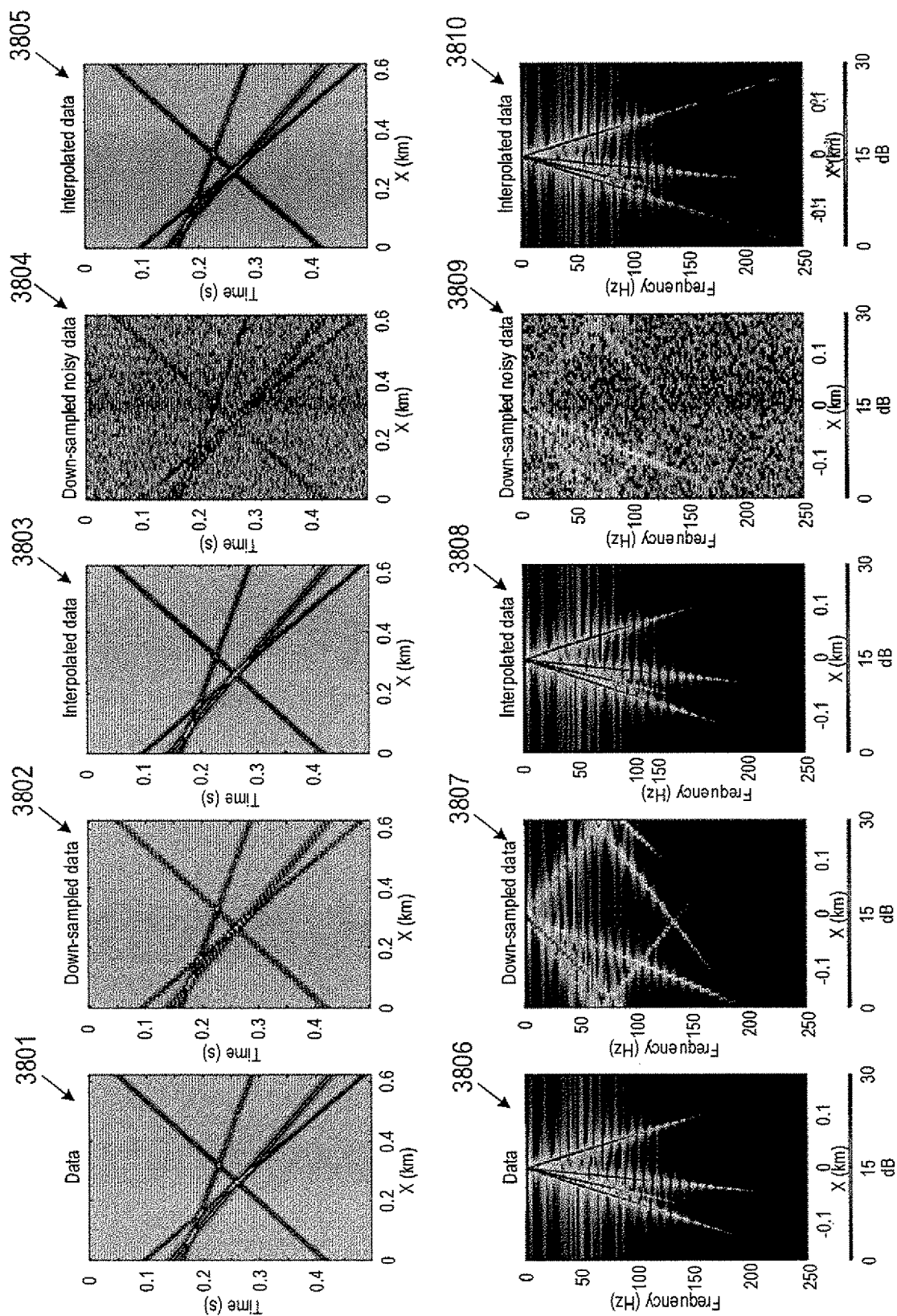
FIG. 38 shows a first demonstration of the interpolation processes applied to synthetic seismic data with linear reflection events.

FIG. 38 shows a first demonstration of the effectiveness of the interpolation processes described above with reference to FIGS. 23, 26, and 27 in a series of gathers 3201-3205 with linear reflection events and corresponding frequency spectra 3806-3210. Gather 3201 is a synthetic gather of seismic data with linear reflection events sampled at 2 milliseconds in time and at 3.125 m receiver coordinate spacing. Down-sampled gather 3202 was obtained from down-sampling the synthetic gather 3201 with a spatial sampling of 12.5 m and aliasing occurred from 60 Hz. Interpolated gather 3203 was obtained by applying the processes described above. The signal-to-noise ratio of the interpolated gather 3203 is 32.0 dB. Interpolation gather 3203 was a nearly perfect match to the gather 3201. Down-sample gather 3204 represents a second experiment designed to test the robustness of the processes described above when the coarsely sample seismic data is contaminated with noise. Gaussian white noise was added to the down-sampled gather 3202 to obtain the down-sampled gather with noise 3204. The down-sampled gather 3204 had a signal-to-noise ratio of −1.0 dB. Interpolated gather 3205 was obtained by applying the processes described above to the down-sampled gather 3204. The interpolated gather 3205 had a signal-to-noise ratio 23.4 dB. The process is robust in the presence of white noise.

Figure 39:
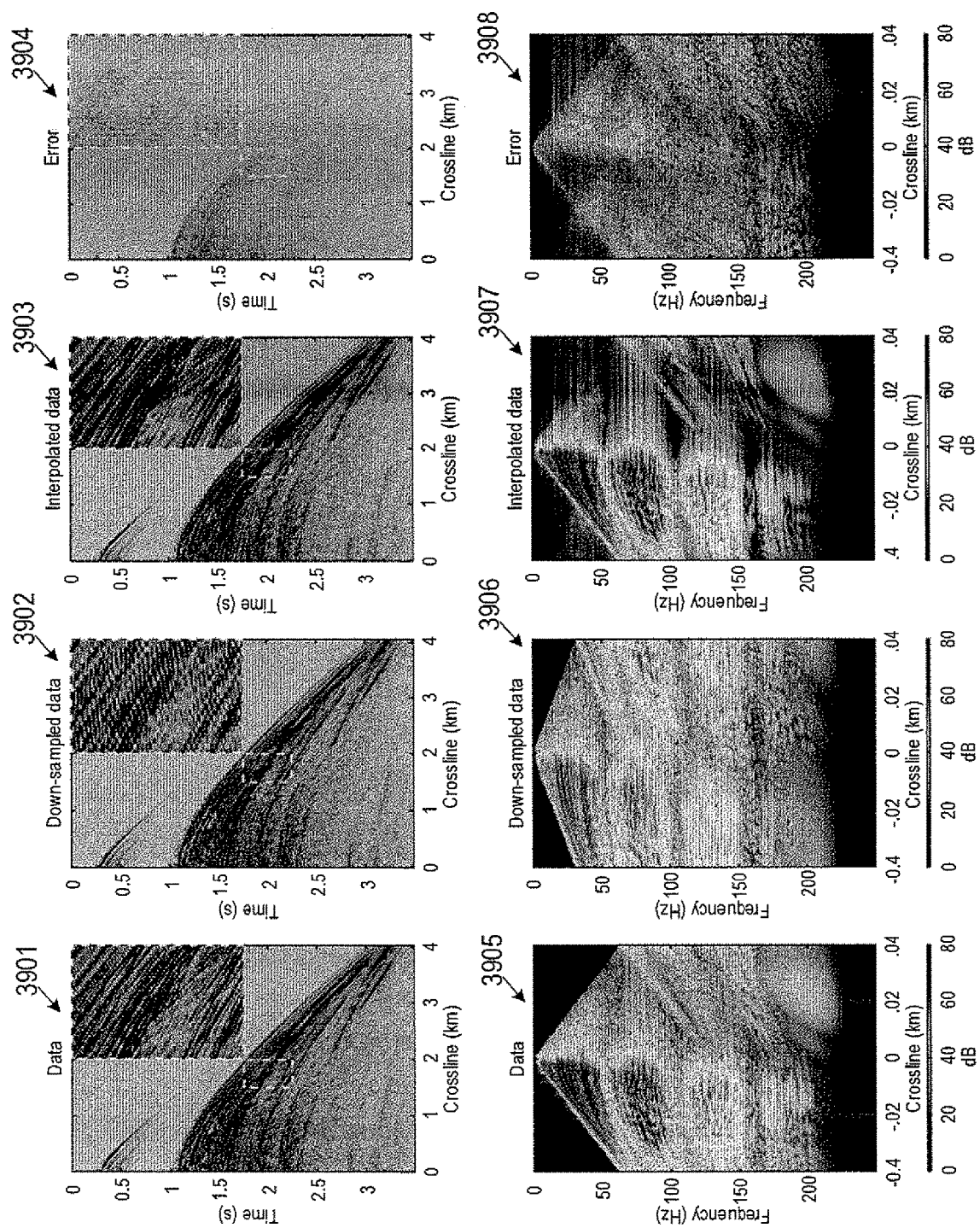
FIG. 39 shows a second demonstration of the interpolation processes applied to actual seismic with linear reflection events.

FIG. 39 shows a second demonstration of the effectiveness of the interpolation processes described above with reference to FIG. 12 in a series of gathers 3901-3904 and corresponding frequency spectra 3905-3908. Gather 3901 is seismic data obtained from a raw shot gather of pressure data recorded in an actual marine seismic survey. The seismic data was recorded at a sample rate of 2 samples per millisecond and with a receiver spacing of 12.5 m. The data of gather 3901 was down sampled leaving traces spaced apart by 25 m to obtain down-sampled gather 3902 and corresponding frequency spectrum 3906. The linear structured dictionary learning was applied because the reflection events in the recorded seismic data gather were approximately linear. The process described above with reference to FIG. 12 was applied to the down-sampled gather 3902 using windows of size 400 millisecond by 70 channels. Interpolated gather 3903 and corresponding frequency spectrum 3907 had a signal-to-noise ratio of 16.5 dB. The interpolation error (i.e., difference between the interpolated data and the original data) is displayed in error gather 3904 and corresponding frequency spectrum 3908. The interpolated gather 3903 was aliased only from 60 Hz, as was the original gather 3901. Therefore, interpolation was beyond aliasing.

Figure 40B:
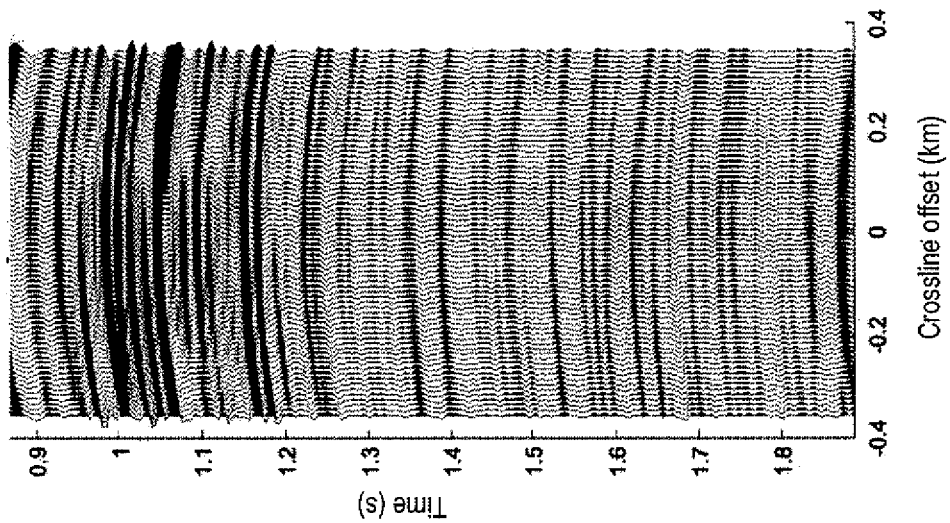
FIGS. 40A-40F shows a third demonstrate of the regularization and interpolation processes applied to synthetic seismic data with parabolic reflection events.
Figure 40A:
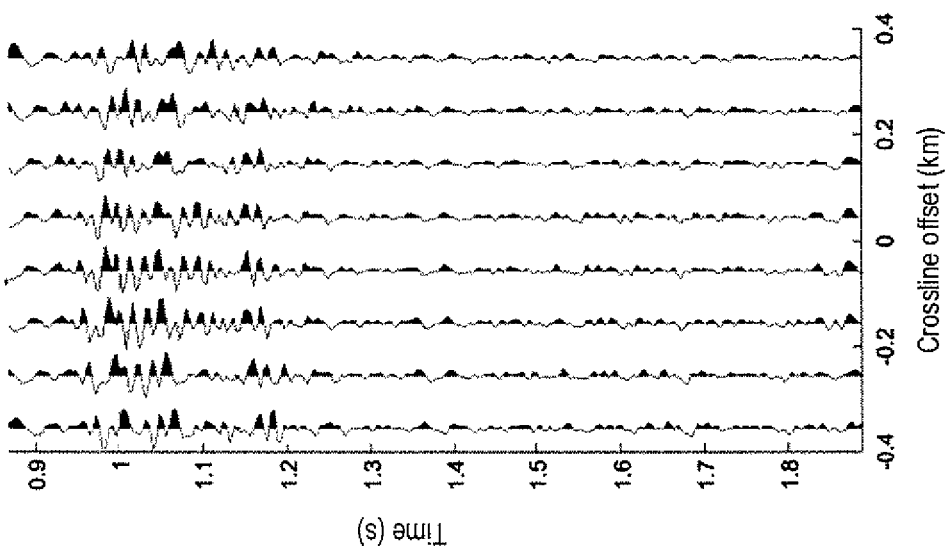
Figure 40D:
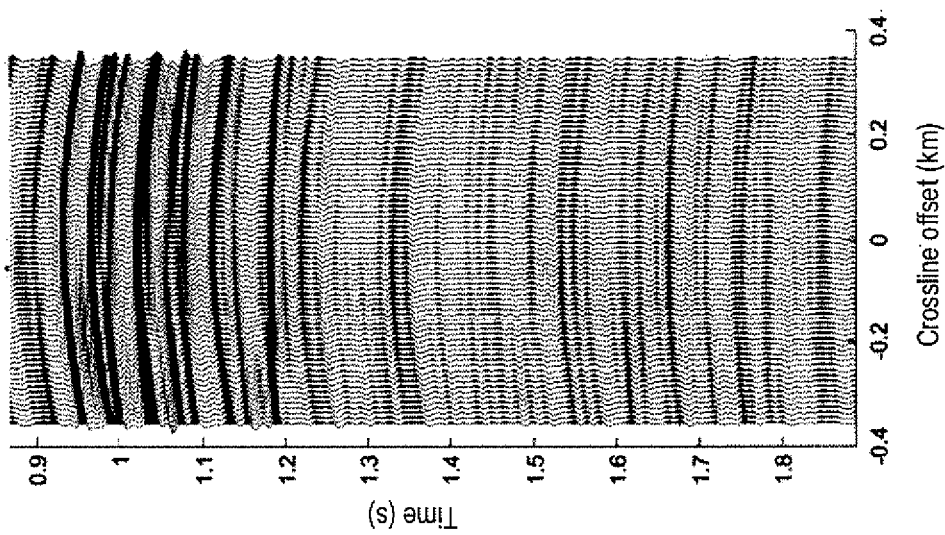
Figure 40C:
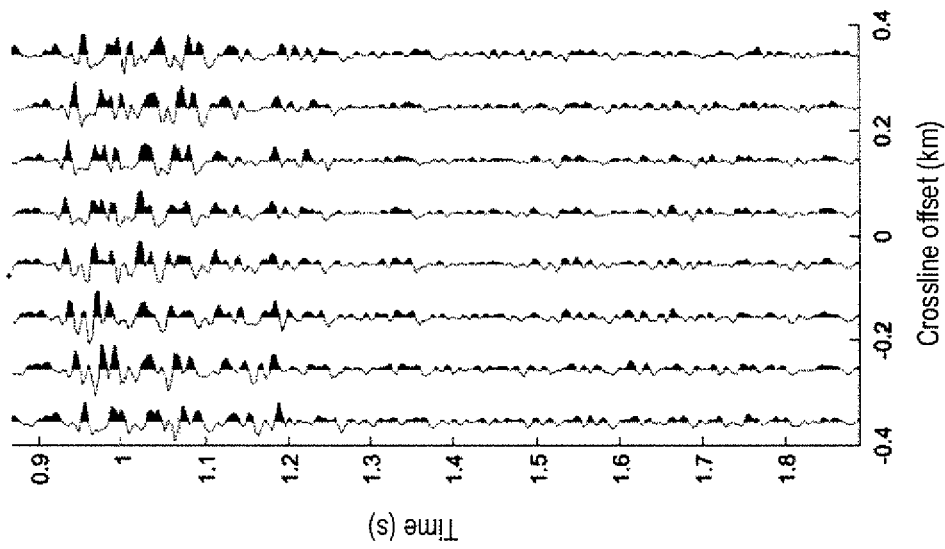
Figure 40F:
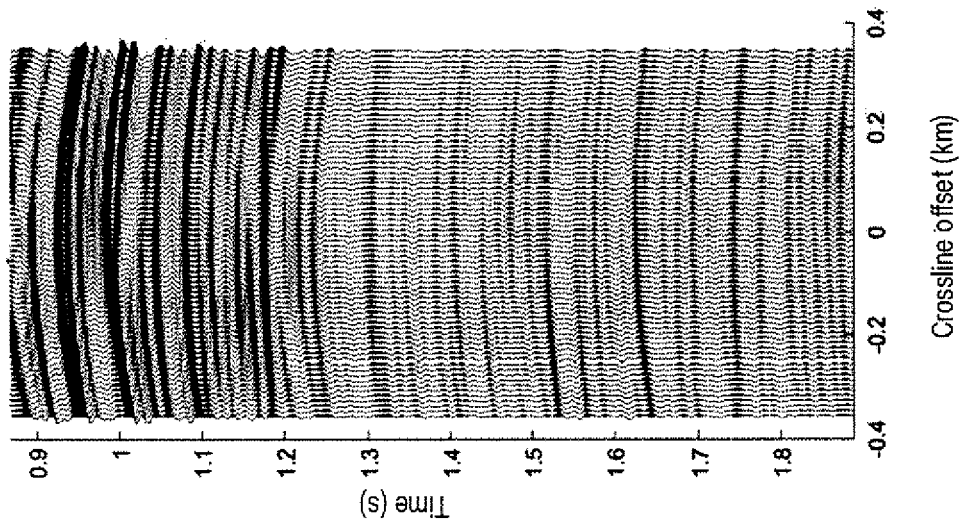
Figure 40E:
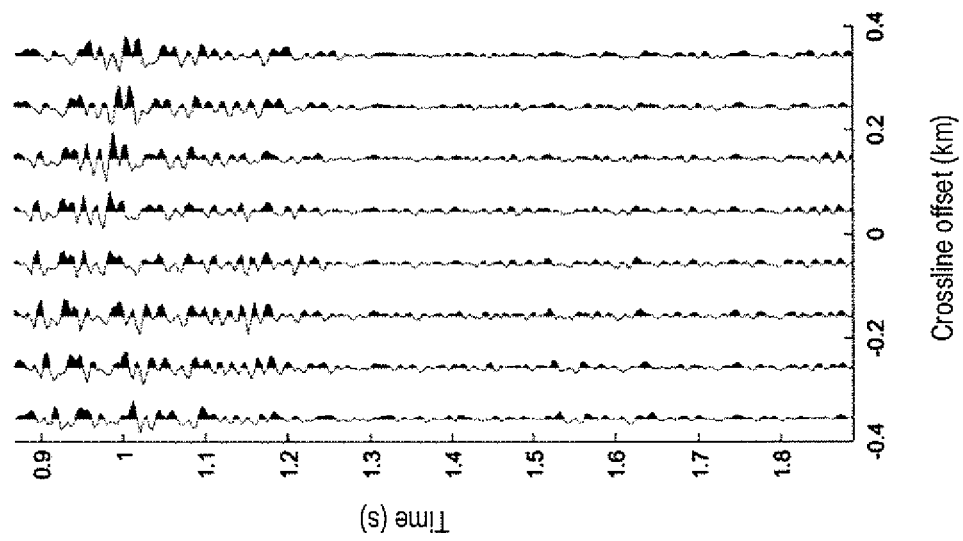

FIGS. 40A-40F demonstrate of the processes described above with reference to FIG. 25 applied to a recorded seismic data gather with parabolic reflection events. One hundred data windows in the cross-line dimension were extracted from 100 common shot gathers. The 100 windows were recorded by receivers of eight streamers with the same in-line receiver coordinate. Each window was recorded for one shot point. Because the streamers were spaced by 75 m, the traces appearing in FIGS. 40A, 40C, and 40E were spaced apart by 75 m. FIGS. 40A, 40B, and 40C show the first, 50-th, and 100-th windows, respectively, of the 100 windows recorded by receivers of different streamers with the same in-line receiver coordinate. The process described above with reference to FIG. 12 was applied to the 100 windows to interpolate the traces over a regular grid with receiver coordinate grid spacing of 12.5 m. FIG. 40B shows interpolated and regularized traces computed for the seismic data shown in corresponding FIG. 40A. FIG. 40D shows interpolated and regularized traces computed for the seismic data shown in corresponding FIG. 40C. FIG. 40F shows interpolated and regularized traces computed for the seismic data shown in corresponding FIG. 40E.

The processes and systems disclosed herein may be used to form or process a geophysical data product indicative of certain properties of a subterranean formation. The geophysical data product may include geophysical data such as pressure data, particle motion data, particle velocity data, particle acceleration data, and any seismic image that results from using the processes and systems described above. The geophysical data product may be stored on a non-transitory computer-readable medium as described above. The geophysical data product may be produced offshore (i.e., by equipment on the survey vessel 102 or using ocean bottom cables) or onshore (i.e., at a computing facility on land).

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for generating an image of a subterranean formation located beneath a body of water using marine seismic techniques in which one or more sources are activated in the body of water above the subterranean formation and receivers located in the body of water or on the sea floor measure wavefield responses from the subterranean formation and store the wavefield responses as recorded seismic data in a data-storage device, the improvement comprising:
   computing a structured dictionary of atoms based on patches of seismic data extracted from the recorded seismic data, each patch containing segments of adjacent traces of the recorded seismic data and each atom of the structured dictionary representing a reflection event in the recorded seismic data;
   computing interpolated patches of seismic data based on linear combinations of the atoms, the interpolated patches replacing patches of the seismic data;
   combining the interpolated patches to form interpolated seismic data; and
   using the interpolated seismic data to generate an image of the subterranean formation, thereby overcoming spatial aliasing in the recorded seismic data and enhancing resolution of the image.

2. The process of claim 1, wherein computing the structured dictionary of atoms comprises randomly selecting and extracting the patches of seismic data from the recorded seismic data.

3. The process of claim 1, wherein computing the structured dictionary of atoms comprises:
   extracting seismic data in a window of the recorded seismic data; and
   randomly selecting and extracting the patches of seismic data from the window of the recorded seismic data.

4. The process of claim 1, wherein computing the structured dictionary of atoms comprises:
   for a number of iterations,
      minimizing a cost function of a difference between the patches and a product of the structured dictionary and sparse coefficient vectors subject to a sparsity constraint on the number of elements in the sparse coefficient vectors and a constraint on geometrical structures of reflection events in the seismic data, and
      updating atoms of the structured dictionary and the sparse coefficient vectors based on the reflection events of seismic data.

5. The process of claim 4, wherein updating atoms of the structured dictionary and the sparse coefficient vectors comprises:

for each atom of the structured dictionary,
  computing an atom as a function of the atom obtained in a previous iteration and non-zero elements of the sparse coefficient vectors,
  converting the atom to an atom patch with a reflection event,
  computing reflection event parameters of the reflection event,
  averaging the atom along the reflection event to generate an average atom patch;
  normalizing elements of the atom,
  updating elements of the sparse coefficient vectors based the atom, and
  replacing the atom in the structured dictionary with the normalized atom.

6. The process of claim 1, wherein computing interpolated patches of seismic data based on linear combinations of the atoms comprises:
  systematically selecting and extracting a cover set of overlapping patches from the recorded seismic data;
  computing a cover set of sparse coefficient vectors based on the cover set of patches and the structured dictionary, each sparse coefficient vector corresponding to one patch of the cover set of patches; and
  for each patch of the cover set of patches, computing an interpolated patch as a linear combination of atoms of the structured dictionary and the sparse coefficient vector that corresponds to the patch.

7. The process of claim 1, wherein combining the interpolated patches to form interpolated seismic data comprises averaging amplitudes of seismic data in overlap regions of the interpolated patches.

8. A computer system for computing an image of a subterranean formation from recorded seismic data collected in a marine seismic survey of the subterranean formation, the system comprising:
  one or more processors;
  one or more data-storage devices; and
  machine-readable instructions stored in the one or more data-storage devices that when executed using the one or more processors controls the system to perform operations comprising:
    extracting patches of seismic data from recorded seismic data stored in the one or more data-storage devices, each patch containing segments of adjacent traces of the recorded seismic data;
    computing a structured dictionary of atoms based on the patches, each atom of the structured dictionary representing a reflection event in the recorded seismic data;
    computing interpolated patches of seismic data based on linear combinations of the atoms, the interpolated patches replacing patches of the seismic data;
    combining the interpolated patches to form interpolated seismic data; and
    using the interpolated seismic data to generate an image of the subterranean formation, thereby overcoming spatial aliasing in the recorded seismic data and enhancing resolution of the image.

9. The system of claim 8, wherein extracting patches of seismic data from the recorded seismic data comprises randomly selecting and extracting patches of seismic data from the recorded seismic data.

10. The system of claim 8, wherein extracting patches of seismic data from the recorded seismic data comprises:
  extracting seismic data in a window of the recorded seismic data; and
  randomly selecting and extracting patches of seismic data from the window of the recorded seismic data.

11. The system of claim 8, wherein computing the structured dictionary of atoms comprises:
  for a number of iterations,
    minimizing a cost function of a difference between the patches and a product of the structured dictionary and sparse coefficient vectors subject to a sparsity constraint on the number of non-zero elements in the sparse coefficient vectors and a constraint on geometrical structures of reflection events in the seismic data, and
    updating atoms of the structured dictionary and the sparse coefficient vectors based on the reflection events of seismic data.

12. The system of claim 11, wherein updating atoms of the structured dictionary and the sparse coefficient vectors comprises:
  for each atom of the structured dictionary,
    computing an atom as a function of the atom obtained in a previous iteration and non-zero elements of the sparse coefficient vectors,
    converting the atom to an atom patch with a reflection event,
    computing reflection event parameters of the reflection event,
    averaging the atom along the reflection event to generate an average atom patch;
    normalizing elements of the atom,
    updating elements of the sparse coefficient vectors based the atom, and
    replacing the atom in the structured dictionary with the normalized atom.

13. The system of claim 8, wherein computing interpolated patches of seismic data based on linear combinations of the atoms comprises:
  systematically selecting and extracting a cover set of overlapping patches from the recorded seismic data;
  computing a cover set of sparse coefficient vectors based on the cover set of patches and the structured dictionary, each sparse coefficient vector corresponding to one patch of the cover set of patches; and
  for each patch of the cover set of patches, computing an interpolated patch as a linear combination of atoms of the structured dictionary and the sparse coefficient vector that corresponds to the patch.

14. The system of claim 8, wherein combining the interpolated patches to form interpolated seismic data comprises averaging amplitudes of seismic data in overlap regions of the interpolated patches.

15. A non-transitory computer-readable medium encoded with machine-readable instructions that implement a method carried out by one or more processors of a computer system to perform operations comprising:
  extracting patches of seismic data from recorded seismic data stored in the one or more data-storage devices, each patch containing segments of adjacent traces of the recorded seismic data generated in a seismic marine survey of a subterranean formation;
  computing a structured dictionary of atoms based on the patches, each atom of the structured dictionary representing a reflection event in the recorded seismic data;
  computing interpolated patches of seismic data based on linear combinations of the atoms, the interpolated patches replacing patches of the seismic data;
  combining the interpolated patches to form interpolated seismic data; and using the interpolated seismic data to generate an image of the subterranean formation, thereby overcoming any spatial aliasing in the recorded seismic data and enhancing resolution of the image.

16. The medium of claim 15, wherein extracting patches of seismic data from the recorded seismic data comprises randomly selecting and extracting patches of seismic data from the recorded seismic data.

17. The medium of claim 15, wherein extracting patches of seismic data from the recorded seismic data comprises:
extracting seismic data in a window of the recorded seismic data; and
randomly selecting and extracting patches of seismic data from the window of the recorded seismic data.

18. The medium of claim 15, wherein computing the structured dictionary of atoms comprises:
for a number of iterations,
minimizing a cost function of a difference between the patches and a product of the structured dictionary and sparse coefficient vectors subject to a sparsity constraint on the number of non-zero elements in the sparse coefficient vectors and a constraint on geometrical structures of reflection events in the seismic data, and
updating atoms of the structured dictionary and the sparse coefficient vectors based on the reflection events of seismic data.

19. The medium of claim 18, wherein updating atoms of the structured dictionary and the sparse coefficient vectors comprises:
for each atom of the structured dictionary,
computing an atom as a function of the atom obtained in a previous iteration and non-zero elements of the sparse coefficient vectors,
converting the atom to an atom patch with a reflection event,
computing reflection event parameters of the reflection event,
averaging the atom along the reflection event to generate an average atom patch;
normalizing elements of the atom,
updating elements of the sparse coefficient vectors based the atom, and
replacing the atom in the structured dictionary with the normalized atom.

20. The medium of claim 15, wherein computing interpolated patches of seismic data based on linear combinations of the atoms comprises:
systematically selecting and extracting a cover set of overlapping patches from the recorded seismic data;
computing a cover set of sparse coefficient vectors based on the cover set of patches and the structured dictionary, each sparse coefficient vector corresponding to one patch of the cover set of patches; and
for each patch of the cover set of patches, computing an interpolated patch as a linear combination of atoms of the structured dictionary and the sparse coefficient vector that corresponds to the patch.

21. The medium of claim 15, wherein combining the interpolated patches to form interpolated seismic data comprises averaging amplitudes of seismic data in overlap regions of the interpolated patches.

22. An apparatus for generating an image of a subterranean formation from recorded seismic data collected in a marine seismic survey of the subterranean formation, the apparatus comprising:

means for computing a structured dictionary of atoms based on patches of seismic data extracted from the recorded seismic data, each patch containing segments of adjacent traces of the recorded seismic data and each atom of the structured dictionary representing a reflection event in the recorded seismic data;
means for computing interpolated patches of seismic data based on linear combinations of the atoms, the interpolated patches replacing patches of the seismic data;
means for combining the interpolated patches to form interpolated seismic data; and
means for generating an image of the subterranean formation using the interpolated seismic data, thereby overcoming spatial aliasing in the recorded seismic data and enhancing resolution of the image.

23. The apparatus of claim 22, wherein the means for computing the structured dictionary of atoms randomly selects and extracts the patches of seismic data from the recorded seismic data.

24. The apparatus of claim 22, wherein the means for computing the structured dictionary of atoms extracts seismic data in a window of the recorded seismic data, and randomly selects and extracts the patches of seismic data from the window of the recorded seismic data 25. The apparatus of claim 22, wherein the means for computing the structured dictionary of atoms comprises:
a means for minimizing a cost function of a difference between the patches and a product of the structured dictionary and sparse coefficient vectors subject to a sparsity constraint on the number of non-zero elements in the sparse coefficient vectors and a constraint on geometrical structures of reflection events in the seismic data, and
a means for updating atoms of the structured dictionary and the sparse coefficient vectors based on the reflection events of seismic data.

26. The apparatus of claim 25, wherein the means for updating atoms of the structured dictionary and the sparse coefficient vectors
for each atom of the structured dictionary, computes an atom as a function of the atom obtained in a previous iteration and non-zero elements of the sparse coefficient vectors,
converts each atom to an atom patch with a reflection event,
computes reflection event parameters for each reflection event,
averages the atom along the reflection event to generate an average atom patch for each atom patch;
normalizes elements of each atom,
updates elements of the sparse coefficient vectors based on each atom, and
replaces each atom in the structured dictionary with the normalized atom.

27. The apparatus of claim 22, wherein the means for computing interpolated patches of seismic data
systematically selects and extracts a cover set of overlapping patches from the recorded seismic data;
computes a cover set of sparse coefficient vectors based on the cover set of patches and the structured dictionary, each sparse coefficient vector corresponding to one patch of the cover set of patches; and
for each patch of the cover set of patches, computes an interpolated patch as a linear combination of atoms of the structured dictionary and the sparse coefficient vector that corresponds to the patch.

28. The apparatus of claim 22, wherein the means for combining the interpolated patches to form interpolated seismic data averages amplitudes of seismic data in overlap regions of the interpolated patches.

29. A method of manufacturing a geophysical data product, the method comprising:
- extracting patches of seismic data from recorded seismic data obtained in a marine survey of a subterranean formation, each patch containing segments of adjacent traces of the recorded seismic data;
- computing a structured dictionary of atoms based on the patches, each atom of the structured dictionary representing a reflection event in the recorded seismic data;
- computing interpolated patches of seismic data based on linear combinations of the atoms, the interpolated patches replacing patches of the seismic data;
- combining the interpolated patches to form interpolated seismic data;
- using the interpolated seismic data to generate an image of the subterranean formation; and
- storing the image in a tangible computer-readable medium.

* * * * *